US009778080B2

(12) United States Patent
Garvey, III et al.

(10) Patent No.: US 9,778,080 B2
(45) Date of Patent: Oct. 3, 2017

(54) SELECTIVE DECIMATION AND ANALYSIS OF OVERSAMPLED DATA

(71) Applicant: EMERSON ELECTRIC (US) HOLDING CORPORATION (CHILE) LIMITADA, Santiago (CL)

(72) Inventors: Raymond E. Garvey, III, Loudon, TN (US); Joseph A. Vrba, Clinton, TN (US); Stewart V. Bowers, III, Knoxville, TN (US); Robert D. Skeirik, Knoxville, TN (US); Hermann Holtmannspötter, Nordhein Westfalen (DE); Michael D. Medley, Knoxville, TN (US); Kevin Steele, Knoxville, TN (US); Douglas A. Mann, Farragut, TN (US)

(73) Assignee: Emerson Electric (US) Holding Corporation (Chile) Limitada (CL)

(*) Notice: Subject to any disclaimer, the term of this patent is extended or adjusted under 35 U.S.C. 154(b) by 773 days.

(21) Appl. No.: 14/252,943

(22) Filed: Apr. 15, 2014

(65) Prior Publication Data
US 2014/0324367 A1 Oct. 30, 2014

Related U.S. Application Data

(60) Provisional application No. 61/816,974, filed on Apr. 29, 2013.

(51) Int. Cl.
*G01D 18/00* (2006.01)
(52) U.S. Cl.
CPC .................. *G01D 18/00* (2013.01)

(58) Field of Classification Search
CPC .......... G01H 1/00; G01H 1/003; G01H 1/006; G01H 1/04; G01H 1/06; G01H 1/08; G01D 18/00
See application file for complete search history.

(56) References Cited

U.S. PATENT DOCUMENTS

| | | | |
|---|---|---|---|
| 5,633,811 A | 5/1997 | Canada et al. | |
| 5,726,911 A | 3/1998 | Canada et al. | |
| 5,789,689 A | 8/1998 | Doidic et al. | |
| 5,799,114 A * | 8/1998 | Dowling ............ | G06K 9/00496 382/280 |

(Continued)

OTHER PUBLICATIONS

ASTM D7720—11 Standard Guide for Statistically Evaluating Measurand Alarm Limits when Using Oil Analysis to Monitor Equipment and Oil for Fitness and Contamination, Sep. 2011.

(Continued)

*Primary Examiner* — Toan Le
(74) *Attorney, Agent, or Firm* — Luedeka Neely Group, P.C.

(57) ABSTRACT

Useful and meaningful machine characteristic information may be derived through analysis of oversampled digital data collected using dynamic signal analyzers, such as vibration analyzers. Such data have generally been discarded in prior art systems. In addition to peak values and decimated values, other oversampled values are used that are associated with characteristics of the machine being monitored and the sensors and circuits that gather the data. This provides more useful information than has previously been derived from oversampled data within a sampling interval.

34 Claims, 24 Drawing Sheets

(56) References Cited

U.S. PATENT DOCUMENTS

| | | | |
|---|---|---|---|
| 5,854,994 | A | 12/1998 | Canada et al. |
| 5,895,857 | A | 4/1999 | Robinson et al. |
| 5,943,634 | A | 8/1999 | Piety et al. |
| 5,965,819 | A | 10/1999 | Piety et al. |
| 6,816,816 | B2 | 11/2004 | Slates et al. |
| 6,889,553 | B2 | 5/2005 | Robinson et al. |
| 7,424,403 | B2 | 9/2008 | Robinson et al. |
| 7,456,770 | B2 | 11/2008 | Cairns |
| 8,219,361 | B2 | 7/2012 | Leigh |
| 2008/0021670 | A1 | 1/2008 | Wu et al. |
| 2012/0041695 | A1 | 2/2012 | Baldwin |

OTHER PUBLICATIONS

Reference Manual AMS™ Suite: Machinery Health™ Manager Online System Software Applications for the CSI 4500 Machinery Health™ Monitor, Part # 97460.7, Copyright © 2007 by Emerson Process Management, p. 3-53.

Hauser, Max A, "Principles of Oversampling A/D Conversion", J. Audio Eng. Soc., Jan./Feb. 1991, vol. 39, No. 1/2.

Scheffer, C., and Girdhar, P., Practical Machinery Vibration Analysis and Predictive Maintenance, Copyright © 2004 by IDC Technologies.

He, Yongyong; Zhang, Xinming; and Friswell, Michael I., "Defect Diagnosis for Rolling Element Bearings Using Acoustic Emission", Transactions of the ASME, Dec. 2009, 061012-2/vol. 131.

Kim, Hyoung-Gook; Moreau, Nicholas; and Sikora, Thomas, MPEG-7 Audio and Beyond: Audio Content Indexing and Retrieval, 2005, John Wiley & Sons, Ltd.

Robinson, J. and Berry, J., Description of Peakvue and Illustrations of its Wide Array of Applications in Fault Detection and Problem Severity Assessment, Emerson Process Management Reliability Conference, Oct. 2001.

Kolerus, Josef, "Zustandsüberwachung von Maschinen" expert verlag 1. © 2005 John Wiley & Sons, Ltd., pp. 119-121, 138-140, 145-146, 175-179.

Digital Tri-Axial Vibration Sensor, ADIS16223, ©2010 Analog Devices, Inc.

Digital Tri-Axial Vibration Sensor with FFT Analysis and Storage, ADIS16228, ©2011 Analog Devices, Inc.

* cited by examiner

Table 4. Measurement rates and measurement intervals.

| ADC | Periodic Cycle for a Sensory Input | | | Measurement Rate | | Measurement Interval | | | |
|---|---|---|---|---|---|---|---|---|---|
| Sampling Rate (Samples/Sec) | Cycles Per Minute | Cycles Per Second | Cycle Duration (Sec) | Maximum Freq (Hz) | Nyquist Freq (Hz) | Interval Duration (Sec) | Intervals/Cycle (Quantity) | Cycles/Interval (Quantity) | Samples/Interval (Quantity) |
| 200,000 | 60,000 | 1000 | 0.0010 | 10,000 | 25,600 | 0.000039 | 25.6 | 0.0 | 8 |
| 200,000 | 60,000 | 1000 | 0.0010 | 5,000 | 12,800 | 0.000078 | 12.8 | 0.1 | 16 |
| 200,000 | 60,000 | 1000 | 0.0010 | 1,000 | 2,560 | 0.000391 | 2.6 | 0.4 | 78 |
| 200,000 | 60,000 | 1000 | 0.0010 | 500 | 1,280 | 0.000781 | 1.3 | 0.8 | 156 |
| 200,000 | 60,000 | 1000 | 0.0010 | 10 | 26 | 0.039063 | 0.0 | 39 | 7,813 |
| 200,000 | 6,000 | 100 | 0.010 | 10,000 | 25,600 | 0.000039 | 256.0 | 0.0 | 8 |
| 200,000 | 6,000 | 100 | 0.010 | 5,000 | 12,800 | 0.000078 | 128.0 | 0.0 | 16 |
| 200,000 | 6,000 | 100 | 0.010 | 1,000 | 2,560 | 0.000391 | 25.6 | 0.0 | 78 |
| 200,000 | 6,000 | 100 | 0.010 | 500 | 1,280 | 0.000781 | 12.8 | 0.1 | 156 |
| 200,000 | 6,000 | 100 | 0.010 | 10 | 26 | 0.039063 | 0.3 | 3.9 | 7,813 |
| 200,000 | 600 | 10 | 0.10 | 10,000 | 25,600 | 0.000039 | 2,560. | 0.0 | 8 |
| 200,000 | 600 | 10 | 0.10 | 5,000 | 12,800 | 0.000078 | 1,280. | 0.0 | 16 |
| 200,000 | 600 | 10 | 0.10 | 1,000 | 2,560 | 0.000391 | 256.0 | 0.0 | 78 |
| 200,000 | 600 | 10 | 0.10 | 500 | 1,280 | 0.000781 | 128.0 | 0.0 | 156 |
| 200,000 | 600 | 10 | 0.10 | 10 | 26 | 0.039063 | 2.6 | 0.4 | 7,813 |
| 200,000 | 60 | 1 | 1.0 | 10,000 | 25,600 | 0.000039 | 25,600.0 | 0.0 | 8 |
| 200,000 | 60 | 1 | 1.0 | 5,000 | 12,800 | 0.000078 | 12,800.0 | 0.0 | 16 |
| 200,000 | 60 | 1 | 1.0 | 1,000 | 2,560 | 0.000391 | 2,560. | 0.0 | 78 |
| 200,000 | 60 | 1 | 1.0 | 500 | 1,280 | 0.000781 | 1,280. | 0.0 | 156 |
| 200,000 | 60 | 1 | 1.0 | 10 | 26 | 0.039063 | 25.6 | 0.0 | 7,813 |
| 200,000 | 6 | 0.1 | 10 | 10,000 | 25,600 | 0.000039 | 256,000.0 | 0.0 | 8 |
| 200,000 | 6 | 0.1 | 10 | 5,000 | 12,800 | 0.000078 | 128,000.0 | 0.0 | 16 |
| 200,000 | 6 | 0.1 | 10 | 1,000 | 2,560 | 0.000391 | 25,600.0 | 0.0 | 78 |
| 200,000 | 6 | 0.1 | 10 | 500 | 1,280 | 0.000781 | 12,800.0 | 0.0 | 156 |
| 200,000 | 6 | 0.1 | 10 | 10 | 26 | 0.039063 | 256.0 | 0.0 | 7,813 |
| 200,000 | 1 | 0.01 | 100 | 10,000 | 25,600 | 0.000039 | 2,560,000.0 | 0.0 | 8 |
| 200,000 | 1 | 0.01 | 100 | 5,000 | 12,800 | 0.000078 | 1,280,000.0 | 0.0 | 16 |
| 200,000 | 1 | 0.01 | 100 | 1,000 | 2,560 | 0.000391 | 256,000.0 | 0.0 | 78 |
| 200,000 | 1 | 0.01 | 100 | 500 | 1,280 | 0.000781 | 128,000.0 | 0.0 | 156 |
| 200,000 | 1 | 0.01 | 100 | 10 | 26 | 0.039063 | 2,560. | 0.0 | 7,813 |
| 200,000 | 0 | 0.001 | 1000 | 10,000 | 25,600 | 0.000039 | 25,600,000.0 | 0.0 | 8 |
| 200,000 | 0 | 0.001 | 1000 | 5,000 | 12,800 | 0.000078 | 12,800,000.0 | 0.0 | 16 |
| 200,000 | 0 | 0.001 | 1000 | 1,000 | 2,560 | 0.000391 | 2,560,000.0 | 0.0 | 78 |
| 200,000 | 0 | 0.001 | 1000 | 500 | 1,280 | 0.000781 | 1,280,000.0 | 0.0 | 156 |
| 200,000 | 0 | 0.001 | 1000 | 10 | 26 | 0.039063 | 25,600.0 | 0.0 | 7,813 |

*FIG. 28*

Table 5a. Sorted distribution of >0 measurements for normal and causal datasets where a high value impact occurs in one measurement and replaces one of the values from an otherwise normal distribution.

| Dataset | n1 | n2 | n3 | n4 | n5 | n6 | n7 | n8 | n9 | n10 |
|---|---|---|---|---|---|---|---|---|---|---|
| highest value | 5 | 10 | 10 | 10 | 10 | 10 | 10 | 10 | 10 | 10 |
| next highest | 4 | 5 | 5 | 5 | 5 | 5 | 5 | 5 | 5 | 4 |
| third highest | 4 | 4 | 4 | 4 | 4 | 4 | 4 | 4 | 4 | 4 |
| ... | 3 | 4 | 4 | 4 | 4 | 4 | 4 | 3 | 3 | 3 |
| ... | 3 | 3 | 3 | 3 | 3 | 3 | 3 | 3 | 3 | 3 |
| ... | 3 | 3 | 3 | 3 | 3 | 3 | 3 | 3 | 3 | 3 |
| third lowest | 2 | 3 | 3 | 3 | 2 | 2 | 2 | 2 | 2 | 2 |
| second lowest | 2 | 2 | 2 | 2 | 2 | 2 | 2 | 2 | 2 | 2 |
| Lowest value | 1 | 2 | 1 | 1 | 1 | 1 | 1 | 1 | 1 | 1 |
| Mean | 3.0 | 4.0 | 3.9 | 3.9 | 3.8 | 3.8 | 3.8 | 3.7 | 3.7 | 3.6 |
| Median | 3.0 | 3.0 | 3.0 | 3.0 | 3.0 | 3 | 3 | 3 | 3 | 3 |
| Mode | 3.0 | 3.0 | 3.0 | 3.0 | 4.0 | 4.0 | 4.0 | 3.0 | 3.0 | 3.0 |
| SDEV | 1.2 | 2.4 | 2.6 | 2.6 | 2.6 | 2.6 | 2.6 | 2.6 | 2.6 | 2.6 |
| Mean-Median | 0.0 | 1.0 | 0.9 | 0.9 | 0.8 | 0.8 | 0.8 | 0.7 | 0.7 | 0.6 |
| Mean-Mode | 0.0 | 1.0 | 0.9 | 0.9 | -0.2 | -0.2 | -0.2 | 0.7 | 0.7 | 0.6 |
| (MAX-MIN)/(Mean-MIN) | 2.0 | 6.0 | 6.1 | 6.1 | 6.2 | 6.2 | 6.2 | 6.3 | 6.3 | 6.4 |
| MAX-MIN | 4.0 | 8.0 | 9.0 | 9.0 | 9.0 | 9.0 | 9.0 | 9.0 | 9.0 | 9.0 |
| Dataset Interpretation | Gaussian | Causal | Causal | Causal | Causal | Causal | Causal | Causal | Causal | Causal |
| Gaussian Attribute | 1 | 0 | 0 | 0 | 0 | 0 | 0 | 0 | 0 | 0 |
| Peaking Attribute | 0 | 1 | 1 | 1 | 1 | 1 | 1 | 1 | 1 | 1 |
| Friction Attribute | 0 | 0 | 0 | 0 | 0 | 0 | 0 | 0 | 0 | 0 |
| Circuit Fault Attribute | 0 | 0 | 0 | 0 | 0 | 0 | 0 | 0 | 0 | 0 |

*FIG. 29*

Table 6a. Sorted distribution of >0 measurements for normal and causal datasets where a source is intermittently producing sensory information of causal type.

| Dataset | n1 | n2 | n3 | n4 | n5 | n6 | n7 | n8 | n9 | n10 |
|---|---|---|---|---|---|---|---|---|---|---|
| highest value | 5 | 12 | 8 | 16 | 13 | 15 | 9 | 15 | 10 | 11 |
| next highest | 4 | 12 | 7 | 15 | 11 | 14 | 6 | 13 | 10 | 10 |
| third highest | 4 | 11 | 7 | 11 | 7 | 14 | 6 | 10 | 7 | 9 |
| ... | 3 | 11 | 5 | 8 | 5 | 10 | 4 | 9 | 5 | 8 |
| ... | 3 | 8 | 4 | 8 | 3 | 9 | 3 | 7 | 4 | 6 |
| ... | 3 | 6 | 3 | 4 | 3 | 7 | 3 | 5 | 3 | 3 |
| third lowest | 2 | 3 | 3 | 3 | 2 | 2 | 2 | 2 | 2 | 2 |
| second lowest | 2 | 2 | 2 | 2 | 2 | 2 | 2 | 2 | 2 | 2 |
| Lowest value | 1 | 2 | 1 | 1 | 1 | 1 | 1 | 1 | 1 | 1 |
| Mean | 3.0 | 7.4 | 4.4 | 7.6 | 5.2 | 8.2 | 4.0 | 7.1 | 4.9 | 5.8 |
| Median | 3.0 | 8.0 | 4.0 | 8.0 | 3.0 | 9.0 | 3.0 | 7.0 | 4.0 | 6.0 |
| Mode | 3.0 | 12.0 | 7.0 | 8.0 | 3.0 | 14.0 | 6.0 | 2.0 | 10.0 | 2.0 |
| SDEV | 1.2 | 4.3 | 2.5 | 5.5 | 4.3 | 5.6 | 2.5 | 5.0 | 3.4 | 3.9 |
| Mean-Median | 0.0 | -0.6 | 0.4 | -0.4 | 2.2 | -0.8 | 1.0 | 0.1 | 0.9 | -0.2 |
| Mean-Mode | 0.0 | -4.6 | -2.6 | -0.4 | 2.2 | -5.8 | -2.0 | 5.1 | -5.1 | 3.8 |
| (MAX-MIN)/(Mean-MIN) | 2.0 | 4.6 | 3.6 | 8.4 | 7.8 | 6.8 | 5.0 | 7.9 | 5.1 | 5.2 |
| MAX-MIN | 4.0 | 10.0 | 7.0 | 15.0 | 12.0 | 14.0 | 8.0 | 14.0 | 9.0 | 10.0 |
| Dataset Interpretation | Gaussian | Causal | Causal | Causal | Causal | Causal | Causal | Causal | Causal | Causal |
| Gaussian Attribute | 1 | 0 | 0 | 0 | 0 | 0 | 0 | 0 | 0 | 0 |
| Peaking Attribute | 0 | 1 | 1 | 1 | 1 | 1 | 1 | 1 | 1 | 1 |
| Friction Attribute | 0 | 1 | 1 | 1 | 1 | 1 | 1 | 1 | 1 | 1 |
| Circuit Fault Attribute | 0 | 0 | 0 | 0 | 0 | 0 | 0 | 0 | 0 | 0 |

*FIG. 30*

Table 6b. Sorted distribution of plus and minus measurements for normal and causal datasets where a source is intermittently producing sensory information of causal type.

| Dataset | n1 | n2 | n3 | n4 | n5 | n6 | n7 | n8 | n9 | n10 |
|---|---|---|---|---|---|---|---|---|---|---|
| highest value | 2 | 9 | 5 | 12 | 10 | 11 | 3 | 12 | 7 | 8 |
| next highest | 1 | 8 | 4 | 5 | 4 | 7 | 1 | 7 | 2 | 6 |
| third highest | 1 | 3 | 1 | 1 | 0 | 4 | 0 | 4 | 1 | 3 |
| ... | 0 | 0 | 0 | 0 | 0 | -1 | 0 | -1 | 0 | 0 |
| ... | 0 | -1 | 0 | -1 | -1 | -1 | -1 | -1 | -1 | -1 |
| ... | 0 | -1 | -1 | -2 | -1 | -2 | -1 | -2 | -1 | -1 |
| third lowest | -1 | -5 | -2 | -5 | -2 | -6 | -2 | -2 | -2 | -2 |
| second lowest | -1 | -8 | -2 | -8 | -2 | -11 | -3 | -6 | -4 | -5 |
| Lowest value | -2 | -9 | -4 | -13 | -8 | -12 | -6 | -10 | -7 | -7 |
| Mean | 0.0 | -0.4 | 0.1 | -1.2 | 0.0 | -1.2 | -1.0 | 0.1 | -0.6 | 0.1 |
| Median | 0.0 | -1.0 | 0.0 | -1.0 | -1.0 | -1.0 | -1.0 | -1.0 | -1.0 | -1.0 |
| Mode | 0.0 | -1.0 | 0.0 | None | 0.0 | -1.0 | 0.0 | -1.0 | -1.0 | -1.0 |
| SDEV | 1.2 | 6.4 | 2.9 | 7.2 | 4.9 | 7.7 | 2.5 | 6.7 | 3.9 | 4.9 |
| Mean-Median | 0.0 | 0.6 | 0.1 | -0.2 | 1.0 | -0.2 | 0.0 | 1.1 | 0.4 | 1.1 |
| Mean-Mode | 0.0 | 0.6 | 0.1 | None | 0.0 | -0.2 | -1.0 | 1.1 | 0.4 | 1.1 |
| (MAX-MIN)/(Mean-MIN) | 2.0 | 9.4 | 4.9 | 13.2 | 10.0 | 12.2 | 4.0 | 11.9 | 7.6 | 7.9 |
| MAX-MIN | 4.0 | 18.0 | 9.0 | 25.0 | 18.0 | 23.0 | 9.0 | 22.0 | 14.0 | 15.0 |
| Dataset Interpretation | Gaussian | Causal | Causal | Causal | Causal | Causal | Causal | Causal | Causal | Causal |
| Gaussian Attribute | 1 | 0 | 0 | 0 | 0 | 0 | 0 | 0 | 0 | 0 |
| Peaking Attribute | 0 | 1 | 1 | 1 | 1 | 1 | 1 | 1 | 1 | 1 |
| Friction Attribute | 0 | 1 | 1 | 1 | 1 | 1 | 0 | 1 | 1 | 1 |
| Circuit Fault Attribute | 0 | 0 | 0 | 0 | 0 | 0 | 0 | 0 | 0 | 0 |

*FIG. 31*

Table 7a. Sorted distribution of >0 measurements for normal and causal datasets where a faulty sensor or a faulty circuit produces atypical zero measured values

| Dataset | n1 | n2 | n3 | n4 | n5 | n6 | n7 | n8 | n9 | n10 |
|---|---|---|---|---|---|---|---|---|---|---|
| highest value | 5 | 5 | 5 | 5 | 5 | 5 | 5 | 5 | 5 | 0 |
| next highest | 4 | 4 | 4 | 4 | 4 | 4 | 4 | 4 | 0 | 0 |
| third highest | 4 | 4 | 4 | 4 | 4 | 4 | 4 | 0 | 0 | 0 |
| ... | 3 | 3 | 3 | 3 | 3 | 3 | 0 | 0 | 0 | 0 |
| ... | 3 | 3 | 3 | 3 | 3 | 0 | 0 | 0 | 0 | 0 |
| ... | 3 | 3 | 3 | 3 | 0 | 0 | 0 | 0 | 0 | 0 |
| third lowest | 2 | 2 | 2 | 0 | 0 | 0 | 0 | 0 | 0 | 0 |
| second lowest | 2 | 2 | 0 | 0 | 0 | 0 | 0 | 0 | 0 | 0 |
| Lowest value | 1 | 0 | 0 | 0 | 0 | 0 | 0 | 0 | 0 | 0 |
| Mean | 3.0 | 2.9 | 2.7 | 2.4 | 2.1 | 1.8 | 1.4 | 1.0 | 0.6 | 0.0 |
| Median | 3.0 | 3.0 | 3.0 | 3.0 | 3.0 | 0.0 | 0.0 | 0.0 | 0.0 | 0.0 |
| Mode | 3.0 | 3.0 | 3.0 | 3.0 | 0.0 | 0.0 | 0.0 | 0.0 | 0.0 | 0.0 |
| SDEV | 1.2 | 1.5 | 1.7 | 1.9 | 2.1 | 2.2 | 2.2 | 2.0 | 1.7 | 0.0 |
| Mean-Median | 0.0 | -0.1 | -0.3 | -0.6 | -0.9 | 1.8 | 1.4 | 1.0 | 0.6 | 0.0 |
| Mean-Mode | 0.0 | -0.1 | -0.3 | -0.6 | 2.1 | 1.8 | 1.4 | 1.0 | 0.6 | 0.0 |
| (MAX-MIN)/(Mean-MIN) | 2.0 | 2.1 | 2.3 | 2.6 | 2.9 | 3.2 | 3.6 | 4.0 | 4.4 | 0.0 |
| MAX-MIN | 4.0 | 5.0 | 5.0 | 5.0 | 5.0 | 5.0 | 5.0 | 5.0 | 5.0 | 0.0 |
| Dataset Interpretation | Gaussian | Gaussian | Gaussian | Gaussian | Causal | Causal | Causal | Causal | Causal | Causal |
| Gaussian Attribute | 1 | 0 | 0 | 0 | 0 | 0 | 0 | 0 | 0 | 0 |
| Peaking Attribute | 0 | 0 | 0 | 0 | 0 | 0 | 1 | 1 | 1 | 0 |
| Friction Attribute | 0 | 0 | 0 | 0 | 0 | 0 | 0 | 0 | 0 | 0 |
| Circuit Fault Attribute | 0 | 0 | 0 | 0 | 0 | 1 | 1 | 1 | 1 | 1 |

*FIG. 32*

Table 7b. Sorted distribution of plus and minus measurements for normal and causal datasets where a faulty sensor or a faulty circuit produces atypical zero measured values.

| Dataset | n1 | n2 | n3 | n4 | n5 | n6 | n7 | n8 | n9 | n10 |
|---|---|---|---|---|---|---|---|---|---|---|
| highest value | 2 | 2 | 2 | 1 | 2 | 1 | 2 | 1 | 2 | 0 |
| next highest | 1 | 1 | 1 | 1 | 1 | 0 | 1 | 0 | 0 | 0 |
| third highest | 1 | 1 | 0 | 0 | 0 | 0 | 0 | 0 | 0 | 0 |
| ... | 0 | 0 | 0 | 0 | 0 | 0 | 0 | 0 | 0 | 0 |
| ... | 0 | 0 | 0 | 0 | 0 | 0 | 0 | 0 | 0 | 0 |
| ... | 0 | 0 | 0 | 0 | 0 | 0 | 0 | 0 | 0 | 0 |
| third lowest | -1 | 0 | 0 | 0 | 0 | 0 | 0 | 0 | 0 | 0 |
| second lowest | -1 | -1 | -1 | 0 | 0 | -1 | 0 | 0 | 0 | 0 |
| Lowest value | -2 | -1 | -1 | -2 | -1 | -2 | -1 | -2 | 0 | 0 |
| Mean | 0.0 | 0.2 | 0.1 | 0.0 | 0.2 | -0.2 | 0.2 | -0.1 | 0.2 | 0.0 |
| Median | 0.0 | 0.0 | 0.0 | 0.0 | 0.0 | 0.0 | 0.0 | 0.0 | 0.0 | 0.0 |
| Mode | 0.0 | 0.0 | 0.0 | 0.0 | 0.0 | 0.0 | 0.0 | 0.0 | 0.0 | 0.0 |
| SDEV | 1.2 | 1.0 | 0.9 | 0.9 | 0.8 | 0.8 | 0.8 | 0.8 | 0.7 | 0.0 |
| Mean-Median | 0.0 | 0.2 | 0.1 | 0.0 | 0.2 | -0.2 | 0.2 | -0.1 | 0.2 | 0.0 |
| Mean-Mode | 0.0 | 0.2 | 0.1 | 0.0 | 0.2 | -0.2 | 0.2 | -0.1 | 0.2 | 0.0 |
| (MAX-MIN)/(Mean-MIN) | 2.0 | 1.8 | 1.9 | 1.0 | 1.8 | 1.2 | 1.8 | 1.1 | 1.8 | 0.0 |
| MAX-MIN | 4.0 | 3.0 | 3.0 | 3.0 | 3.0 | 3.0 | 3.0 | 3.0 | 2.0 | 0.0 |
| Dataset Interpretation | Gaussian | Gaussian | Gaussian | Gaussian | Gaussian | Gaussian | Gaussian | Gaussian | Gaussian | Causal |
| Gaussian Attribute | 1 | 0 | 0 | 0 | 0 | 0 | 0 | 0 | 0 | 0 |
| Peaking Attribute | 0 | 0 | 0 | 0 | 0 | 0 | 0 | 0 | 0 | 0 |
| Friction Attribute | 0 | 0 | 0 | 0 | 0 | 0 | 0 | 0 | 0 | 0 |
| Circuit Fault Attribute | 0 | 0 | 0 | 0 | 0 | 0 | 0 | 1 | 1 | 1 |

*FIG. 33*

SELECTIVE DECIMATION AND ANALYSIS OF OVERSAMPLED DATA

RELATED APPLICATIONS

This application claims priority to provisional patent application Ser. No. 61/816,974, filed Apr. 29, 2013, titled Selective Decimation and Analysis of Oversampled Data, the entire contents of which are incorporated herein by reference.

FIELD

This invention relates to the field of machine performance and fault analysis. More particularly, this invention relates to the analysis of oversampled data from one or more dynamic transducers in sensory contact with a machine.

BACKGROUND

Modern machinery analyzers such as vibration analyzers commonly oversample dynamic digital data at a sampling rate many times greater than a maximum frequency ($F_{MAX}$) of data collection. Oversampled data is typically reduced to a desired frequency by either decimation filtering or peak value filtering. One or the other of these methods is commonly used to reduce oversampled data collected during a sampling interval to a single scalar value. With decimation filtering, the scalar value generally corresponds to machine vibration information. With peak value filtering, the scalar value generally corresponds to machine stress wave information. Peak value filtering is different from decimation filtering in that decimation filtering is a somewhat arbitrary rejection of oversampled data whereas peak value filtering is a somewhat selective rejection of oversampled data.

Oversampling and decimation filtering of a machine vibration signal to derive a scalar amplitude value for the machine vibration sensed during a sampling interval was first taught by Canada in U.S. Pat. No. 5,633,811. Peak value filtering (also referred to as "PeakVue™", a trademark of Computational Systems, Inc.) of oversampled machine vibration data to derive a scalar PeakVue™ value representing stress wave information was first described by Robinson in U.S. Pat. No. 5,895,857. PeakVue™ is different from decimation in that decimation is a somewhat arbitrary rejection of oversampled data whereas PeakVue™ is a somewhat selective rejection of oversampled data and PeakVue™ is performed on a rectified signal. Leigh (U.S. Pat. No. 7,493,230) teaches a form of digital decimation using "an averager to determine the arithmetic mean or root mean square (RMS) of the rectified samples."

Envelope techniques are different from decimation filtering and peak value filtering. Examples of envelope techniques include root mean squared (RMS), demodulation, short-time RMS (STRMS), Spectral Emission Energy (SEE™—a trademark of SKF Group), Spike Energy (also called gSE commonly cited by Entek IRD), and Shock Pulse Monitoring (SPM commonly cited by SPM Instruments). These envelope methods differ from peak value filtering and decimation filtering in that the envelope methods inherently have a knock-down smoothing or decay resulting in an envelope that does not include actual amplitudes of measured values.

Known techniques for trend analysis and compression of blocks of trend data, such as data collected using either on-line or walk-around condition monitoring devices, generally use a maximum value for each block, an average value for each block, and minimum value for each block. For example, each data point in a long-term trend may represent the minimum, maximum and average of 64 reported values. (See Reference Manual AMS™ Suite: Machinery Health™ Manager Online System Software Applications for the CSI 4500 Machinery Health™ Monitor, Part #97460.7, by Emerson Process Management (2007), page 3-53)

Prior art systems and methods incorporated by reference in their entirety herein include those described by Canada (U.S. Pat. No. 5,633,811), Robinson (U.S. Pat. No. 5,895,857 and U.S. Pat. No. 7,424,403), Piety (U.S. Pat. No. 5,965,819 and U.S. Pat. No. 5,943,634), Baldwin (US 2012/0041695), Leigh (U.S. Pat. No. 7,493,220) and Leigh (U.S. Pat. No. 8,219,361). Various embodiments of the present invention distinguish from all of these prior art techniques.

Table 1 below diagrammatically represents various applications where digital vibration signals are post-processed and decimated (columns labeled "post-processing" and "decimate"). Note that the table also represents analog signals, such as one from a piezoelectric accelerometer, which are typically transmitted to an analog preprocessing step (see "pre-process" column) before analog to digital conversion (see "digital signal" column). A digital signal is then post-processed and frequently decimated. Following the decimation step (or post-processing step if decimation is skipped), digital vibration signal information is analyzed, such as using AMS Machinery Health™ Manager software, and interpreted, such as by a vibration analyst using Machinery Health™ Manager software.

TABLE 1

Process for interpreting analog sensor signal information.

| | | Analog Signal | Pre-Process | Digital Signal | Post-Process | Decimate | Analyze | Interpret |
|---|---|---|---|---|---|---|---|---|
| I. | Analog Accelerometer | Yes | | | | | | |
| II. | Analog Vibration Data Collector | | Yes | Yes | Yes | Yes | | |
| III. | Analog Vibration Analyzer | | Yes | Yes | Yes | Yes | Yes | Yes |
| IV. | Computer Analyzer | | | | | | Yes | Yes |
| V. | Vibration Transmitter | Yes | Yes | Yes | Yes | Yes | Yes | Yes |
| VI. | Digital Accelerometer | Yes | Yes | Yes | Yes | Yes | | |
| VII. | Digital Vibration Analyzer | | | | | | Yes | Yes |

The steps outlined in Table 1 are most commonly performed using an analog accelerometer (I) in conjunction with an analog vibration data collector (II) or an analog vibration analyzer (III). Completion of analysis or further analysis of digital data streams from a data collector or from a vibration analyzer may be performed using a programmed computer analyzer.

For example, an analog piezoelectric accelerometer may be mounted on a machine to collect and translate mechanical vibrations into analog signals. That analog signal is typically transported in a cable as an analog voltage signal having a proportional value such as mV/g. The cable is also connected to a vibration analyzer, such as a CSI™ Model 2140 handheld analyzer or a CSI™ Model 6500 online analyzer. A handheld analyzer such as the CSI™ Model 2140 is often capable of analyzing and assisting an operator with interpreting vibration signal information. An online analyzer such as a CSI™ Model 6500 is often coupled to a personal computer programmed with vibration analysis software such as Machinery Health™ Manager software. The combined features of the online analyzer and the personal computer programmed with vibration analysis software enable an operator to analyze and interpret vibration signal information.

Vibration transmitters (V), such as a CSI™ Model 4100, and such as an analog transducer coupled with a CSI Model 9420 vibration transmitter, are designed and programmed to perform complete analysis and interpretation of analysis results. In order for self-contained, semi-autonomous devices like these to interpret results with no human analyst present, programmed logic firmware in a central processing unit typically supplants human interpretation of condition monitoring analyzed information.

A digital transducer such as a digital accelerometer (VI) typically includes an embedded analog accelerometer or MEMS sensor or other condition monitoring transducer. Pre-processing of analog signals, analog-to-digital conversion, post-processing of digital signals and decimation typically occur before digital waveforms or other digital data streams are transmitted by wired or wireless media to a receiving device, such as a computer analyzer (IV) or a programmed digital vibration analyzer (VII).

SUMMARY

A pervasive theme that differentiates various embodiments described herein from the prior art involves particular post-processing of digital signals, or application of a selective (e.g., not arbitrary) decimation technique, or both. The post-processing step and the decimation step listed in Table 1 may be accomplished in more than one way and in more than one location. Various embodiments described here may combine two or more of rows A to G in Table 1 as needed to derive machine condition information which begins as an analog dynamic signal and results in a final output in the form of an interpreted condition status or other meaningful interpretation.

Embodiments of the present invention provide a system for deriving useful and meaningful information through analysis of oversampled digital data that have generally been discarded in prior art systems. The various embodiments are applicable to oversampled data collected using dynamic signal analyzers, such as vibration analyzers, motor current signal analyzers, and motor flux analyzers, which may be implemented as handheld devices, on-line monitors, protection systems, and transmitters.

In addition to peak values and decimated values used in prior art systems, preferred embodiments of the present invention use other oversampled values that are associated with characteristics of the machine being monitored and the sensors and circuits that gather the data. This provides more useful information than has previously been derived from oversampled data within a sampling interval.

In some embodiments, machine or equipment condition information, transducer or sensor performance information, and electronic or circuit performance information is extracted from the oversampled digital data within each dynamic signal sampling interval. A sampling rate interval is $$\frac{1}{F_{SR}},$$

a sampling interval is $$\frac{1}{F_{MAX}},$$

and the number of data points within a sampling interval is $$\frac{F_{SR}}{F_{MAX}}.$$

For example when $F_{SR}=100$ kHz and $F_{MAX}=2$ kHz, there are 50 data points in one sampling interval.

Some embodiments described herein include programmed logic to automatically interpret a likelihood of causal (e.g., root cause) data within an oversampled dataset by at least one of the following techniques: (i) comparing a median with a mean, (ii) comparing a mode with a rectified minimum, (iii) comparing a mode with a rectified maximum, (iv) comparing a standard deviation with a difference between a maximum and a minimum or peak-to-peak, and (v) calculating a skewness or other statistical shape factor.

Some embodiments include programmed logic to distinguish causal data from Gaussian data and to assign a likely condition selected from the following list of conditions based on statistical evidence in one or a series of oversampled datasets: an impact, a sensor fault, a circuit fault, a machine operation, a noise, a steady condition, a random event, a systematic event, and a change in environment parameters. Note that environmental parameters can be a change of operational characteristics, basic materials, temperature, or crosstalk from a nearby machine.

In some embodiments, programmed logic operates on digitized accelerometer data to process oversampled digital datasets to simultaneously derive a waveform of mid-range values from a set comprising a median, a mean, an RMS, and a mode, and to derive a waveform of maximum range values from a set comprising a maximum, a minimum, a peak-to-peak maximum to minimum, and a rectified maximum.

Some embodiments include programmed logic operating on digitized accelerometer data to process oversampled digital datasets to simultaneously derive a waveform of statistical mid-range values from a set comprising a median, a variance, a skewness, a kurtosis and other statistical values.

In some embodiments, programmed logic simultaneously creates a median waveform and a rectified maximum waveform and subtracts the median waveform from the rectified maximum waveform to focus attention on peaking events that occur within each sample interval. This difference waveform can be further processed using FFT or autocorrelation to identify a characteristic frequency and amplitude for a fault such as an impacting fault.

Some embodiments include programmed logic to interpret a faulty sensor by analyzing oversampled data using statistical mode and minimum and maximum data collected within an oversampled sampling interval. These statistics may be compared over successive sampling intervals to detect a possible sensor fault, thereby avoiding a false machine trip due to a faulty sensor.

In some embodiments, programmed logic improves normal vibration measurements by segregating oversampled data due to stress wave from remaining oversampled data, and then reflecting the remaining portion when determining a normal vibration data value for a normal vibration waveform.

One embodiment provides a computerized method for assigning a Gaussian attribute or a not-Gaussian attribute to a sampling interval dataset of oversampled dynamic measurement data collected by sensory contact with a machine or a process. This method preferably includes the following steps:
  (a) determining a median value from the sampling interval dataset;
  (b) determining a mean value from the sampling interval dataset;
  (c) determining a difference value between the median value and the mean value for the sampling interval dataset;
  (d) comparing the difference value determined in step (c) to a threshold limit to determine a likelihood of whether the sampling interval dataset comprises Gaussian normal data or not-Gaussian normal data, wherein the difference value beyond the threshold limit indicates a likelihood of not-Gaussian normal data;
  (e) assigning a Gaussian attribute or a not-Gaussian attribute in association with the sampling interval dataset; and
  (f) decimating the sampling interval dataset to derive at least one scalar value within a series of scalar values comprising a dynamic measurement waveform; and
  (g) storing the Gaussian attribute or not-Gaussian attribute in association with the dataset or the waveform.

One embodiment provides a computerized method for decimating digital data derived from an analog signal generated by an analog sensor in sensory contact with a machine or a process. This method preferably includes the following steps:
  (a) converting the analog signal into an oversampled digital data stream;
  (b) pass filtering the oversampled digital data stream to obtain machine or process condition information;
  (c) partitioning the oversampled digital data stream into sampling interval datasets;
  (d) analyzing at least a portion of the sampling interval datasets to determine a dataset statistical attribute selected from the group consisting of a median value, a mode value, a standard deviation value, a maximum value, a range value, a minimum value, and a comparison value determined by comparing a value in the group with a mean value or a reference value;
  (e) decimating sequential sampling interval datasets analyzed in step (d) to produce a scalar value corresponding to each sampling interval dataset;
  (f) generating a waveform comprising the scalar values produced in step (e); and
  (g) saving the dataset statistical attribute in association with the waveform.

Various embodiments provide computerized methods for processing oversampled dynamic measurement data comprising a plurality of oversampled datasets collected by one or more sensors attached to a machine or process, where each oversampled dataset corresponds to a particular sampling interval. In a first embodiment, the method includes the following steps:
  (a) determining a plurality of standard deviation values, each standard deviation value derived from a corresponding one of the plurality of oversampled datasets;
  (b) determining a plurality of maximum values, each maximum value derived from a corresponding one of the plurality of oversampled datasets;
  (c) determining a plurality of minimum values, each minimum value derived from a corresponding one of the plurality of oversampled datasets;
  (d) determining a plurality of first difference values, each first difference value determined by determining a difference between the maximum value and the minimum value for the corresponding oversampled dataset;
  (e) determining a plurality of second difference values, each second difference value determined by determining a difference between the standard deviation value and the first difference value for the corresponding oversampled dataset;
  (f) comparing one or more of the second difference values determined in step (e) to a threshold value to determine a likelihood of whether the dynamic measurement data comprises causal data or Gaussian normal data, wherein second difference values greater than the threshold value indicate a likelihood of causal data; and
  (g) in situations in which the comparing step (f) indicates that the dynamic measurement data comprises causal data, assigning a condition that likely resulted in the causal data, wherein the condition is selected from the group consisting of an impact, a sensor fault, a circuit fault, a machine operation, a noise, a steady condition, a random event, a systematic event, and a change in environment parameters.

In a second embodiment, the computerized method for processing oversampled dynamic measurement data includes the following steps:
  (a) deriving a mid-range waveform comprising a plurality of mid-range values, wherein each of the plurality of mid-range values in the mid-range waveform is selected from a corresponding one of the plurality of oversampled datasets, wherein the plurality of mid-range values comprise a plurality of median values, a plurality of mean values, a plurality of RMS values or a plurality of mode values;
  (b) deriving a maximum-range waveform comprising a plurality of maximum-range values, wherein each of the plurality of maximum-range values in the maximum-range waveform is selected from a corresponding one of the plurality of oversampled datasets, wherein the plurality of maximum-range values comprise a plurality of absolute maximum values, a plurality of rectified maximum values, a plurality of minimum values, or a plurality of peak-to-peak maximum-to-minimum values;
  (c) deriving a statistical scatter waveform comprising a plurality of statistical scatter values, wherein each of the plurality of statistical scatter values in the statistical scatter waveform is selected from a corresponding one of the plurality of oversampled datasets, wherein the plurality of statistical scatter values comprise a plurality of variance values, a plurality of skewness values, or a plurality of kurtosis values;

(d) deriving a rectified maximum waveform comprising a plurality of rectified maximum values, wherein each of the plurality rectified maximum values in the rectified maximum waveform is selected from a corresponding one of the plurality of oversampled datasets; and (e) deriving a combined waveform by
adding values comprising one of the waveforms derived in steps (a) through (d) to corresponding values comprising another of the waveforms derived in steps (a) through (d), or
subtracting values comprising one of the waveforms derived in steps (a) through (d) from corresponding values comprising another of the waveforms derived in steps (a) through (d),
wherein the combined waveform represents peaking within the oversampled datasets.

In a third embodiment, the computerized method for processing oversampled dynamic measurement data includes the following steps:

(a) determining a plurality of mode values, each mode value based on a most frequently repeating value or value range occurring within a corresponding one of the plurality of oversampled datasets;

(b) determining a plurality of minimum values, each minimum value derived from a corresponding one of the plurality of oversampled datasets;

(c) determining a plurality of maximum values, each maximum value derived from a corresponding one of the plurality of oversampled datasets;

(d) determining a plurality of MODE–MIN difference values, each MODE–MIN difference value determined by determining a difference between the mode value and the minimum value for the corresponding oversampled dataset;

(e) determining a plurality of MAX–MODE difference values, each MAX–MODE difference value determined by determining a difference between the maximum value and the mode value for the corresponding oversampled dataset;

(f) determining that at least one of the one or more sensors is faulty if the MODE–MIN difference value is less than a predetermined threshold value over successive oversampled datasets; and (g) determining that at least one of the one or more sensors is in a saturated condition if the MAX–MODE difference value is less than a predetermined threshold value over successive oversampled datasets.

In a fourth embodiment, the computerized method for processing oversampled dynamic measurement data includes the following steps:

(a) determining a plurality of maximum values, each maximum value derived from a corresponding one of the plurality of oversampled datasets;

(b) determining one or more kurtosis momentum values based on the plurality of maximum values;

(c) determining a shape factor by subtracting an integer value three from at least one of the kurtosis momentum values;

(d) determining that the oversampled dynamic measurement data has a normal distribution when the shape factor equals zero;

(e) determining that the oversampled dynamic measurement data has a peaked distribution when the shape factor is greater than zero; and (f) determining that the oversampled dynamic measurement data has a flat distribution when the shape factor is less than zero.

In a fifth embodiment, the computerized method for processing oversampled dynamic measurement data includes the following steps:

(a) determining a plurality of mode values, each mode value based on a most frequently repeating value or value range occurring within a corresponding one of the oversampled datasets;

(b) determining a plurality of median values, each median value derived from a corresponding one of the oversampled datasets;

(c) determining a plurality of MODE–MED difference values, each MODE–MED difference value determined by determining a difference between the mode value and the median value for the corresponding oversampled dataset; and (d) determining that a stable measurement condition exists if an absolute value of one or more of the MODE–MED difference values is less than a predetermined threshold value over successive oversampled datasets.

In a sixth embodiment, the computerized method for processing oversampled dynamic measurement data includes the following steps:

(a) determining a plurality of median values, each median value derived from a corresponding one of the oversampled datasets;

(b) determining a plurality of maximum values, each maximum value derived from a corresponding one of the oversampled datasets; and (c) determining a plurality of crest factors, each crest factor determined based on a difference between the median value and the maximum value for the corresponding oversampled dataset.

In a seventh embodiment, the computerized method for processing oversampled dynamic measurement data includes the following steps:

(a) determining a plurality of maximum values, each maximum value derived from a corresponding one of the oversampled datasets;

(b) determining a plurality of minimum values, each minimum value derived from a corresponding one of the oversampled datasets;

(c) determining a plurality of MAX–MIN difference values, each MAX-MN difference value determined by determining a difference between the maximum value and the minimum value for the corresponding oversampled dataset;

(d) determining a plurality of standard deviation values, each standard deviation value derived from a corresponding one of the oversampled datasets;

(e) determining a plurality of SDV difference values, each SDV difference value determined by determining a difference between the standard deviation value and the MAX-MN difference value for the corresponding oversampled dataset; and (f) comparing one or more of the SDV difference values determined in step (e) to a threshold value to determine a likelihood of whether the dynamic measurement data comprises causal data or Gaussian normal data, wherein difference values greater than the threshold value indicate a likelihood of causal data.

In an eighth embodiment, the computerized method for processing oversampled dynamic measurement data includes the following steps:

(a) determining a plurality of maximum values, each maximum value derived from a corresponding one of the oversampled datasets;
(b) determining three or more values immediately before the maximum value for one or more of the oversampled datasets;
(c) determining determine three or more values immediately after the maximum value for one or more of the oversampled datasets;
(d) for one or more of the oversampled datasets, determining a peak shape factor characteristic based on the maximum value and the three or more values immediately before and the three or more values immediately after the maximum value; and
(e) based on the peak shape factor characteristics determined in step (d), determining a likely causal event associated with the maximum value.

In a ninth embodiment, the computerized method for processing oversampled dynamic measurement data includes the following steps:
(a) determining a plurality of maximum values, each maximum value derived from a corresponding one of the oversampled datasets;
(b) determining a plurality of standard deviation values, each standard deviation value derived from a corresponding one of the oversampled datasets;
(c) determining a plurality of parametric-versus-causal characteristics, each parametric-versus-causal characteristic derived from a corresponding one of the oversampled datasets;
(d) determining a plurality of peak shape factor characteristics, each peak shape factor characteristic derived from a corresponding one of the oversampled datasets; and
(e) based on the maximum values, standard deviation values, parametric-versus-causal characteristics, and peak shape factor characteristics, determining whether one or more of the following conditions exist:
a spall condition exists resulting from roller bearing component fatigue; and
a broken tooth condition exists resulting from fatigue failure of a gear component.

In a tenth embodiment, the computerized method for processing oversampled dynamic measurement data includes the following steps:
(a) determining a plurality of minimum values, each minimum value derived from a corresponding one of the oversampled datasets;
(b) determining a plurality of median values, each median value derived from a corresponding one of the oversampled datasets;
(c) determining a plurality of mode values, each mode value derived from a corresponding one of the oversampled datasets;
(d) determining a plurality of mean values, each mean value derived from a corresponding one of the oversampled datasets;
(e) determining a plurality of standard deviation values, each standard deviation value derived from a corresponding one of the oversampled datasets;
(f) determining a plurality of peak shape factor characteristics, each peak shape factor characteristic derived from a corresponding one of the oversampled datasets; and
(g) based on the minimum values, median values, mode values, mean values, standard deviation values, and peak shape factor characteristics, determining whether a sliding friction condition exists resulting from inadequate lubrication.

In an eleventh embodiment, the computerized method for processing oversampled dynamic measurement data includes the following steps:
(a) determining a plurality of median values, each median value derived from a corresponding one of the oversampled datasets;
(b) determining a plurality of mode values, each mode value derived from a corresponding one of the oversampled datasets;
(c) determining a plurality of mean values, each mean value derived from a corresponding one of the oversampled datasets;
(d) determining a plurality of standard deviation values, each standard deviation value derived from a corresponding one of the oversampled datasets;
(e) determining a plurality of peak shape factor characteristics, each peak shape factor characteristic derived from a corresponding one of the oversampled datasets; and
(f) based on the median values, mode values, mean values, standard deviation values, and peak shape factor characteristics, determining whether a smooth running condition exists resulting from proper lubrication.

In a twelfth embodiment, the computerized method for processing oversampled dynamic measurement data includes the following steps:
(a) determining a plurality of median values, each median value derived from a corresponding one of the oversampled datasets;
(b) determining a plurality of mean values, each mean value derived from a corresponding one of the oversampled datasets;
(c) determining a plurality of standard deviation values, each standard deviation value derived from a corresponding one of the oversampled datasets;
(d) determining a plurality of peak shape factor characteristics, each peak shape factor characteristic derived from a corresponding one of the oversampled datasets; and
(e) based on the median values, mean values, standard deviation values, and peak shape factor characteristics, determining whether a misalignment condition exists.

In a thirteenth embodiment, the computerized method for processing oversampled dynamic measurement data includes the following steps:
(a) determining a plurality of maximum values, each maximum value derived from a corresponding one of the oversampled datasets;
(b) determining a plurality of standard deviation values, each standard deviation value derived from a corresponding one of the oversampled datasets;
(c) determining a plurality of parametric-versus-causal characteristics, each parametric-versus-causal characteristic derived from a corresponding one of the oversampled datasets;
(d) determining a plurality of peak shape factor characteristics, each peak shape factor characteristic derived from a corresponding one of the oversampled datasets; and
(e) based on the maximum values, standard deviation values, parametric-versus-causal characteristics, and peak shape factor characteristics, determining whether subsurface fatigue cracks exist resulting from resonant vibration of a thermowell in process piping.

In a fourteenth embodiment, the computerized method for processing oversampled dynamic measurement data includes the following steps:
(a) determining a plurality of maximum values, each maximum value derived from a corresponding one of the oversampled datasets;
(b) determining a plurality of mean values, each mean value derived from a corresponding one of the oversampled datasets;
(c) determining a plurality of standard deviation values, each standard deviation value derived from a corresponding one of the oversampled datasets;
(d) determining a plurality of peak shape factor characteristics, each peak shape factor characteristic derived from a corresponding one of the oversampled datasets; and
(e) based on the maximum values, mean values, standard deviation values, and peak shape factor characteristics, determining whether slip-stick movements are occurring resulting from a coefficient of static friction being exceeded at a loaded interface.

In fifteenth embodiment, the computerized method for processing oversampled dynamic measurement data includes the following steps:
(a) determining at least one of:
  a plurality of minimum values, each minimum value derived from a corresponding one of the oversampled datasets;
  a plurality of median values, each median value derived from a corresponding one of the oversampled datasets;
  a plurality of mode values, each mode value derived from a corresponding one of the oversampled datasets;
  a plurality of standard deviation values, each standard deviation value derived from a corresponding one of the oversampled datasets; and
  a plurality of peak shape factor characteristics, each peak shape factor characteristic derived from a corresponding one of the oversampled datasets; and
(b) based at least in part on the values determined in step (a), determining whether one or more of the following conditions exist:
  occurrence of a partial discharge in vicinity of a high-voltage electrical apparatus; and
  occurrence of a leaking condition that produces fluid turbulence in vicinity of a leaky orifice under pressure.

In a sixteenth embodiment, the computerized method for processing oversampled dynamic measurement data includes the following steps:
(a) determining at least one of:
  a plurality of median values, each median value derived from a corresponding one of the oversampled datasets;
  a plurality of mode values, each mode value derived from a corresponding one of the oversampled datasets;
  a plurality of standard deviation values, each standard deviation value derived from a corresponding one of the oversampled datasets; and
  a plurality of peak shape factor characteristics, each peak shape factor characteristic derived from a corresponding one of the oversampled datasets; and
(b) based on the values determined in step (a), determining whether an intermittent fault condition exists in a three-phase electrical power line.

In a seventeenth embodiment, the computerized method for processing oversampled dynamic measurement data includes the following steps:
(a) for one or more of the oversampled datasets, generating multiple scalar values representative of the dynamic measurement data within the dataset;
(b) based on the multiple scalar values, determining one or more characteristic values indicative of a feature, quality or characteristic of the dynamic measurement data within the dataset; and
(c) saving the multiple scalar values and the one or more characteristic values in association with an identifier for the dataset in computer storage.

In an eighteenth embodiment, the computerized method for processing oversampled dynamic measurement data includes the following steps:
(a) determining a plurality of first statistical scalar values, each first statistical scalar value derived from a corresponding one of the plurality of oversampled datasets;
(b) determining based on one or more of the first statistical scalar values that the machine or process is in a first state and not in a second state;
(c) determining a plurality of second statistical scalar values, each second statistical scalar value derived from a corresponding one of the plurality of oversampled datasets; and
(d) determining based on one or more of the second statistical scalar values that the machine or process is in the second state and not in the first state.

One embodiment provides a computerized method for mitigating aliasing effects in frequency transformations of oversampled dynamic measurement data comprising a plurality of oversampled datasets collected by one or more sensors attached to a machine or process, where each oversampled dataset corresponds to a particular sampling interval. The method preferably includes the following steps:
(a) for one or more of the oversampled datasets, sorting data values from minimum to maximum to form a sorted cumulative data distribution; and
(b) for one or more of the oversampled datasets, determining a median value to be an average of two or more data values immediately above and below an absolute median of the sorted cumulative data distribution.

One embodiment provides a computerized method for avoiding aliasing while processing oversampled dynamic measurement data collected by one or more sensors attached to a machine or process. In this method, the oversampled dynamic measurement data is sampled at a sampling rate of $F_S$. Performance of a nonlinear process involving decimation on the oversampled dynamic measurement data would otherwise cause aliasing. The method preferably includes the following steps:
(a) up-sampling the oversampled dynamic measurement data at an integer up-sampling rate N by inserting N−1 zeros between adjacent data samples in the oversampled dynamic measurement data, thereby generating up-sampled data;
(b) removing any spectral images created in step (a) by low-pass filtering the up-sampled data using a low-pass filter having a cutoff frequency of $$\frac{F_S}{2},$$

where L is an integer that is greater than or equal to 1, thereby generating low-pass-filtered up-sampled data having no spectral images above $$\frac{F_S}{2};$$

(c) if N<L and L>1, which indicates a fractional resample rate, down-sampling the low-pass-filtered up-sampled data by retaining every Lth sample and discarding L−1 samples between each Lth sample, thereby generating low-pass-filtered down-sampled data free of spectral images at an up-sampling frequency of $F_s \times (N/L)$;

(d) performing the nonlinear process involving decimation on the low-pass filtered up-sampled data, thereby generating data having distortion components aliased above $$\frac{F_S}{2};$$

(e) filtering the data generated in step (d) using a low-pass filter having a cutoff frequency of $$\frac{F_S}{2},$$

thereby generating data in which aliased components above $$\frac{F_S}{2}$$

are removed; and (f) down-sampling the data generated in step (e) by retaining every Nth sample and discarding N−1 samples between each Nth sample, thereby generating post-nonlinear-processing data in which aliasing effects are mitigated.

One embodiment provides a computerized method for collecting oversampled dynamic measurement data over an extended period of time at a fixed sampling frequency. The oversampled dynamic measurement data comprises a plurality of oversampled datasets collected by one or more sensors attached to a machine or process, where each oversampled dataset corresponds to a particular sampling interval. The method preferably includes the following steps:

(a) during a first period within the extended period of time, collecting the dynamic measurement data using a first sampling interval $$\frac{1}{F_{SR1}},$$

resulting in a first number of samples in each oversampled dataset collected during the first period; and (b) during a second period within the extended period of time, collecting the dynamic measurement data using a second sampling interval $$\frac{1}{F_{SR2}}$$

that is longer in duration than the first sampling interval $$\frac{1}{F_{SR1}},$$

resulting in a second number of samples in each oversampled dataset collected during the second period, wherein the second number of samples is greater than the first number of samples.

One embodiment provides a computerized method for collecting and processing oversampled vibration data collected by a plurality of vibration sensors attached to a mechanical structure used in the processing of a material. The mechanical structure is operable to transmit vibrational energy from the material to the vibration sensors. The oversampled vibration data comprises a plurality of oversampled datasets, where each oversampled dataset corresponds to a particular sampling interval. The method preferably includes the following steps:

(a) receiving vibrational energy at a first vibration sensor of the plurality of vibration sensors, wherein the vibrational energy was generated by an event that occurs within the material being processed and travelled through the mechanical structure to the first vibration sensor;

(b) the first vibration sensor generating a first vibration signal based on the vibrational energy;

(c) oversampling the first vibration signal to generate first oversampled vibration data comprising a plurality of first oversampled datasets;

(d) for each of a plurality of first oversampled datasets, determining one or more first scalar values selected from the group consisting of a maximum value, a minimum value, a mean value, a median value, a mode value, a standard deviation value, a maximum-to-minimum range value, a kurtosis value, a skewness value, and a wavelength value;

(e) based on the one or more first scalar values, determining one or more first characteristic values that provide an indication of an event type;

(f) generating a first timestamp value representative of a time at which the vibrational energy generated by the event was received at the first vibration sensor;

(g) receiving the vibrational energy at a second vibration sensor of the plurality of vibration sensors, wherein the vibrational energy travelled through the mechanical structure to the second vibration sensor;

(h) the second vibration sensor generating a second vibration signal based on the vibrational energy;

(i) oversampling the second vibration signal to generate second oversampled vibration data comprising a plurality of second oversampled datasets;

(j) for each of a plurality of second oversampled datasets, determining one or more second scalar values selected from the group consisting of a maximum value, a minimum value, a mean value, a median value, a standard deviation value, a maximum-to-minimum range value, a kurtosis value, a skewness value, and a wavelength value;

(k) based on the one or more second scalar values, determining one or more second characteristic values that provide an indication of the event type;

(l) generating a second timestamp value representative of a time at which the vibrational energy generated by the event was received at the second vibration sensor; and (m) comparing the one or more first characteristic values to the one or more second characteristic values to determine that the event type indicated by the one or more first characteristic values is the same event type as indicated by the one or more second characteristic values.

One embodiment provides a computerized method for collecting and processing machine vibration data in a machinery protection system for the purpose of automatically triggering a shutdown of a machine. The machine vibration data is collected by one or more vibration sensors attached to the machine. The method preferably includes the following steps:

(a) oversampling the machine vibration data at a sampling rate that is substantially greater than a Nyquist frequency;

(b) processing oversampled digital data;

(c) generating a sequence of oversampled digital datasets;

(d) for one or more of the oversampled digital datasets, generating a scalar value or an attribute representative of the machine vibration data within the dataset based at least in part on a group of selective decimation values comprising a median value, a maximum value, a minimum value, a standard deviation value, and a peak shape factor value; and (e) based at least in part on the scalar value or attribute determined in step (d), deriving a characteristic of the machine or a characteristic of the method used to collect the machine vibration data.

One embodiment provides a computerized method for collecting and processing motor current data using one or more current sensors. The method preferably includes the following steps:

(a) measuring analog motor current signature information using the one or more current sensors;

(b) converting the analog motor current signature information into oversampled digital motor current data at a sampling rate of at least ten times a line frequency;

(c) generating a sequence of oversampled datasets from the oversampled digital motor current data, each oversampled dataset corresponding to a sampling interval;

(d) decimating the oversampled datasets to derive decimated scalar values;

(e) selectively decimating the oversampled datasets to derive corresponding attributes based on a dataset characteristic selected from the group consisting of median, Kurtosis, maximum, minimum, standard deviation, and peak shape factor; and (f) relating the decimated scalar values determined in step (d) and the attributes determined in step (e) to a characteristic of the motor current data.

One embodiment is directed to an apparatus for collecting and processing machine or process vibration data. The apparatus includes a vibration sensor attached to a machine that generates an one analog vibration signal having a maximum frequency of interest, $F_{MAX}$, which is greater than an event frequency of events occurring in the machine or the process. The apparatus also includes an analog-to-digital converter for oversampling the analog vibration signal at a sampling rate of at least seven times $F_{MAX}$ to generate multiple oversampled datasets, each corresponding to a particular sampling interval. The apparatus includes a decimation module comprising multiple parallel field programmable gate arrays (FPGAs). A first FPGA receives the oversampled datasets and determines a first scalar value from each oversampled dataset. The first scalar may be a maximum value, a minimum value, a median value, a mode value, a mean value, a standard deviation value, a parametric-versus-causal value, an operational condition value, or a peak shape factor value. A second FPGA receives the oversampled datasets and determines a second scalar value from each oversampled dataset that is different from the first scalar value. The second scalar may be a maximum value, a minimum value, a median value, a mode value, a mean value, a standard deviation value, a parametric-versus-causal value, an operational condition value, or a peak shape factor value.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein:

FIG. 28 depicts Table 4 according to an embodiment of the invention.

FIG. 29 depicts Table 5a according to an embodiment of the invention.

FIG. 30 depicts Table 6a according to an embodiment of the invention.

FIG. 31 depicts Table 6b according to an embodiment of the invention.

FIG. 32 depicts Table 7a according to an embodiment of the invention.

FIG. 33 depicts Table 7b according to an embodiment of the invention.

DETAILED DESCRIPTION

Abbreviations

Figure 1:
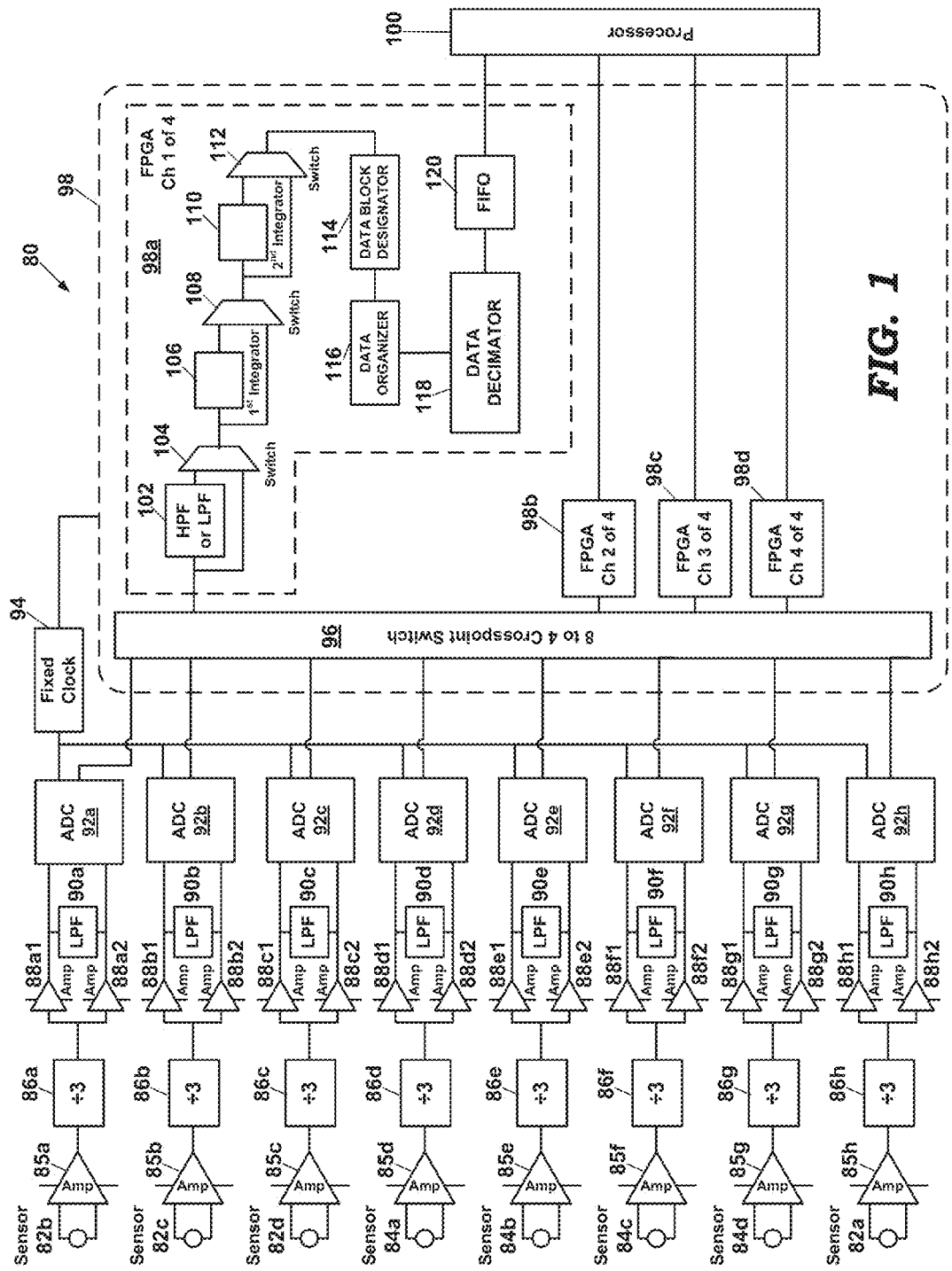
FIG. 1 depicts an apparatus for collecting and analyzing machine data according to an embodiment of the invention.

Following are some abbreviations used in the description of embodiments of the invention.

AVE—a mean value type of measurement such as an average value.

MAX—an absolute largest peak value or an average of two or three actual or absolute largest values that represent a maximum value.

MAX–MIN—a range characteristic typically expressed as a difference between a maximum and a minimum value.

MED—a median value, also called a 50th percentile value within a cumulative distribution.

MIN—an absolute smallest value or an average of two or three actual or absolute smallest values that represent a minimum value.

MODE—a mode value type of measurement such as a most common value or a most common narrow range of values from an overall range of values within a sampling interval.

OPC—an operational condition of a sensor or a circuit.

Oversampled data—dynamic digital data that has been oversampled at a sampling rate many times greater than a maximum frequency ($F_{MAX}$) of data collection.

PeakVue™—a characteristic typically associated with a selected peak-hold value during a sampling interval and typically including a full-wave rectification step before the peak-hold step or another technique for determining a peak value from measured values within a sampling interval.

Percentile—a position associated with a cumulative distribution or a probability density distribution where values have been sorted from lowest (0%) to highest (100%) and a value at a position such as 1st, 3rd, 5th, 10th, $50^{th}$ (e.g., MED), 90th, 95th, 97th, 99th percentile may have a significance for selective decimation.

PSF—a peak shape factor characteristic.

PvC—a parametric vs. causal characteristic wherein parametric is in statistical control with a well-behaved two-tale distribution and causal is statistically not in control with expected "cause" and often a one-tail distribution, also often associated with a skewness or a kurtosis characteristic.

RMS—a root mean squared characteristic.

SDV—a statistical scatter type of measurement such as a standard deviation.

Sk—a skewness characteristic

Smax—a maximum excursion of the kinetic orbit as defined by ISO 7919.

SopMax—a maximum vibratory displacement as defined by ISO 7919.

SppMax—a maximum vibration displacement value as defined by ISO 7919.

SPC—Statistical Process Control often associated with a parametric, Gaussian normal population distribution.

Embodiments of the present invention advance the state of the art by analyzing oversampled data to retrieve useful information qualifying the measurement, the sensor, and the circuit before discarding the oversampled data. An important new piece of information provided by embodiments of the present invention is distinguishing root cause data from normal vibration data. A root cause or "causal" dataset is statistically distinguished from a normal or Gaussian dataset, for example by using a difference comparison between mean and median or by a shape factor analysis of an oversampled dataset. Detection of high frequency stress waves produced by impacting using PeakVue™ is one example of causal data because the event typically happens briefly within a sample interval. Normal vibration, such as that produced by machine imbalance, is more likely Gaussian data because it is spread over many sampling intervals on each shaft revolution. On the other hand, friction vibration caused by an inadequate lubrication condition is likely to register a high PeakVue™ reading from beginning to end of sample intervals.

A significant advantage provided by embodiments of the present invention involves the capture of a median or "middle" value for each oversampled dataset. This median value is a solid representative for the normal vibration taking place during the sampling interval. It can be easily compared to a mean value to determine causal vs. Gaussian data. Furthermore, it is reasonable to simultaneously process an oversampled dataset to yield a rectified median and rectified maximum as well as non-rectified scalar values which may be interpreted and discarded or retained for further display, analysis, and interpretation.

In various embodiments, steps are taken to mitigate aliasing effects observed in frequency transformation whereby a bandwidth reduction technique such as decimation is preceded with low pass filtering before frequency transformation. In a case where a selective decimation technique such as median of oversampled data has a potential for finding alias information, an averaging step may be included for muting alias contribution. For example rather than taking a single median value from a sorted cumulative distribution for a median value, three values may be averaged together at the middle of a sorted cumulative distribution.

The process of selectively decimating based on statistical metrics is a non-linear process that creates distortion. When the distortion contains frequency components higher than the Nyquist frequency ($F_S/2$), these components alias back into the spectrum from 0 to $F_S/2$ Hz, and thus contaminate the spectral purity. The frequency at which these components alias back is the "folding frequency." A novel approach to preserve the spectral purity from 0 to $F_S/2$ Hz is to perform a preprocessing step before the non-linear process to extend the folding frequency and create more spectral headroom for the non-linear distortion components to populate before aliasing back into the region from 0 to $F_S/2$ Hz. A similar technique is used in the audio processing field to digitally model non-linear distortions created by high gain guitar amplifiers as described in U.S. Pat. No. 5,789,689 (the '689 patent), the entire contents of which are incorporated herein by reference. The '689 patent defines the preprocessing as an "ubersampling" technique in which the captured data is resampled at a higher rate, defined by a rational integer ratio (N/L), where N is the integer up-sample rate and L is the integer down-sample rate. To perform ubersampling the data is first up-sampled by the factor N by inserting N−1 zeros between each pair of input samples. If a down-sample rate L greater than 1 is defined, the up-sampled data is low pass filtered with a filter that has a cutoff near $((F_S/2)*N)/L$ and every Lth sample is retained and L−1 samples in between are discarded. The effect of this operation in the frequency domain is a spectrum with the same spectral components as the original signal over the original bandwidth, but with images of the original spectrum at multiples of the original sampling rate. To ensure that the original signal is not corrupted by these images, all frequencies greater than $F_S/2$ are removed with a low pass filter with a cutoff at $F_S/2$. The resulting spectrum after filtering is the same as the original spectrum from 0 to $F_S/2$ Hz, but now contains a region with no spectral components (dead band) from $F_S/2$ to $F_S/2*(N/L)$. This dead band acts as spectral storage bins for the high frequency non-linear components that will be generated from selective decimation. The new folding frequency is now N/L higher than the original spectrum. Depending on the severity of the distortion generation, the ubersampling rate can be increased to ensure that there is sufficient spectral headroom to contain the distortion components before aliasing back into the region from 0 to $F_S/2$ which would degrade the spectral purity. After completing the non-linear process, the ubersampled data is converted back into the original bandwidth by performing the process in reverse by filtering with a low pass filter at $F_S/2$, then down-sampling at a ratio equal to the reciprocal of the ubersampling rate. As an example, assume a ratio of N=2 and L=1 which yields an effective ubersampling rate of 2. If the sample rate is 50 kHz, the original folding frequency is at $F_S/2=25$ kHz. After up-sampling by a rate of two and low pass filtering at 25 kHz, the result is a spectrum that is the same as the original, but with additional spectral headroom that extends from 25 kHz to 50 kHz and with a new folding frequency of 50 kHz. If the non-linear process generates components greater than the original folding frequency of 25 kHz, these can be treated as aliased components in the original spectra. However, after using the ubersampling method with an ubersampling rate of 2, the highest frequency component (aliasing limit (AL)) before aliasing occurs is now 75 kHz. The aliasing limit can be computed by $AL=F_S((N/L)-0.5)$.

Embodiments of the present invention provide programmable logic for deriving useful, meaningful information through analysis of the previously discarded oversampled digital data collected using dynamic signal analyzers such as vibration analyzers. The embodiments are applicable to multiple dynamic signal analyzers including but not limited to vibration analyzers, motor current signal analyzers, and motor flux analyzers, which may be implemented on hand-held devices, on-line monitors, protection systems, transmitters, and systems to which one or more of these are associated.

Preferred embodiments extract machine or equipment condition information, transducer or measuring sensor performance information, and electronic or circuit performance information from the oversampled digital data within each dynamic signal sampling interval. An oversampled sampling interval may be expressed as $1/F_{SR}$, a dynamic sampling interval may be expressed as $1/F_{MAX}$, and a number of data points within a dynamic sampling interval may be expressed as $F_{SR}/F_{MAX}$, where $F_{SR}$ is the oversampled sample rate and $F_{MAX}$ is the dynamic sample rate. For example, when $F_{SR}=100$ kHz and $F_{MAX}=2$ kHz, there exist 50 oversampled data points per dynamic sampling interval.

Figure 4:
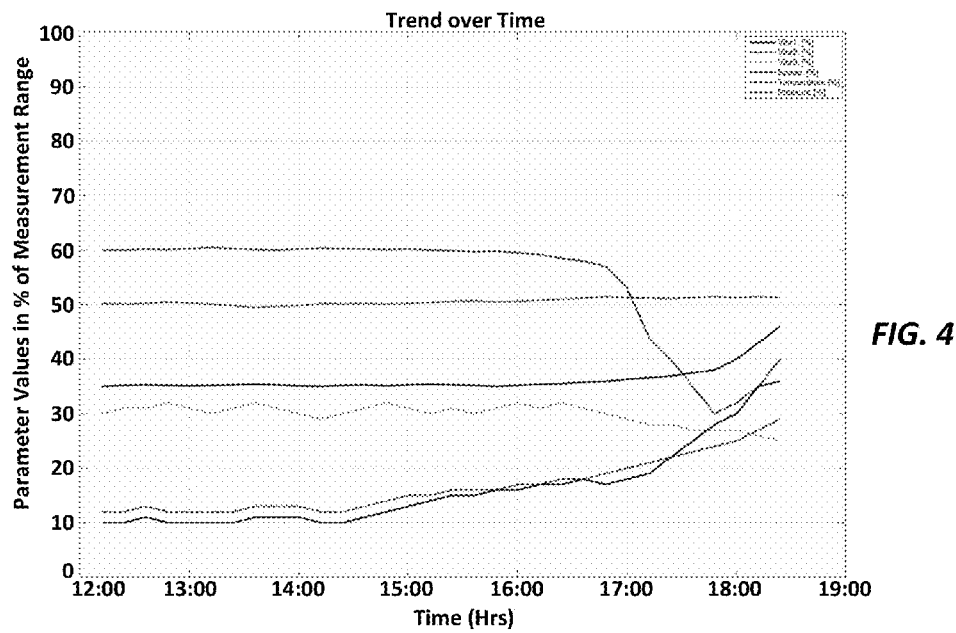
FIG. 4 depicts a plot of time-synchronized trend data.

In addition to a peak value and decimated value, preferred embodiments of the present invention use other oversampled values extracted and associated with characteristics of equipment, sensor, and circuit to provide more useful information than has previously been derived from oversampled data within a sampling interval Some embodiments of the present invention improve trend data analysis. One approach to improving trend analysis is to use selective decimation information to visualize or analyze a selective decimation characteristic during a time waveform. The resulting information may be interpreted using either programmed logic or human logic or both to seek and identify a pattern, such as a fault pattern trend. It is sometimes helpful to also look for patterns that may be correlated or otherwise related to machine states, to process parameters and to other vibration interactions. FIG. 4 shows a trend plot example. Although this is a graphical plot that may be provided for human interpretation, an analysis and interpretation of such time synchronized trend data and associated information may be accomplished using programmed logic.

A cumulative distribution or a probability density distribution is sometimes applied in selective decimation. All of the scalar values produced during a sampling interval may be sorted from lowest to highest to effectively represent a cumulative distribution or a probability density distribution for a sampling interval dataset. In some embodiments, one or more relationship attributes may be assigned to scalar values such as a sequence number reflective of a sequential position or timing associated with a measured value within a sampling interval. Each of the following subsections discusses measurements which may be performed on each sample interval within the oversampled waveform. Examples of many of these measurements are included.

FIG. 1 depicts a preferred embodiment of a multi-channel machine vibration measurement apparatus 80 that collects and processes oversampled digital data. In this embodiment, an analog front end includes eight input sensors 82a-82d and 84a-84d. Although the invention is not limited to any particular type of sensor, the sensors 82a-82d are preferably accelerometers and the sensors 84a-84d are preferably voltage sensors. After each of the sensors 82a-82d and 84a-84d, the analog signal chain includes a differential amplifier 85a-85h, a divide-by-3 circuit 86a-86h, differential amplifier pairs 88a1-88h1 and 88a2-88h2, and low pass filters 90a-90h. These eight analog sensor channels are provided to the inputs of eight 24-bit sigma-delta analog-to-digital converters (ADC's) 92a-92h whose sampling rates are dictated by a fixed clock 94.

An eight-to-four cross-point switch 96 provides for switching any one of the eight channels at the outputs of the ADC's 92a-92h to any one of four digital processing channels 98a-98d of a digital signal processor 98, which in one preferred embodiment is an FPGA. In FIG. 1, the FPGA channel 98a is depicted in detail. In the preferred embodiment, the components of the channels 98b, 98c, and 98d are identical to the components of the channel 98a. The FPGA channel 98a includes a pass filter module 102 that may comprise a high-pass filter, a low-pass filter, or a band-pass filter, a first integrator module 106, a second integrator module 110, a data block designator module 114, a data organizer module 116, a data decimator module 118, and a FIFO 120. The output of the FIFO 120 is provided to a processor 100.

In a preferred embodiment, the pass filter 102 is high-pass filter that removes the DC component of the signal at its input. The switch 104 provides for bypassing the high-pass filter 102 for those applications in which the DC bias of a signal needs to be measured.

The first integrator 106 provides for integrating an acceleration signal to convert it into a velocity signal. In a preferred embodiment, the first integrator 106 is an infinite input response (IIR) integrator. In alternative embodiments, the first integrator 106 may implement other integrator schemes which use other integration algorithms. The switch 108 provides for bypassing the first integrator 106 for those applications in which the first stage of integration is not desired.

The second integrator 110 provides for integrating a velocity signal to convert it into a position signal. In a preferred embodiment, the second integrator 110 is an IIR integrator that is structurally and functionally equivalent to the first integrator 106. In alternative embodiments, the second integrator 108 may implement other integrator schemes that use other integration algorithms. The switch 112 provides for bypassing the second integrator 110 for those applications in which the second stage of integration is not desired. For example, the second integrator 110 may be bypassed when only the first integrator 106 is needed to convert acceleration to velocity. Both integrators 106 and 110 may be bypassed when the desired output is acceleration. Both integrators 106 and 110 may be used when the desired output is displacement.

In some embodiments, one or both of the integrators 106 and 110 in at least one of the FPGA channels 98a-98d are operable to perform a double integration of the vibration signal at its input. For example, the first integrator 106 may receive an acceleration signal and perform a double integration to provide a displacement signal at its output. In this embodiment, the second integrator 110 may be bypassed using the switch 112 so that the data block designator module 114 receives the displacement signal from the first integrator 106. In an alternative embodiment, the first integrator 106 may be bypassed using the switch 108 so that the second integrator 110 receives an acceleration signal, and the second integrator 110 performs a double integration to provide a displacement signal at its output. In yet another embodiment, at least one of the FPGA channels 98a-98d includes only a single integrator that receives an acceleration signal and performs a double integration to provide a displacement signal at its output.

The data block designator module 114 designates blocks of oversampled data for individual sampling intervals, as described in more detail hereinafter.

The data organizer module 116 organizes a sampling interval dataset, as described in more detail hereinafter.

Figure 15:
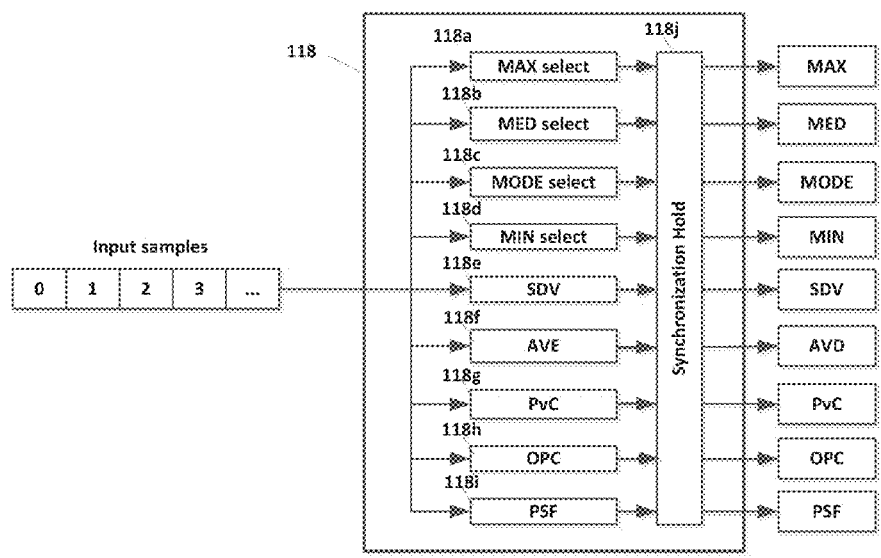
FIG. 15 depicts a parallel processing scheme implemented in a decimation processor according to an embodiment of the invention.

The data decimator module 118 determines the dataset characteristic values, such as MAX, MED, MIN, AVE, SDV, PvC, OPC, and PSF. In some embodiments, the data decimator module 118 decimates the oversampled data by splitting the signal into multiple parallel processing/circuit paths as shown in FIG. 15, or by compiling multiple values, such as a MAX value and a MED value, in a single process or by performing some steps in sequence and other steps in parallel. Implementations of the data decimator module 118 using field programmable gate arrays (FPGAs) are particularly advantageous for parallel or sequential processing of multiple values extracted from oversampled data.

The FIFO 120 allows the FPGA 98 to generate vibration data in real time while allowing the processor 100 to access the data asynchronously.

The processor 100 receives the vibration signal data from each of the four FPGA channels 98a-98d and performs one or more vibration analysis functions, such as time domain waveform analysis, averaging analysis, cross channel analysis, FFT spectral analysis, phase analysis, autocorrelation analysis and data distribution analysis. The processor 100 also handles user interface and display functions. In alternative embodiments, some or all of the functions performed by the processor 100 may be performed by the FPGA 98.

In a preferred embodiment of the system of FIG. 1, the ADC's 92a-92h are very high quality 24-bit sigma-delta converters. The latest generation of these ADC's have dynamic ranges of greater than 120 dB and signal-to-noise ratios greater than 110 dB. With this much dynamic range, the entire voltage input range can be acquired with sufficiently high resolution to eliminate the need for gain amplifiers and AC coupling amplifiers. Because the large dynamic range of the ADC's 92a-92h provides for resolving small AC signals superimposed on large DC offsets, sensor output signals can be directly coupled to the ADC's, and DC components can be removed by real-time digital filtering in the FPGA 98.

Figure 2:
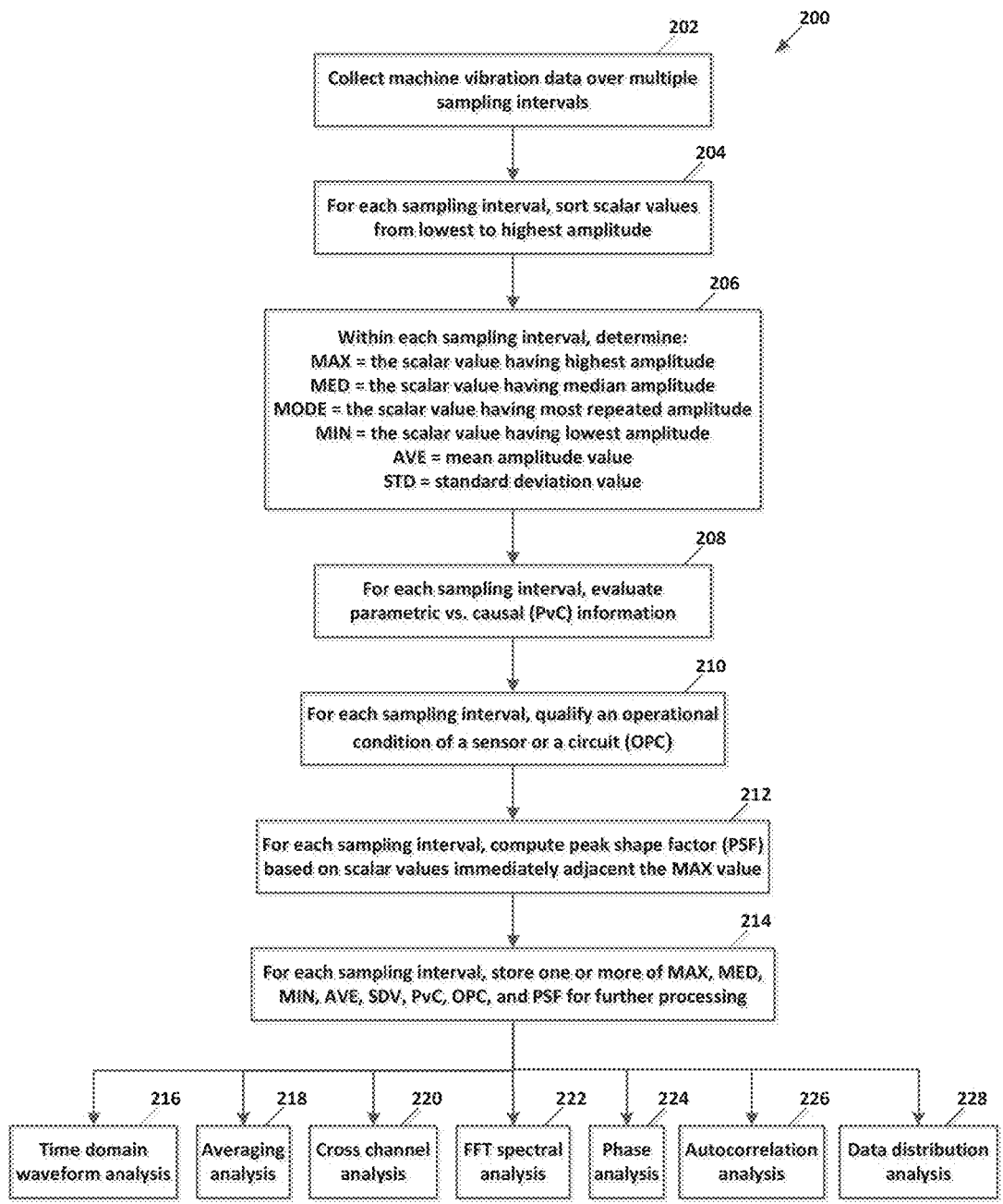
FIG. 2 depicts a method for collecting and analyzing machine data according to an embodiment of the invention.

FIG. 2 depicts a preferred embodiment of a method 200 for collecting and analyzing oversampled machine vibration data using a machine vibration measurement apparatus as shown in FIG. 1. First, the machine vibration data is collected over multiple sampling intervals (step 202). For each sampling interval, all of the scalar values are sorted from lowest amplitude to highest amplitude, which effectively represents a cumulative distribution or probability density distribution for the sampling interval dataset (step 204). In some embodiments, the scalar values of data within a sampling interval dataset may be full-wave-rectified by taking an absolute value before sorting as is commonly done with PeakVue and other peak detection techniques. In some embodiments, positive and negative values are sorted from lowest to highest. In some embodiments, one or more relationship attributes may be assigned to various scalar values, such as a sequence number reflective of a sequential position or timing associated with a measured value within a sampling interval. For each sampling interval, several scalar values are determined, stored and processed as described in more detail hereinafter.

Figure 5:
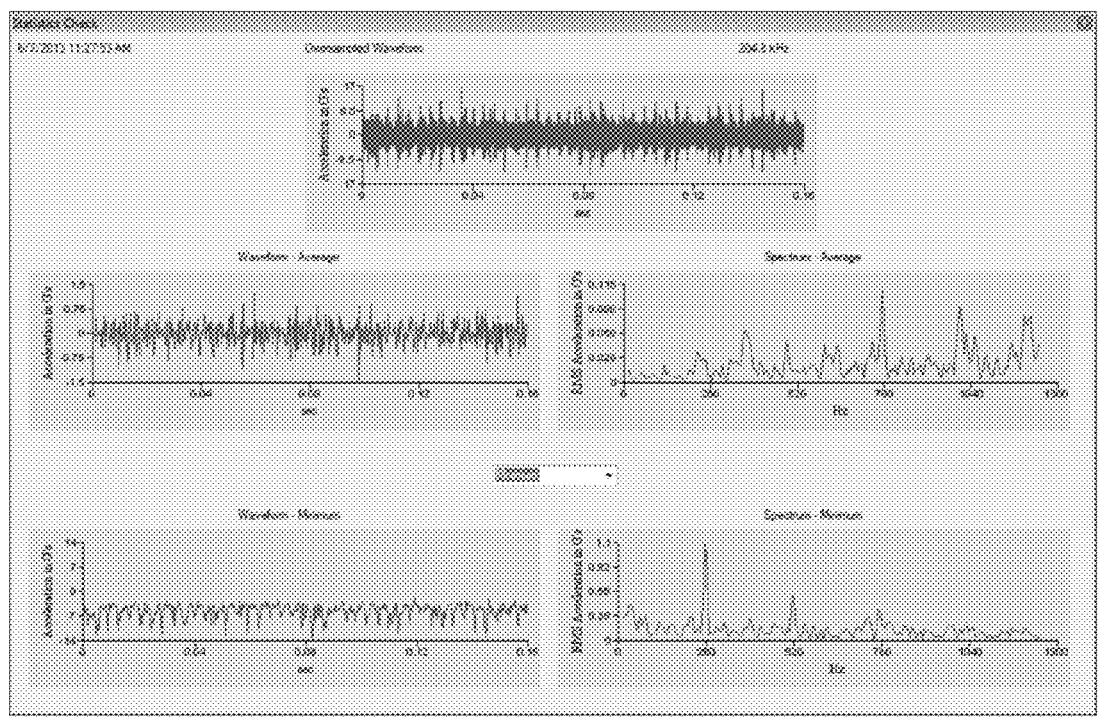
FIG. 5 depicts an example of a vibration data display window generated by an embodiment of the invention.

FIG. 5 depicts an example of a vibration data display window generated by an embodiment of the invention. In FIG. 5, the unprocessed, oversampled waveform is displayed at the top of the window. Beneath that, a decimated waveform created by taking the average of the values in each interval is displayed along with the spectrum corresponding to it. The selector beneath the average decimated waveform and spectrum permits the user to select various measurements to be used during decimation. As a selection is made, a decimated waveform of the selected measurement of each interval is displayed accompanied by the corresponding spectrum.

Figure 6:
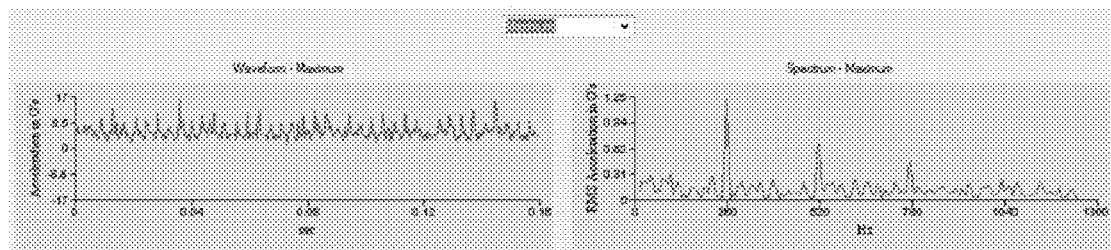
FIG. 6 depicts a display of a MAX time-domain waveform and spectrum data generated by an embodiment of the invention.

A peak-hold type of measurement, such as a maximum value (MAX), is determined that represents one absolute largest peak amplitude value or average of two or three of the absolute largest peak values in the sampling interval dataset (step 206 in FIG. 2). The MAX value may be used for further PeakVue™ processing in waveforms, spectra, or other transformation. An example display of a MAX time-domain waveform and spectrum data generated by an embodiment of the invention is depicted in FIG. 6.

MAX may be used for further PeakVue™ processing in waveforms, spectra, or other transformation. A peak-hold measure of oversampled data is typically received on very high frequency sampling rate data, e.g., >>20 kHz. Much of the time these high frequency measurements reflect characteristics of stress wave information such as compression or shear wave information resulting from roller bearing defect impacts under roller-to-race loading, or resulting from gear tooth defect impacts under mesh loading. On the other hand, in situations wherein sampling rates are relatively lower, such as in a frequency range where one may find mechanical resonances for structures being measured, a peak-hold or traditional PeakVue™ measurements may also reveal much information about mechanical motions of the structure, not just stress wave information. Program logic or human interpretation may be used to interpret these differences and extrapolate deductive information. An embodiment of the present invention is an application of kurtosis momentum alongside MAX to reinforce or refute a causal aspect indicative of a root cause. This is one of many examples of logic of the present invention which may be taught to an operator or may be applied using programmed logic and displayed to an operator or used to trigger an automatic function such as a warning indicator or a trip function affecting or guiding a machine operation.

Figure 7:
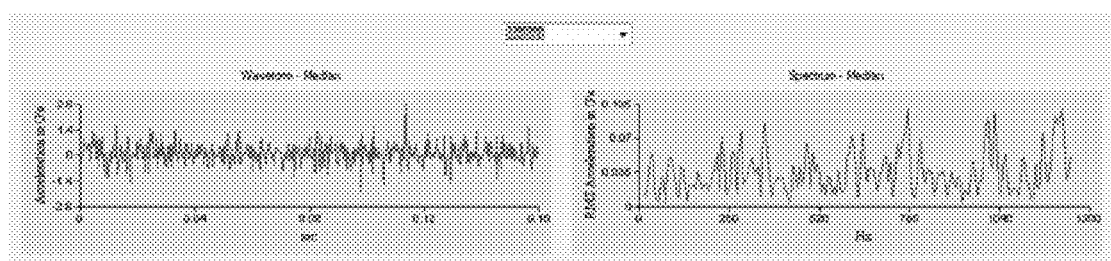
FIG. 7 depicts a display of a MED time-domain waveform and spectrum data generated by an embodiment of the invention.

A middle value type of measurement, such as a Median Value (MED), is determined to represent an absolute single middle value or average of two or three absolute middle values in the sampling interval dataset. An example display of a MED time-domain waveform and spectrum data generated by an embodiment of the invention is depicted in FIG. 7. The MED value may be used for normal vibration processing much like an RMS value in waveforms, spectra or other transformation. Processing of the MED value is a significant advantage of some embodiments of the present invention. Although RMS and average values are useful with parametric data, sometimes the data is not parametric in condition monitoring. Rather, it may be a skewed distribution with imbedded root causes, also referred to herein as a "causal dataset." When a root cause forces a measurement to one extreme or the other—typically to a high value, but sometimes to a low value—it has a significant impact on the mean or average value. However, such an occurrence has little or no impact on a median value. The median value in a population is affected very little or not at all by the extreme data values on either end of a distribution. Embodiments of the present invention capitalize on the meaning and stability of a median value selected from an oversampled dataset with causal data, so that an influence of extreme values on one end or the other of a distribution have little or no contribution to a median value compared with an average value.

Figure 8:
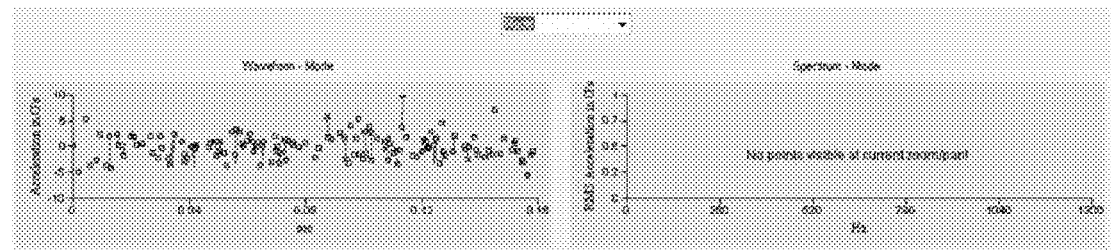
FIG. 8 depicts a display of a MODE time-domain waveform and spectrum data generated by an embodiment of the invention.

A modal value type of measurement, such as a mode value (MODE), is determined to represent a most frequently repeating value or value range in a sampling interval dataset. An example display of a MODE time-domain waveform and spectrum data generated by an embodiment of the invention is depicted in FIG. 8. (Since some embodiments of the MODE algorithm do not always produce a value for the interval, in some cases spectral data may not be derived.) Since the MODE value is a frequently recurring measurement, it is indicative of either a good or a bad measurement and it may be used for detecting or confirming a sensor operational condition. For example, when the MODE value is relatively near to the MIN value or the MAX value, this indicates a faulty or railed-out sensor. When the MODE value is approximately equal to the MED value, this indicates a stable measurement condition. A good measurement typically has a MODE value near the MED value or AVE value depending on whether the distribution is normal or causal. Causal distribution is a trigger for root cause determination of likely contributing factors. For example, a MODE value near a low extreme for a zero-minimum sensor may indicate a defective sensor, a poorly selected sensor, an improperly installed sensor, or a faulty electronic circuit. There are numerous cause-effect relationships one skilled in the art may derive logically for interpreting MODE, MED, AVE, and MIN value comparisons. Various embodiments of the present invention capitalize on these interpretations which are either empirical or theoretical.

Figure 9:
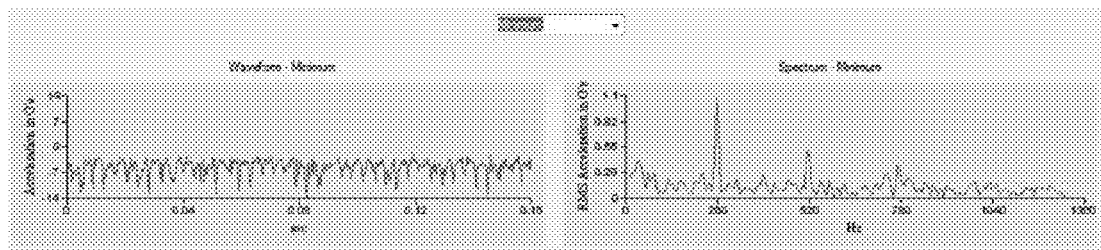
FIG. 9 depicts a display of a MIN time-domain waveform and spectrum data generated by an embodiment of the invention.

A low value type of measurement, such as a minimum value (MIN), is determined to represent the absolute smallest measured value or an average of the two or three absolute smallest values in the sampling interval dataset. An example display of a MIN time-domain waveform and spectrum data generated by an embodiment of the invention is depicted in FIG. 9. The MIN value may be used to validate sensor and circuit operational adequacy. A MIN value may also be used to assess a noise floor for signal-to-noise limit determination. The MIN value is also an indication of a potentially defective sensor, such as when a MODE value is in the vicinity of a related MIN value, but distant from a MED value.

Figure 10:
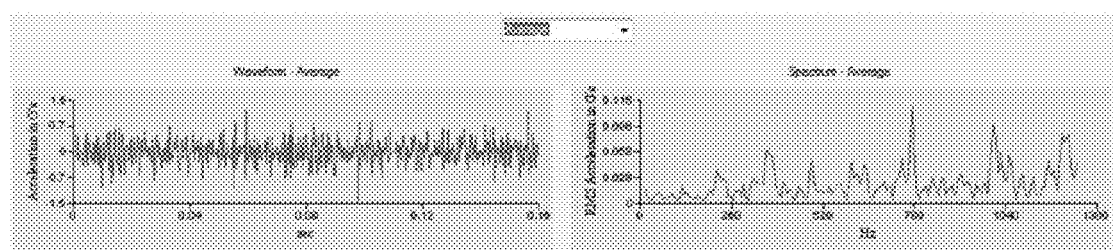
FIG. 10 depicts a display of an AVE time-domain waveform and spectrum data generated by an embodiment of the invention.

A mean value type of measurement, such as an average value (AVE), is determined to represent the average of data in the sampling interval dataset. The AVE value may be used for normal vibration processing, much like the RMS value in waveforms, spectra or other transformations. An example display of an AVE time-domain waveform and spectrum data generated by an embodiment of the invention is depicted in FIG. 10. When oversampled data are analyzed and found to follow a Gaussian normal distribution, greater confidence is placed in information conveyed by AVE value measurements. A difference between the AVE value and the MAX value in a sampling interval can indicate a form of Crest Factor for oversampled data within an oversampled dataset. A substantial difference between the MED value and the AVE value (or with essentially similar calculations) reveals a causal deviation evident in normal vibration techniques.

Figure 11:
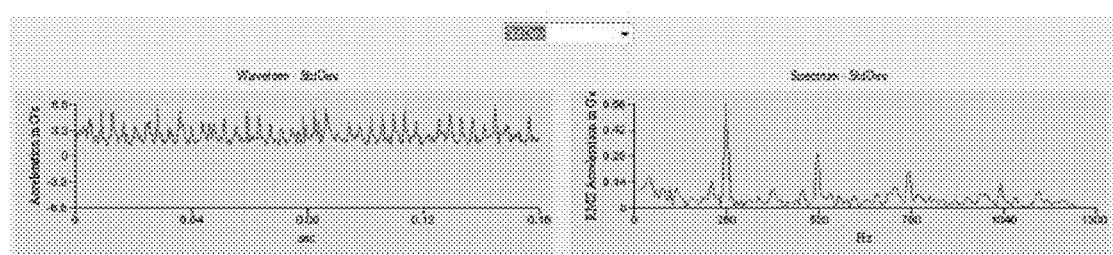
FIG. 11 depicts a display of an SDV time-domain waveform and spectrum data generated by an embodiment of the invention.

A statistical scatter type of measurement, such as a standard deviation value (SDV), is determined to represent the sigma value of data in the sampling interval dataset. An example display of an SDV time-domain waveform and spectrum data generated by an embodiment of the invention is depicted in FIG. 11. The SDV value may be used to reveal causal data within sampling interval datasets and other effects such as friction or physical rubbing or sliding contact. Combined with other values discussed herein, an SDV value may indicate use of inappropriate sensors, such as those with insufficient bandwidth or some other misapplication. An SDV value compared with a MAX–MIN range may be used to ascertain a likelihood of causal data information within a respective dataset or measurement population. In some embodiments, Student's T-distribution or Fisher's distribution analysis of data from one or more sampling intervals may be employed to ascertain confidence interval analysis and further statistical information relevant to probabilistic interpretation conveyed through measured values in oversampled data populations.

Figure 12:
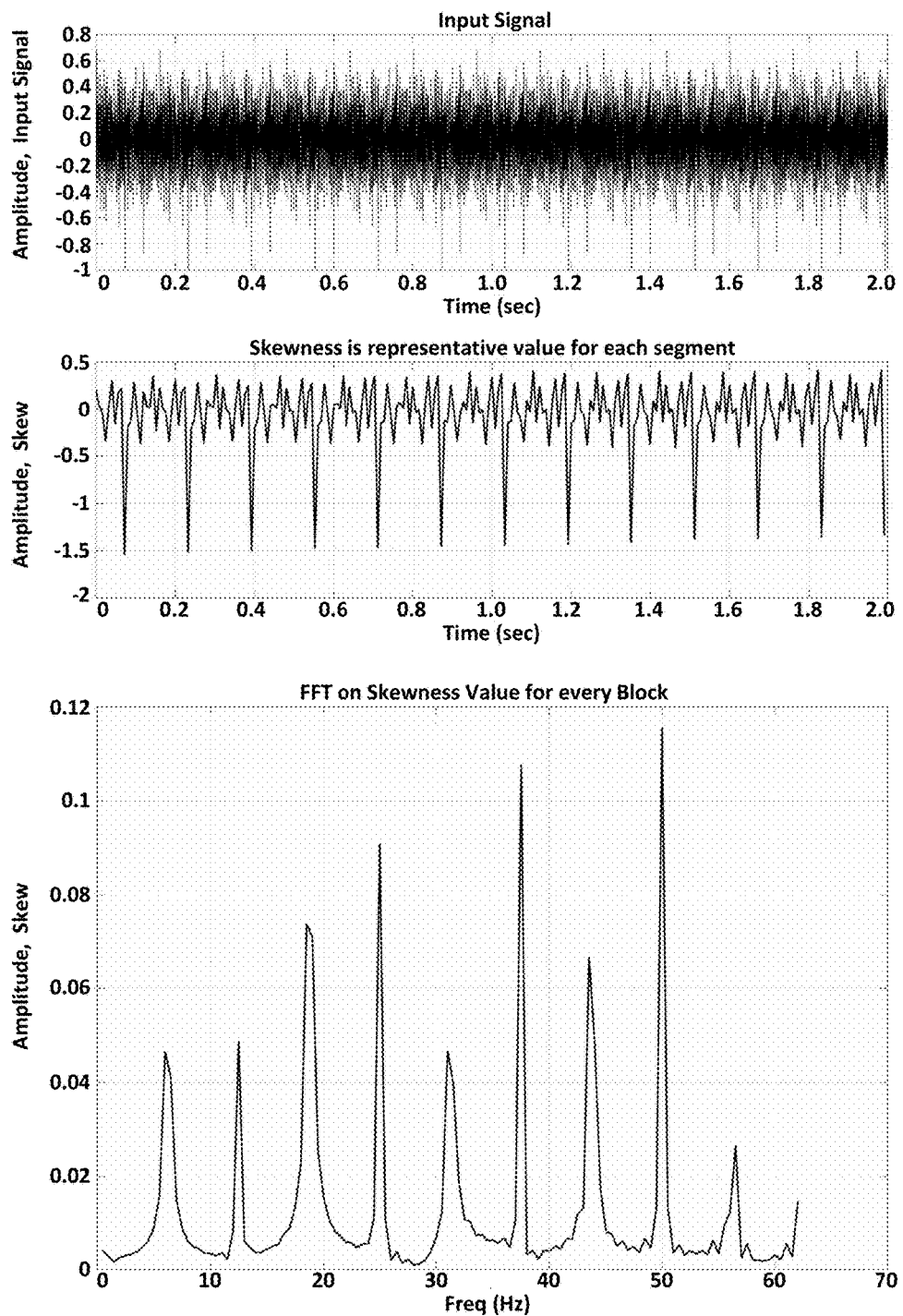
FIG. 12 depicts a display of skewness data generated by an embodiment of the invention.
Figure 13:
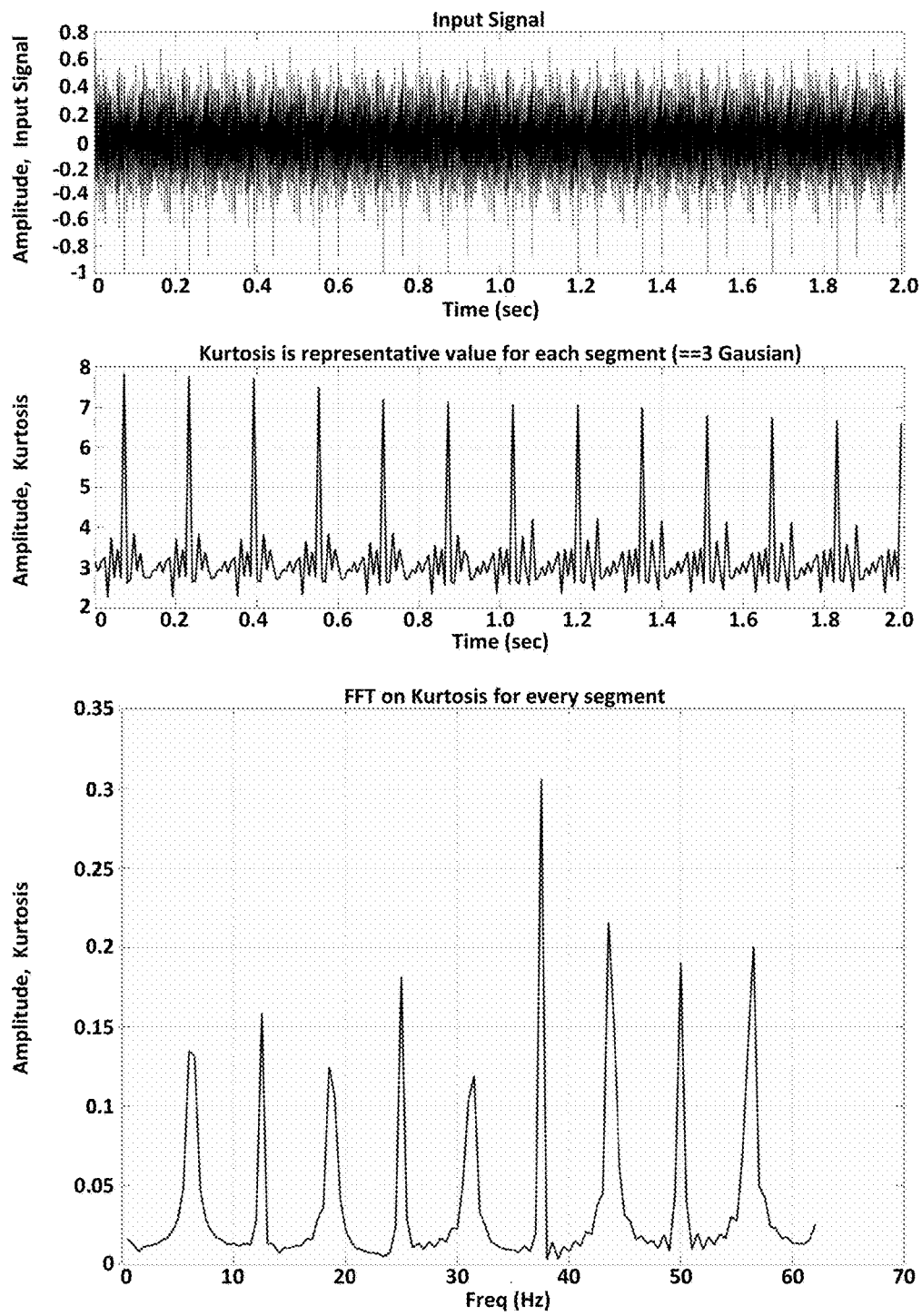
FIG. 13 depicts a display of kurtosis data generated by an embodiment of the invention.

The SDV value may also be used to calculate skewness and kurtosis values as depicted in FIGS. 12 and 13. Skewness and kurtosis are the third and fourth moment of the signal. Variance, which is the second moment, may also be determined, as well as the sixth moment. Skewness and kurtosis may be used to reveal small changes in distribution shape in waveforms caused by impacting, cracking and acoustic emission and from stationary events.

With reference to FIG. 2, preferred embodiments determine parametric versus causal (PvC) information, which may be one or more scalar values that are indicative of a skewed shape factor or other probability density shape factor used in evaluating the measured data within a sampling interval (step 208). PvC may be used to reveal evidence of a root cause affecting a sampling interval dataset such as impacting, cracking, acoustic emission, or other. Parametric data distributions may also be referred to as Gaussian normal distributed data. Root cause or causal data distributions are often positively or negatively skewed distributed datasets. There are several techniques for characterizing a skew or shape factor for probability density. For example, a simple difference between the AVE value and the MED value can be a measure of skewness. Other examples of PvC skewness calculations include the D'Agostino-Pearson-Test and the Karl Pearson coefficient of skewness, which is $$SK = \frac{3 \times (AVE - MED)}{SDV}.$$

Yet another well-known technique is kurtosis. Various embodiments may be used to differentiate positively skewed, negatively skewed, and other shape characteristics. Using kurtosis values, the D'Agostino K-squared test with special work from Pearson and Ascome & Glynn, is an example of a technique for examining a distribution.

Some embodiments calculate a scalar value and its sign for the MIN value or the SDV value or a mathematical comparison between two or more of the above values to qualify an operational condition of a sensor or a circuit (OPC)(step 210). The OPC value may be used to reveal a possibly nonfunctioning or intermittent sensor or circuit.

In some embodiments, three scalar values immediately before and three scalar values immediately after the MAX value are captured, and a Peak Shape Factor (PSF) for the MAX value is computed using such comparisons as absolute, sign, and delta value (step 212). The PSF value may be used to characterize a natural characteristic or quality associated by empirical testing or physical theory with a likely cause associated with the MAX scalar peak.

Figure 14:
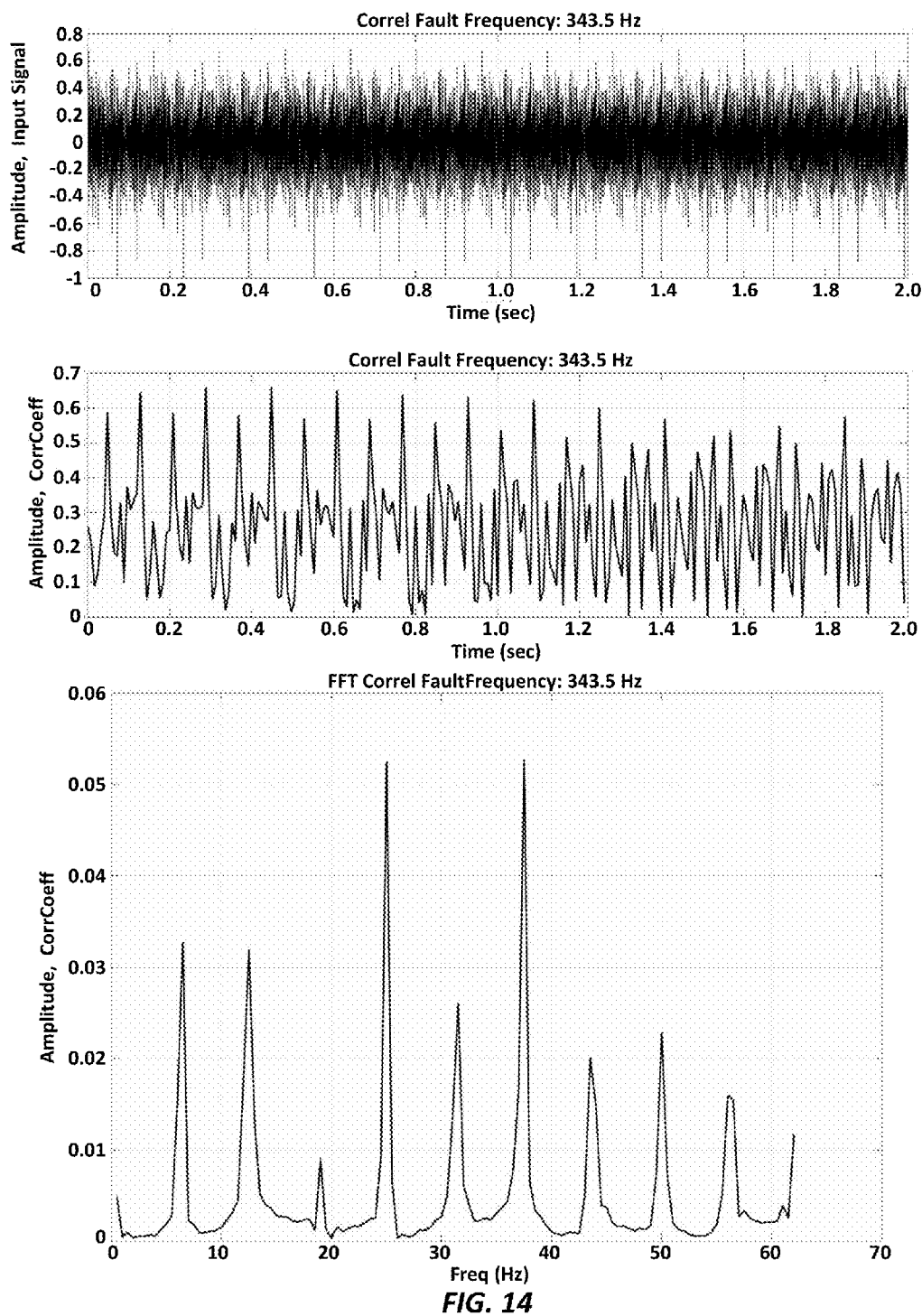
FIG. 14 depicts a display of a correlation coefficient waveform generated by an embodiment of the invention.

The correlation coefficient is another scalar value that is derived from the autocovariance of the oversampled dataset and a taught dataset, a preset dataset, or a generated dataset. As the terms are used herein, a "taught dataset" is a dataset that is a result of an empirical process, a "preset dataset" is a dataset stored in system storage (e.g. a good state stored reference dataset) or in an external database, and a "generated dataset" is a dataset created from system geometry information and typical fault pattern information (tooth mesh, ball spin, outer race, inner race frequencies). The correlation coefficient may be calculated according to:

$$R(i, j) = \frac{C(i, j)}{\sqrt{C(i, i)C(j, j)}}$$

where C(i,j) is the covariance matrix, i is the vector of input segment data (each segment normalized), and j is the vector of a sine wave reference signal. An example display of a correlation coefficient waveform generated by an embodiment of the invention is depicted in FIG. 14.

In preferred embodiments, the scalar values of data within a sampling interval dataset may be full-wave-rectified by taking an absolute value before sorting as commonly done with PeakVue™ and other peak detection techniques. However, in some embodiments positive and negative values are sorted from lowest to highest.

One may apply mathematical operations such as an $N^{th}$ derivative to bring out a desired characteristic such as a slope or a rapidity of change if such is relevant or provides better programmatic or human interpretation of information from data conveyed in a scalar value wave form.

Filtering is used to focus on specific frequency bands, to eliminate high baseband components, to make datasets comparable to randomly distributed signals and to adjust to a frequency response of a mounting location where different attenuation and resonances are present. Filtering may be performed before, during, or after a statistical analysis step outlined within this specification. For example, it is practical to compute a statistical attribute of an oversampled data stream before pass filtering the data stream, and to compute other statistical attributes after pass filtering.

Preferably, some or all of the scalar values MAX, MED, MIN, AVE, SDV, PvC, OPC and PSF are stored for further processing (step 214). Further processing of one or more of MAX, MED, MIN, AVE, SDV, PvC, OPC, and PSF may include waveform analysis, spectral analysis, cepstral analysis, and other transformation analyses as described hereinafter. Cepstral analysis is effectively an inverse FFT of the power spectrum and provides information about rate of change in the different spectrum bands. One or more of these analysis techniques may be used in an A-B-A-B comparison or an A-B-C comparison. For example such analysis may be performed on an "A dataset" and on a "B dataset" and on a "C dataset." This enables the comparison of different states or conditions, such as comparing a good state to lesser state or to even to a fundamentally bad state. Such analysis may be performed to reference or to compare a baseline state to a current operating condition. This comparison may be interpreted using programmed logic or it may be interpreted visually by an operator, such as by examining tabular or graphical data presentations.

Time Domain Waveform Analysis (Step 216)—

In prior systems, time domain waveform analysis was performed using either a decimated scalar value or a Peak-Vue™ selected peak-hold value. In preferred embodiments of the present invention, the MAX value (representing PeakVue™), the MED value (representing normal vibration with or without causal data), the AVE value (representing normal vibration assuming negligible causal data), and the SDV value (monitoring noise and other variances) are each processed in a time domain waveform, as well as other analysis techniques described herein.

Averaging Analysis (Step 218)—

Averaging analysis typically smooths or cancels out randomness, thereby allowing repetitive occurrences to stand out. An average of sample data involves averaging respective lines within a sample, wherein a sample is a number of lines of data and a line is a data value from a single sampling interval. In preferred embodiments, a user may select a value for a number of lines in a sample, such as 400 lines or 12,800 lines or another number typically in between those two, depending on the desired resolution. A "sample" is that number of measurements of a data type, e.g., 400 lines or 12,800 lines or whatever was selected. A user typically selects a number of averages, such as 2 or 20 or some other number, to set the number of samples that get averaged.

Cross Channel Analysis (Step 220)—

Cross channel analysis employs synchronous comparison of signals from two points typically on one machine. This analysis is performed by comparing currently sampled signals to a reference signal that was stored during a learning phase or during good machine state. This technique reveals phase-related information and helps in discerning and locating faults.

Fast Fourier Transform (FFT) spectral analysis (step 222)—Traditionally, FFT spectral analysis has been performed using either a decimated scalar value or a PeakVue™ selected peak-hold value. In embodiments of the present invention, the MAX value (representing PeakVue™), the MED value (representing normal vibration with or without causal data), the AVE value (representing normal vibration assuming negligible causal data), and the SDV value (monitoring noise and other variances) are each processed in FFT spectral analysis and other analysis techniques as described herein.

Phase Analysis (Step 224)—

Phase analysis employs tachometer information or cross channel analysis or another technique to identify phase-related patterns within time-domain data.

Autocorrelation Analysis (Step 226)—

In preferred embodiments, autocorrelation analysis involves (1) dividing the waveform (signal) into segments, (2) performing a given peak algorithm on each segment, and (3) comparing the uniformity of the results between segments. This is separate and distinct from trying to calculate the mean, median or even STD. If the signal is highly periodic, then the segments should be very similar. If the signal is more or less constant but not actually periodic, then the segments would still be similar but the autocorrelation value should be quite different. If an event is transient, then a significant difference would exist between segments with probably all segments but one having a similar value and one segment having a substantially different value. In order to maximize the number of values that can be compared, an "overlap" may be applied similar to FFT processing. This would be consistent with the idea of verifying the consistency of the signal.

Data Distribution Analysis (Step 228)—

Some embodiments incorporate a programmable logic interpretation of a cumulative distribution or probability density distribution or another statistical distribution representing these populations for a sampling interval dataset or for an assimilation of a plurality or array of sampling interval datasets, such as a 400-line or a 3200-line sampling interval dataset or something in between or extended beyond these numbers of lines within sampling intervals.

Figure 3A:
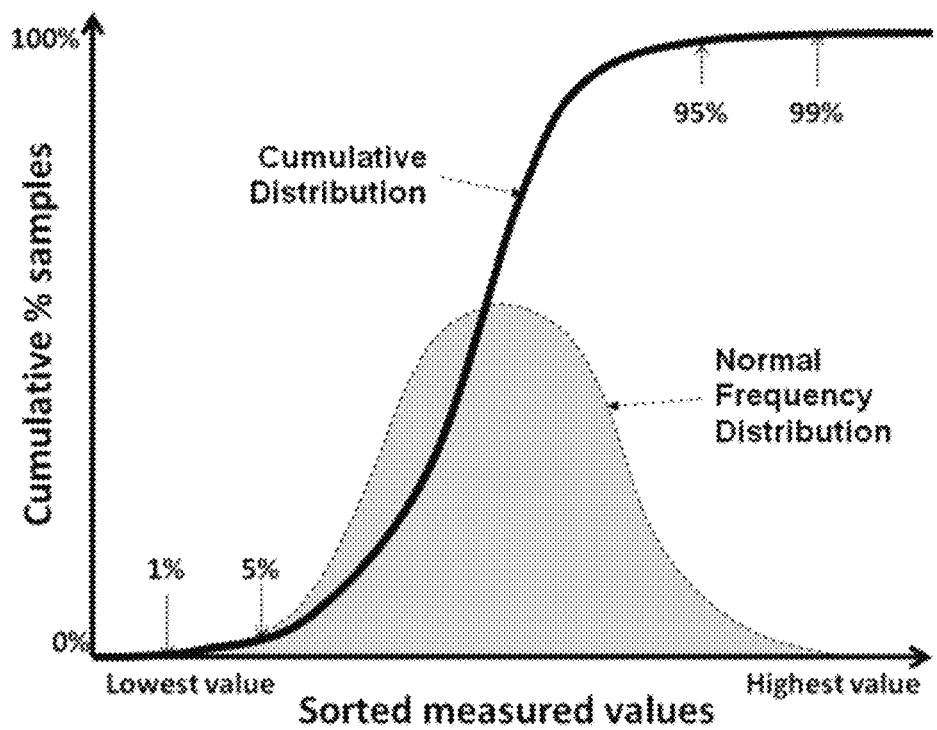
FIG. 3A depicts a double-tail normal or parametric distribution of a dataset.
Figure 3B:
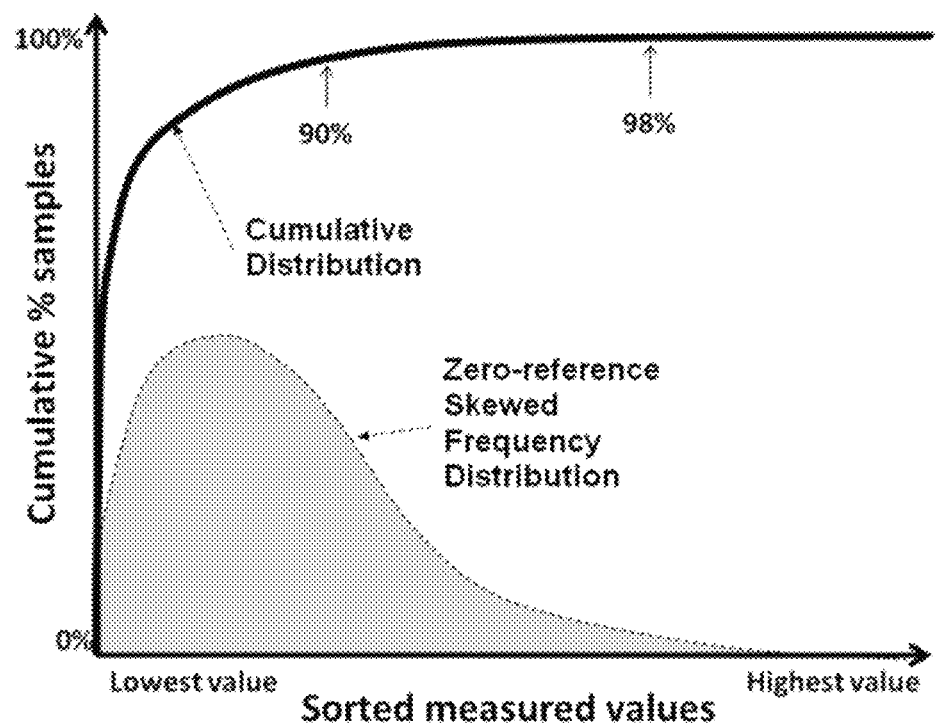
FIG. 3B depicts a zero-based skewed cumulative distribution of a dataset.
Figure 3C:
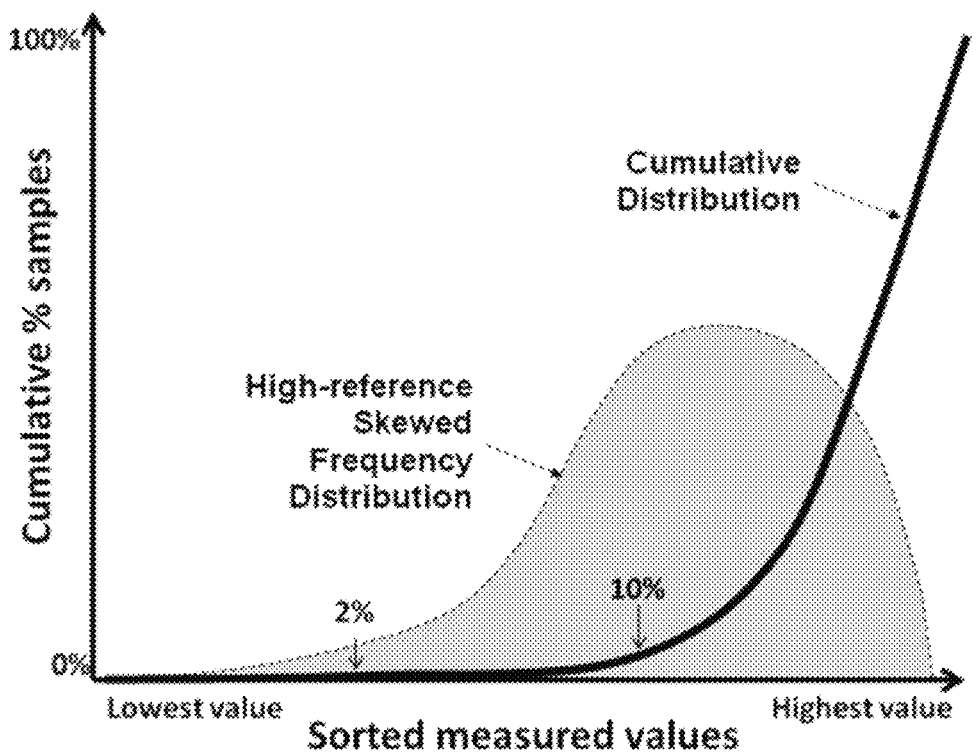
FIG. 3C depicts a high-value based skewed cumulative distribution of a dataset.
Figure 3D:
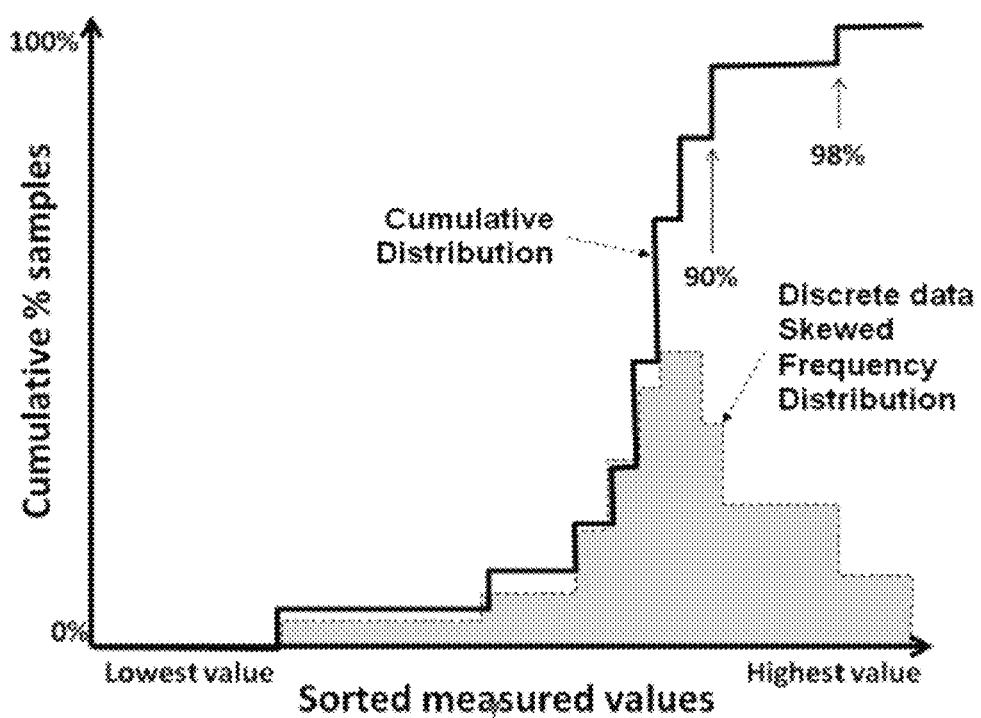
FIG. 3D depicts a high-value based skewed cumulative distribution of a dataset with discrete data.

FIGS. 3A-3D (derived from ASTM D7720) provide examples of cumulative distribution characteristics. FIG. 3A depicts a two-tailed parametric distribution, also called Gaussian normal distribution. This type of distribution is "statistically well behaved," which means it complies with expectations of a process that is in statistical control. In this case, one expects Statistical Process Control (SPC) standard deviation values to describe the scatter characteristic for data scatter from a dataset. FIG. 3B depicts a single tail distribution characteristic of zero-based measured values. This kind of distribution typically demonstrates a high average or mean value compared with a median or middle value. FIG. 3C depicts a high reference based skewed distribution with an upper rail or ceiling where data measurements seem to be constrained, perhaps artificially or physically. For example such sensor response may be indicative of the use of inappropriate sensors for a particular application (i.e. sensors with insufficient bandwidth). FIG. 3D depicts a discrete distribution which differs from the first three approximately continuous distributions. A discrete distribution is often observed with integer data, digital data, or some other step function.

Some embodiments of the present invention characterize at least a portion of a cumulative distribution or probability density distribution such as a sorted value distribution for a sampling interval dataset or array. In addition to the MED, MAX, and MIN values, other useful information may be extracted from such a distribution, such as:

Data at the low end, such as 0-1% or 1-5%;
Data at the high end, such as 99-100% or 97-99%;
Linear and/or log slopes of a data distribution plot at the low end;
Linear and/or log slopes of a data distribution plot by quartiles;
Linear and/or log slopes of a data distribution plot in the mid-region;
Linear and/or log slopes of a data distribution plot at the high end; and
Inflection points in a linear and/or log distribution, where they occur, and what the slope is at that location.

Examples of Processing Oversampled Data

Table 2 below sets forth examples of possible steps and sequences for deriving information related to a physical condition. It should be appreciated that variations or alternate sequences and various steps may be appropriate, and some steps in the sequence may be skipped or additional steps may be included. For example, if an integration is called for, it may be performed in either step C or E or both. For another example, it is conceivable that one may convert an analog signal into digital data, wirelessly transmit the digital data to another location, and then convert the digital data back into an analog signal in the second location for further processing such as from step C. For yet another example, if a signal rectification is called for, it may be accomplished in the analog domain or in the digital domain.

Thus, there are many variations and rearrangements from which those skilled in the art may select.

the amplifiers 85a-85h, the divide-by-3 circuits 86a-86h, the amplifiers 88a1-88h2, and the low-pass filters 90a-90h.

TABLE 2

An example of a sequence and steps for deriving condition information from a dynamic transducer in sensory contact with a machine.

| Step | Transform | To produce | | | Using | | | | | |
|---|---|---|---|---|---|---|---|---|---|---|
| A | Physical condition | Sensor response | Acceleration sensor | Velocity sensor | Displacement sensor | Acoustic or ultrasonic sensor | Motor current or voltage sensor | Strain gage or load cell | Pressure transducer | Other |
| B | Sensor response | Analog signal | Voltage | Current | Lumens | Flux | Other | | | |
| C | Analog signal | Preprocessed signal | Nothing | High pass | Low pass | $N^{th}$ derivative or integral | Gain control | DC removal | Other | |
| D | Preprocessed signal | Oversampled digital data | Analog to digital converter (ADC) | Sigma-Delta noise shaping | Successive Approximation (SAR) | Other | | | | |
| E | Oversampled digital data | Processed digital data | Nothing | High pass | Low pass | $N^{th}$ derivative or integral | Phase shifter | 50 Hz/60 Hz line frequency suppression | Other | |
| F | Processed digital data | Sampling interval dataset | $F_{SR}/F_{MAX}$ | Other | | | | | | |
| G | Interval digital data | Organized interval data | Nothing | Rectify | Sort | Segment | Cumulative distribution | Other probability distribution | Other | |
| H | Organized interval data | Interval characteristics | Quantitative scalars | Qualitative categories | Trigger | Pass-fail | On-off | Other | | |
| I | Interval characteristics | Domain data | Time domain | Spatial domain | Other | | | | | |
| J | Domain data | Information | Waveform analysis | Frequency transform analysis | Auto-correlation analysis | Cross channel analysis | Phase analysis | Hilbert transformation (demodulation) analysis | Envelope processing analysis | Other |

Step A transforms a physical condition into a sensor response. In machinery health applications, examples of physical conditions include such things as (1) a spall condition resulting from roller bearing component fatigue, (2) a broken tooth condition resulting from fatigue failure of a gear, (3) a sliding friction condition resulting from inadequate lubrication, (4) a smooth running condition resulting from proper lubrication, and (5) a misalignment condition resulting from thermal growth during machine operation. In non-mechanical asset health applications, examples of physical conditions include such things as (6) subsurface fatigue cracking resulting from resonant vibration of a thermowell in process piping, (7) stick-slip movements when a coefficient of static friction is periodically exceeded at a loaded interface, (8) partial discharge in vicinity of high voltage electrical apparatus, (9) a leaking condition producing fluid turbulence in vicinity of leaky orifice under pressure, and (10) an intermittent fault condition in a three-phase electric current power line.

For monitoring of a physical condition, step A typically involves placing a sensor such as an accelerometer, displacement probe, acoustic emission sensor, ultrasonic sensor, current clamp, flux coil, volt meter, or other types of sensor, on a machine or structure to be monitored.

Step B typically involves transforming a sensor response into an analog signal. Examples of several types of analog signals are listed in Table 2. In the embodiment of FIG. 1, step B is performed by the sensors 82a-82d and 84a-84d.

Step C typically involves preprocessing the analog signal by filtering or otherwise conditioning the signal to remove unwanted information or better separate signal content from noise. In the embodiment of FIG. 1, step C is performed by Step D involves converting the signal from analog into digital. Modern analog-to-digital converters commonly oversample data by ten-fold or more. Sixty-four (64) times oversampling is a common practice. Statistical theory and empirical practice are applied by those skilled in the art when interpreting how much oversampling is enough for application of embodiments of the present invention. In some cases, such as computing an MED value, it only takes a few oversampled data within a dataset. On the other hand, a MODE value calculation may require more data. In the embodiment of FIG. 1, step D is performed by the analog-to-digital converters 92a-92h.

Step E involves transforming oversampled digital data into processed digital data. This step may include high pass filtering, low pass filtering, integration, double integration, or other digital processing of oversampled digital data. In the embodiment of FIG. 1, step E is performed by the pass filter 102, the first integrator 106, and the second integrator 108.

Step F designates blocks of oversampled data for individual sampling intervals. Typically a block is a number of digital amplitude values collected at a sampling rate during a sampling interval. For example if a 200 kHz sampling rate is used and an $F_{max}$ value of 2000 Hz is used, then the sampling interval is $1/2000$ or 0.0005 seconds, and the number of amplitude measurements during a sampling interval is 0.0005×200,000=100. In this example, 100 measurements are included in one sampling interval. For another example, if the sampling rate is 200 kHz and an $F_{max}$ value of 10 Hz is used, then the sampling interval is $1/10$ or 0.1 second, and the number of amplitude measurements during a sampling interval is 0.1×200,000=20,000. In this example 20,000 measurements are included in one sampling interval. For yet another example, if the sampling rate is 200 kHz and an $F_{max}$ value of 20,000 Hz is used, then the sampling interval is $\frac{1}{20,000}$ or 0.00005 second, and the number of amplitude measurements during a sampling interval is 0.00005×200,000=10. In this example 10 measurements are included in one sampling interval. The interval dataset of step F is the set of (typically amplitude) values that are measured for each sequential sampling interval which is a block of values collected at a sampling rate during a sampling interval. In the embodiment of FIG. 1, step F is performed by the data block designator module 114.

The organized interval data of step G is a sampling interval dataset. It is most frequently a full wave rectified version of the data comprising absolute values. Other organization actions may include sorting, arranging into a cumulative distribution or a probability density distribution, segmenting such as quartiles or other partitioning, or other processing intended to organize data within a sampling interval dataset for further analysis and/or processing. In the embodiment of FIG. 1, step G is performed by the data organizer module 116.

Step H involves determination of dataset characteristic values such as MAX, MED, MIN, AVE, SDV, PvC, OPC, and PSF. In the embodiment of FIG. 1, step H is performed by the decimation processor module 118. In reference to both machinery health and non-mechanical equipment examples of physical conditions, outputs of the following interval characteristics are sometimes relevant, meaningful, and revealing. Program logic may be used to compare, interpret, and deduce a likely indication of a potential condition such as:

(1) using MAX, SDV, PvC, and PSF to detect a spall condition resulting from roller bearing component fatigue;
(2) using MAX, SDV, PvC and PSF to detect a broken tooth condition resulting from fatigue failure of a gear component;
(3) using MIN, MED, MODE, AVE, SDV, and PSF to detect a sliding friction condition resulting from inadequate lubrication;
(4) using MED, AVE, MODE, SDV, and PSF to detect a smoothly running condition resulting from proper lubrication;
(5) using MED, AVE, SDV, and PSF to detect a misalignment condition resulting from thermal growth during operation;
(6) using MAX, SDV, PvC, and PSF to detect subsurface fatigue cracking resulting from resonant vibration of a thermowell in process piping;
(7) using MAX, AVE, SDV, and PSF to detect stick-slip movements when a coefficient of static friction is periodically exceeded at a loaded interface;
(8) using MIN, MED, MODE, AVE, SDV, and PSF to detect a partial discharge in vicinity of high voltage electrical apparatus;
(9) using MIN, MED, AVE, MODE, SDV, and PSF to detect a leaking condition producing fluid turbulence in vicinity of leaky orifice under pressure; and
(10) using MED, MODE, SDV, and PSF to detect an intermittent fault condition in a three-phase electric power line.

In step I, domain data is typically a waveform time domain data series. It is conceivable that embodiments of the invention may use spatial reference, in which case the domain would be spatial domain (interval delta-distance rather than delta-time between sequential measurements). In the embodiment of FIG. 1, step I is performed by the processor 100.

Step J information is typically derived by analysis of a waveform or by analysis of a transformation such as Fast Fourier Transform (FFT) or by autocorrelation analysis, cross channel analysis, phase analysis, or another analysis of waveform data or data derived from waveform data. In the embodiment of FIG. 1, step J is performed by the processor 100.

Selective Decimation Using Adaptive Sampling Intervals

Certain embodiments of the present invention employ adaptive sampling intervals wherein the time duration of sampling intervals, the number of samples collected within sampling intervals, or even the location of sampling intervals within the oversampled waveform is adapted to changing conditions. Note that a transform analysis, such as an FFT, may be rendered meaningless unless all of the data within a FFT are collected using a constant sampling interval.

Typically a sampling rate is a fixed frequency sampling rate such as 204,800 samples per second. In accordance with preferred embodiments, such a fixed frequency sampling rate may be held constant while a sampling interval may be adjusted to effectively increase or reduce the number of samples within one sampling interval. A longer sampling interval with a fixed sampling rate increases a statistical population of sample measurements contributing to a selective decimation step. Consequences of adaptively lengthening sampling intervals with fixed frequency sampling rates include greater statistical confidence and greater compression of raw data. A shorter sample interval with a fixed sampling rate decreases a statistical population of sample measurements contributing to a selective decimation step. Consequences of adaptively shortening sampling intervals with fixed frequency sampling rates include lesser statistical confidence within a sampling interval and greater bandwidth of measurement information.

An alternative embodiment involves use of a varying sampling interval within the same dataset based on what is happening in the signal. For example, decimation may take place using relatively longer sample intervals during a portion or portions of the waveform, while the decimation may take place over relatively shorter sample intervals during another portion or portions of the waveform.

Figure 16:
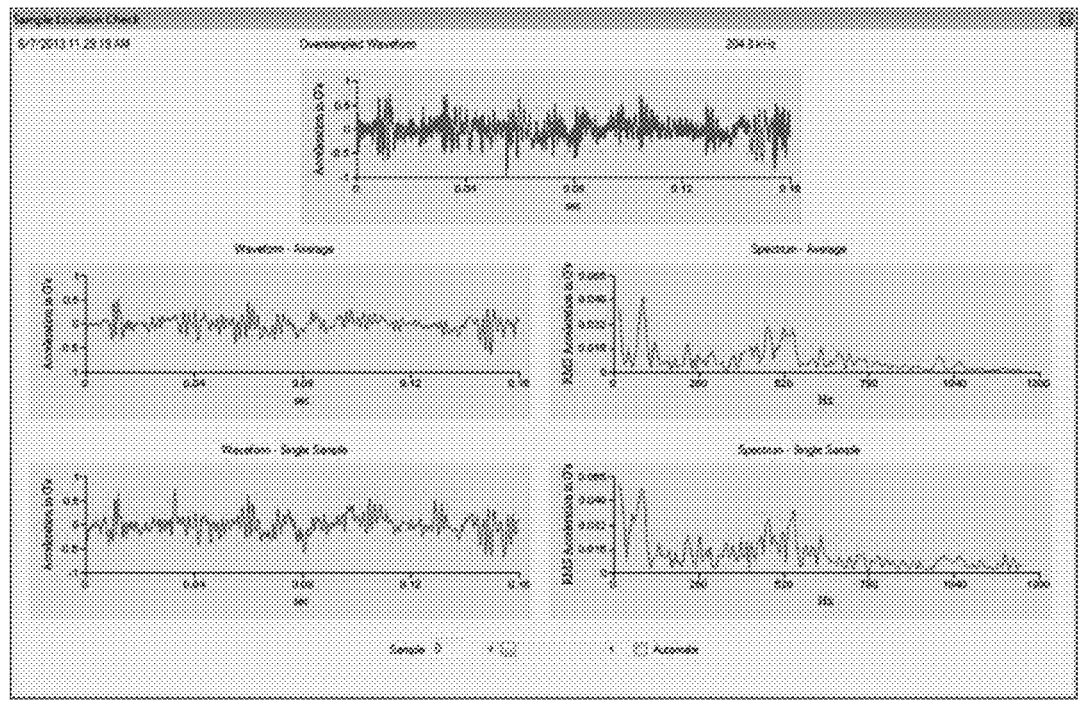
FIG. 16 depicts an example of a vibration data display window generated by an embodiment of the invention.
Figure 17:
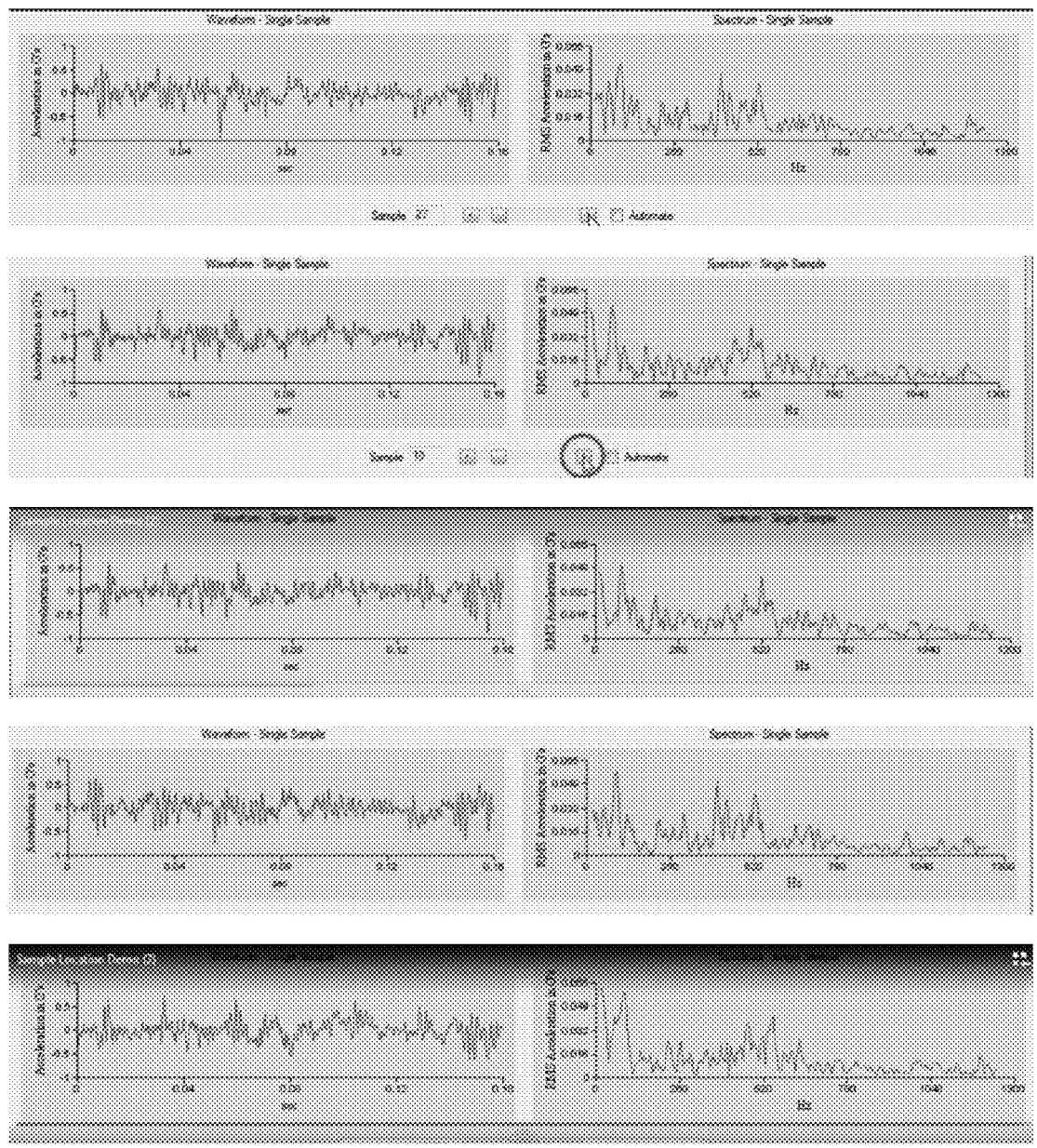
FIG. 17 depicts displays of single sample waveforms and corresponding spectrum data taken at progressive positions along a sampling interval generated by an embodiment of the invention.

A somewhat surprising result of experimentation with sampling interval adaptation was that the location of the sampling intervals within the oversampled waveform has significant impact on the resulting decimated data. FIG. 16 depicts a screen shot of a test program used for this investigation. In FIG. 16, the unprocessed, oversampled waveform is displayed at the top of the window. For reference, beneath the oversampled waveform, a decimated waveform created by taking the average of each interval is displayed with the spectrum to which it corresponds. Toward the bottom of the window, a decimated waveform formed by taking a single sample from each interval is displayed with its corresponding spectrum. The user input controls beneath the single-sample plots allow the user to select the sample within each interval to be used for the decimation. The images provided in FIG. 17 demonstrate the use of such controls to study the effect of sample interval location in simple decimation. The images of FIG. 17 represent images taken at different positions along the sampling interval. One of the intriguing results of this study was how much the character of the decimated waveform and spectrum changes as the sample location within the interval varies.

Rationale for adaptively adjusting sampling intervals include a need to achieve data compression, a need to change statistical confidence, or a need to adjust frequency content of measured data. Any of these needs may be recognized in response to changing machine behavior or in response to external (i.e. process variable) triggers. For example during a normal running condition while parametric information is generally in a normal range, one may program a selective decimation schema according to a preferred embodiment to collect relatively larger blocks of data from long sample intervals. Later, adapting to one or more changing conditions, one may program the same selective decimation schema to collect and selectively decimate relatively smaller blocks of data relatively more frequently. Alternatively, one may apply adaptive selective decimation by adjusting a sampling rate to collect more or less data during fixed duration sampling intervals.

Additionally, within a given oversampled waveform, it may prove desirable to vary the sampling interval in response to the changing character of the oversampled waveform itself. For example, if a burst of energy was apparent (possibly due to impacting or some other impulse-like event), smaller intervals might be used in the time domain neighborhood of the burst while larger intervals are applied elsewhere. A further embodiment provides for modifying the sampling rate of the oversampled waveform itself in response to changing conditions.

A further application of a varying sample interval or varying sampling rate involves adaptively selecting a sampling interval, adaptively selecting an $F_{MAX}$, adaptively selecting an averaging of sample interval data, and adaptively selecting a selective decimation technique. Each selection is preferably based on a signature characteristic such as may be detected and triggered using programmed logic operating on oversampled data analysis findings, or such as one detected and triggered using human logic. Combinations of adaptive sample intervals and adaptive sampling rates may be employed as called for.

More data may be collected for each sampling interval by either lengthening an interval or increasing a sampling rate. This increased exposure of data to a collection process enables selective decimation techniques to discern or pick out a relatively infrequent event in time, provided that amplitude or other measurement information associated with this event is distinguishable using statistics or other selective decimation techniques to distinguish one or more characteristics of such an event in time. Alternatively, less data may be collected for each sampling interval by either shortening an interval or decreasing a sampling rate. This decreased exposure of data to a collection process enables selective decimation techniques to report higher frequency measurement content with time domain specificity.

Selective Decimation Using Autocorrelation, Frequency Transform, or Cepstral Analysis.

Traditionally oversampled data within each sampling interval is decimated in a first step, and a derived waveform may be analyzed using techniques of autocorrelation, FFT or other frequency transformation, or cepstral analysis in a later processing step. Certain embodiments of the present invention employ these and other analysis techniques to data within a sampling interval to identify meaningful information contained in the oversampled data. For example, a recurring pattern within a sample interval dataset may be detected using programmed logic. A wavelength, or time duration between sequential occurrences of such a pattern within a sample interval may reveal a periodicity indicative of periodic content as opposed to non-periodic content.

Analysis and selective decimation of oversampled data is typically used to produce one or more scalar values representing that sampling interval. When a periodic or other correlated characteristic is identified, an attribute or feature tag may be further added to the one or more scalar values.

For example, one selective decimation process may yield a first, a second, and a third scalar value from each sampling interval. For example, all data from a single interval may be decimated to yield an average, a minimum, and a maximum in a single selective decimation process. In addition to those three scalar values, a feature or quality characteristic such as a periodicity characteristic may be triggered, or perhaps a causal data characteristic may be triggered, or perhaps a Gaussian normal data distribution characteristic may be triggered. All of these calculations may be accomplished in a single processing of data from a sample interval. The three scalar values (such as average, maximum, and minimum) and attribute or feature characteristics (such as an indication of a possibly causal dataset and a periodic information status) may be configured. Configured data is typically assembled using a preferred digital data protocol that is readily adapted for practical data storage, data transmission, data receiving, data processing, and data analysis, and information interpretation using programmed logic.

Additional Uses of Oversampled Data

As next-generation Machinery Protection Systems become more sophisticated and incorporate higher performance electronics, their front-ends must also have the inherent ability to produce over-sampled data. The sampling rate of these circuits may commonly be 10-20 times greater than is necessary to make the primary measurement. The processing will decimate and filter this data to the desired measurement bandwidth, discarding the high-frequency components. The reason for doing this is efficiency in development and maintenance—essentially it is more prudent to design one high-performance front end and use it for both high-frequency and low-frequency acquisition. In other words, with the current state of the art, the low-frequency data can be derived from the high-frequency stream using the same hardware, for essentially no additional cost—the additional processing required to filter and decimate is relatively simple to achieve with today's standard digital signal processors.

One side-effect of this approach is that the raw unfiltered and undecimated data stream comprises over-sampled data that can also be used for PeakVue™ analysis. Historically, these full sampling rate measurement paths produced only envelope type measurements, which are still the primary output, but now with PeakVue™ the same raw data can be simultaneously used for peak analysis. Additionally, the Peak-Hold or MAX value and other representative scalar values derived from an un-decimated stream can be used in a decimated signal processing path to perform peak analysis as this is done for RMS, Peak and Peak-to-Peak in standard frequency band analysis.

An acceleration input, which is traditionally used in Protection systems (note that "Protection" refers to an online vibration analysis for the purpose of automatically triggering a shutdown of a machine such as a turbine) to produce a "Case Vibration" measurement, including RMS, Peak, Peak-to-Peak, and $S_{MAX}$, can also be used to produce a PeakVue™ waveform and, if desired, a spectrum for further analysis.

A velocity input, which is also traditionally used in Protection systems to produce a Case Vibration measurement, including RMS, Peak, Peak-to-Peak, and $S_{MAX}$, can also be used to produce a PeakVue™ waveform and, if desired, a spectrum for further analysis. Digital differentiation of the over-sampled velocity data produces over-sampled acceleration data, which can then be used to produce a PeakVue™ waveform and, if desired, a spectrum for further analysis.

A displacement input, which is also traditionally used in many protection systems to produce a radial vibration displacement measurement or axial thrust displacement measurement, including RMS, Peak, Peak-to-Peak, and $S_{MAX}$, can also be used to produce a PeakVue™ waveform and, if desired, a spectrum for further analysis. Digital double-differentiation of the over-sampled displacement data produces over-sampled acceleration data, which can then be used to produce a PeakVue™ waveform and, if desired, a spectrum for further analysis.

Characterizing One or More Events within a Sampling Interval

In certain embodiments, events inside a sampling interval are characterized in the time domain. For instance, in addition to a capture of a peak value or multiple peak values within an interval, it is possible to identify a number of peaks that were at least a given percentage of this amplitude, such as 80% of maximum peak height, and further to identify how many characterized items occurred in the interval or a spacing between events—in FIG. 28, see Table 4 "measurement interval". Such events may further be commonly recognized from a machine fault, such as impacting or friction or a sensor fault or potentially recognized as likely coming from another physical source. Peaks of significant amplitude occurring throughout the interval may be recognized by empirical logic as potentially a result or consequence of a poor lubrication or fatigue cracks or spall or gear defects. Many techniques for recognizing signatures of events within oversampled data sampling intervals are discussed in this specification.

Digital Data Transmission

Yet another important application of various embodiments of the present invention relates to digital data transmission from a sensor to a host. There are many advantages for transmitting data in digital form to a host as compared with transmitting in analog form, particularly in certain applications. For example, there are advantages of transmitting data wirelessly by Bluetooth or another wireless signal from a sensor to a handheld data collector or analyzer: no cable, less risk to an operator holding the collector or analyzer, more freedom of movement, more comfortable, may not need to hold the wireless sensor, and more. For another example, there are advantages to transmitting data wirelessly via radio frequency to a node or to a hub or to a network for wireless condition monitoring of machinery health: may have multiple redundant signal transmission paths, save money by not installing conduit, quicker installation, easier relocation, easier to create connectivity in difficult to reach locations, less operator risk, and more. For yet another example, there are advantages to transmitting digital information over directly wired pathways such as a multi-wire signal lines or such as a carrier signal via power transmission line or such as a bus communication protocol on a bus network: digital data signals are typically more robust and reliable than long wire analog signals because digital signals are less prone to be affected by temperature, cable impedance, cable capacitance, electromagnetic interferences, and they tend not to require calibration or compensation adjustment for digital legs of a communication path.

Referring to Table 2 above, after the completion of the transformation from a preprocessed signal to oversampled digital data in Step D, data is processed in digital form. In step D the bandwidth is quite high and for certain narrow bandwidth architectures, it may not be advantageous to transmit full bandwidth data. For example for a wireless Bluetooth signal from a digital sensor to a handheld collector or analyzer, it can be particularly advantageous to process data through one or more of steps E, F, G, H, and I in the digital sensor before transmitting oversampled digital data or processed digital data, or sampling interval dataset data, or interval characteristics data, or domain data to a handheld collector for further processing from that produced data to later steps in a process resulting in desired information.

In a similar manner, there are some advantages for processing data in Table 2 Steps D to J before transmitting it from a vicinity of a sensor apparatus to a vicinity of an information apparatus. This applies to walk around data collection, wireless monitoring, and online monitoring.

Yet there may be advantages for performing a portion of the post-processing or a portion of the decimation before transmitting digital data and completing the remainder of the post processing and decimation, as well as subsequent processing steps in another device possibly in another location from the device or location where analog to digital conversion takes place.

TABLE 3

Process for interpreting analog sensor signal information.

| | | Analog Signal | Pre-Process | Digital Signal | Post-Process | Decimate | Analyze | Interpret |
|---|---|---|---|---|---|---|---|---|
| I. | Analog Sensor | Yes | | | | | | |
| II. | Analog Data Collector | | Yes | Yes | TBD | TBD | | |
| III. | Analog Analyzer | | Yes | Yes | Yes | Yes | Yes | Yes |
| IV. | Computer Analyzer | | | | TBD | TBD | Yes | Yes |
| V. | Transmitter | Yes | Yes | Yes | Yes | Yes | Yes | Yes |
| VI. | Digital Transducer | Yes | Yes | Yes | TBD | TBD | | |
| VII. | Digital Analyzer | | | | TBD | TBD | Yes | Yes |

For example, Table 3 indicated "TBD" or "to be determined" where one might elect to perform all or part of the post processing and decimation in (II) an Analog Vibration Analyzer or in (VI) a Digital Accelerometer. This logically calls for completion of the not-performed relevant post processing and decimation in another device such as (IV) a Computer Analyzer or (VII) a Digital Vibration Analyzer.

Measurement Rates and Measurement Intervals

As shown in FIG. 28, Table 4 provides an exemplary demonstration of how measurement rates and measurement intervals may be used with selective decimation. In this example a sampling rate of the ADC is given, such as 200 kHz. The second through fourth columns depict a range in orders of magnitude for sensory input frequencies identified from slow (1 cycle per 10 minutes) to fast (60,000 cycles per minute). These represent the duty cycle or repetition interval for things that occur in a measured machine or a measured process which have a likelihood of occurring within a duty cycle. For example, a machine imbalance is likely to appear once per revolution. For another example, a gear mesh event is likely to occur once each time a tooth connects with another and a hunting tooth defect will come up once in that complete gear rotation cycle. Many mechanical signatures from a repeating duty cycle like these will have periodic content. For yet another example, a corona or a discharge or a friction with a particular frequency, typically a relatively high frequency, often in range of 5 to 100 kHz, and in the case of electrical corona an overriding periodicity related to line frequency may accompany the signature of the corona or discharge. For one more example, a process having a fluid structure interaction such as a slurry process or a milling process or a crushing process or a shearing process or a turbulent process or many other manufacturing or electromechanical processes will have a characteristic signature which typically has a frequency content and may have a periodicity or no periodicity depending on the nature of the processing operation. The periodic cycle for a sensory impact range of sensory input frequencies is intended to span many of these kinds of sensor signals coming into the ADC having a sampling rate.

The measurement rate columns (fourth and fifth columns in Table 4) relate to an Fmax traditionally used with machinery analyzers that measure vibration or motor current signatures for analysis. In this case the maximum frequency, which is analogous to Fmax may be selected based on a periodic sensory input of interest or based on another practical limitation having to do with something other than the duty cycle such as a measurement system limitation or a setup limitation or a desire to have a general purpose measurement rate for a wide range of sensory input rates. Whatever the reason, a measurement rate is typically selected and a Nyquist factor greater than 2, such as 2.56, is typically applied to derive a measurement rate and therefore a measurement interval.

The last four columns in Table 4 refer to measurement interval characteristics including interval durations, a number of measurement intervals per duty cycle (e.g., periodic cycle such as a revolution of a component or a span covering a relatively complete information set), the inverse of that which is duty cycles per measurement interval, and finally a number of oversampled digital data collected for each measurement interval (sampling rate/measurement interval duration).

When the measurement interval duration is long compared to the periodic cycle for a repeating event, such as a friction event producing a 40 kHz signature measured at a rate of 1 kHz, then the signature will be recurring during a given measurement interval (e.g., sampling interval). Since friction is not typically a periodic input, there is not likely to be a periodic signature within the measurement interval. Rather, it is likely to be a random, non-periodic input.

Typically, the number of cycles per interval should be >>1 in order to get meaningful frequency or periodic indications from a single oversampled measurement interval. A majority of frequency content of interest for fault analysis must necessarily be obtained from analyzing the waveform. For example, machinery vibration analysis using selective decimation may find fault information in the oversampled data related to bearings, however in order to discern measurement frequencies commonly associated with ball spin, race rotation, and cage rotation, a decimated or selectively decimated measurement waveform data stream should be analyzed.

Relationship Attributes

A relationship attribute conveys programmed logic interpretation of a detail which is potentially relevant to a measured value. Relationship attributes are typically mathematically derived using a sum, a difference, a proportion, an $n^{th}$ derivative, or an $n^{th}$ integral. A relationship attribute is typically assigned in relation to another scalar measurand, yet in select cases it may become a meaningful measurand on its own merits. Relationship attributes may be retrieved from other data or other information and may have a qualitative association such as a "pass" or "fail", a "yes" or "no", a "plus" or "minus", an "on" or "off", a "low" or "moderate" or "high", a "normal" or "over-speed", or an "other." A primary purpose of relationship attributes is to provide a detail which may be further interpreted by programmed logic. Programmed logic may qualify and associate meaningful datasets with conditional information such that interpretation of a relationship attribute and a scalar value together are more likely to be correctly applied, thereby minimizing false positive or false negative findings. Programmed logic may be used to expand and approximate or at least represent features of interest within an oversampled sampling interval portion of a waveform. Such a reconstructed waveform may appear cleaner than a raw waveform because data not of interest is diminished whereas data of interest is reported or graphically displayed or even exaggerated for easier machine or human interpretation. Such a reconstructed waveform may permit high bandwidth data to be transmitted through a narrow bandwidth path and re-expanded later.

Examples Showing Sorted Distributions for Normal and Not-Normal Gaussian Datasets which Contain Causal Data Several examples are provided in FIGS. 29-33 (Tables 5a, 6a, 6b, 7a, and 7b) for datasets reflecting normal or Gaussian distributions of measurement values, typically displayed in column n1 of each table. Also example datasets are provided with causal data included with otherwise normal data. Tables 5a, 6a, and 7a are presented with "0" (zero) value base and all positive measurement outputs. A common case is that a zero value may be indicative of a failed sensor however a railed or clipped signal may have different affects and those skilled in the art will apply logic to interpret physical conditions through measurement values based on relevant information for a given sensor and its configuration. One can observe from these exemplary tables that multiple outputs may be derived from one stream of datasets. Multiple outputs may include multiple scalar values such as a median and a maximum and a range (MAX–MIN), and it may further comprise multiple attribute or feature identities as well. All of these things may be collected from each dataset in a series of datasets to derive a waveform with attributes assigned to some or to all of the scalar values within a waveform.

Column "n1" in Table 5a represents a sorted dataset for an approximately Gaussian normal distribution. Columns "n2" to "n10" present the same dataset distribution with a substituted "10" value representing a peak value impact or another short duration causal event which occurs in place of one of the normal distribution values. The highlighted cells within Table 5a may be indicative of a causal impact event. This shows the magnitude of the extreme values, "highest values" or MAX and, in the case of plus-and-minus measurements, some of "lowest values" or MIN, is easily distinguished from all other measured values and from statistical parameters for the datasets. It is also apparent that the SDEV, Mean−Median, Mean−Mode, (MAX−MIN)/(Mean−MIN) and MAX−MIN are all potential indicators of this sort of causal event that produces an impact or another causal event that produces a high peak value within a dataset.

As shown in FIGS. 30 and 31, column "n1" in Tables 6a and 6b represents a sorted dataset for an approximately Gaussian normal distribution. Columns "n2" to "n10" present the similar dataset distributions with addition of intermittently high scalar values from physical events producing sensory responses (see row A in Table 2). One example of a physical event is friction where sliding of grain boundaries of one solid surface over grain boundaries of another solid surface produce sound, vibration, or other active signal information that may be received by a sensor such. Other examples of intermittent high signal information that may produce skewed datasets like represented in Tables 6a and 6b "n2" to "n10" potentially include electrical corona, electrical discharge, boundary lubrication regime, mixed mode lubrication regime, fluid structure interaction, abrasive wear, adhesive wear, machining chatter, stick-slip, turbulence, leaking orifice, dry contact, looseness, rub, crushing, shearing, tearing, ripping, collision, rapid oxidation, cracking, spalling, cutting, scuffing, opening or closing of electrical connections, exploding, and detonating. Physical theory and empirical evidence may be employed to discern and differentiate between these and other events in time domain and transform domain analyses. Such analyses may be programmed into firmware or software or hardware logic for rapid automatic interpretation by way of selective decimation. The bold-outlined cells within Tables 6a and 6b may be indicative of a causal impact event. This shows the magnitude of the "highest value" or MAX is distinguishable. It is also apparent that the statistical Mean, Median, Mode, SDEV, Mean−Median, Mean−Mode, (MAX−MIN)/(Mean−MIN), and MAX−MIN are all potential indicators of this sort of causal event that produces an impact or another causal event that produces a high peak value within a dataset.

As shown in FIGS. 32 and 33, column "n1" in Tables 7a and 7b represents a sorted dataset for an approximately Gaussian normal distribution. Columns "n2" to "n10" present the same dataset distribution with a substituted one or more "0" values representing an intermittent or a permanently failed sensor or circuit fault or not running machine or not running process or stopped machine or stopped process or reversing machine or reversing process or another causal event which is likely to produce null level output or "in-the-noise" level output from a sensor which otherwise produces a significant value greater than zero. Note that for other examples one may find that a failed sensor delivers a different output such as an extreme value rather than a zero value. In the example of Tables 7a and 7b, this low value biased measurement may also be produced by other causes which are capable of producing a physical event with sensory input of zero or nearly zero. The bold-outlined cells within Table 7a and 7b are potentially revealing of this type of causal dataset information. Notice the "lowest value" or MIN indications, the zero or near-zero value indications, the Median and Mode indications, and the divide-by-zero error indications for any calculation that divides by a zero or nearly zero measured value or calculated value (e.g. Median in columns "n6" to "n10" and SDEV in "n10").

Diagnosis of Machine Vibration Faults by Selective Decimation

Figure 18:
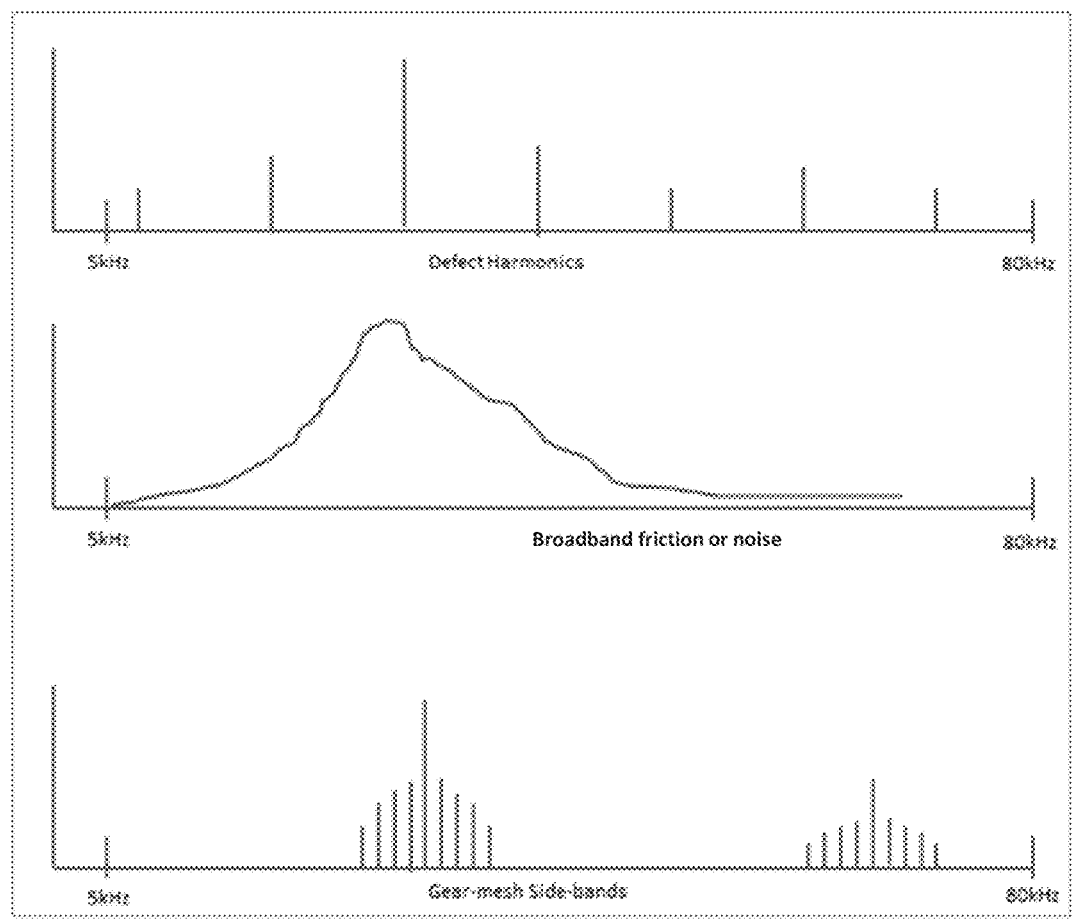
FIG. 18 depicts examples of spectral patterns that may be used in the diagnosis of faults by selective decimation according to an embodiment of the invention.

FIG. 18 depicts examples of spectral patterns that may be used in the diagnosis of faults by selective decimation. In the practice of data collection for machinery condition monitoring, spectral data is typically stored with an $F_{MAX}$ in a range of about 5 kHz, although the data may be sampled at a rate that could produce an $F_{MAX}$ of about 80 kHz. The sampled waveform is "decimated" to a lower frequency waveform yet it may be of interest to provide higher frequency resolution. High-frequency detection (HFD) is a technique employed to detect if higher frequency content is present, but provides no analysis of the pattern of that higher frequency content. Selective decimation may provide diagnostics of the higher frequency data such as motor current data and machine vibration data by storing characteristics (such as mean', median', kurtosis', etc.) of the data samples which are normally discarded in a decimated waveform, without having to save/store the entire high frequency set of data samples. (The prime symbol (') is used to distinguish these calculations, which are performed on the samples between the normally decimated samples (which are discarded in a normally decimated waveform), from similar calculations performed on the final normally decimated waveform.) Using a data collector with multiple processors, such as the FPGA of FIG. 1, could be advantageous for calculating the multiple types of waveform decimation techniques simultaneously. FIG. 18 shows potentially distinguishable frequency signatures that might be present above the $F_{MAX}$ of a typically stored spectrum (i.e. a spectrum using the normal decimation technique).

Diagnosis of Material in a Process by Selective Decimation

Selective decimation of oversampled information may potentially find evidence of structural resonance or friction due to either dry contact or boundary lubrication or pressurized leak or solid material movement in a process or impacting materials within a process against a structural component such as a pipe. Resonance is a natural frequency, such as a structural bending mode, that is stimulated from a forcing function at that frequency where amplitudes increase until damped energy offsets stimulating energy. It is not the natural frequency that is important here, but rather the fact that a stimulating forcing function is putting energy in at a resonant frequency. Like "feedback" in a microphone, it should be practical to detect rising resonance using selective decimation together with one or more periodic signal indication techniques.

Friction tends to be a source of very broadband vibration energy, particularly at a frequency that is much higher than natural resonant frequencies. It should to be easy to find dry contact friction (coefficient of friction ~0.3), boundary lubrication (coefficient of friction ~0.1), turbulence and fluid leaks. Note that turbulence and fluid leaks tend to occur under conditions where gas or liquid coming through an orifice exceeds the speed of sound and therefore emits a supersonic steady state stream of high frequency. Selective decimation may be used to discern the periodicity, lack of periodicity, or autocorrelation tendencies of signal information within a sampling interval and compare these things between subsequent sampling intervals to discern friction and distinguish this from other sources of high frequency information.

Fluid turbulence in pipes, cavitation on back sides of impellers, and erosion of surfaces are also inputs of energy that may be detected by a close proximity accelerometer using selective decimation. Rocks in a crusher, cement in a kiln, a sheet in a rolling mill, grinding in a bench grinder, cutting in a lathe, and milling in a spindle are all activities that have good behavior or have chatter or other bad behavior. Selective decimation may be used to monitor these qualities.

Detecting, locating, and tracking process events may be accomplished using an array of transducers such as vibration transducers or other dynamic transducers. Embodiments of the present invention involve measuring, analyzing, monitoring, adjusting, or controlling an operation based on sensors historically used for machinery health monitoring. Applications include structures subject to resonance or buckling. Further applications include crushers, mills, pulverizes, pipes, pans, buckets, shovels, and structures monitored by accelerometers in a preferred embodiment. Alternative embodiments use other transducers. Sensors used in various embodiments are most likely to be selected for characteristic sensory measurement of stress waves, vibrations, strains, sounds, and/or ultrasounds.

Selective decimation of oversampled data is one technique to determine proximity and a chronological sequence of events. Proximity is established by comparing relative event detection arrival times and relative event signal attenuations over an array of sensors.

Preferred selective decimation techniques include spatial and chronological analysis of one or more of the following quantitative scalar values and qualitative attributes from oversampled datasets: maximum, minimum, average, median, standard deviation, range, kurtosis or skewness, and peak-to-peak wavelength (e.g., frequency content). Selective decimation may also include machine or process audio feature extraction or fingerprinting, analogous to "audio feature extraction" or "audio fingerprinting" as disclosed in "MPEG-7 Audio and Beyond: Audio Content Indexing and Retrieval" by Hyoung-Gook Kim, Nicolas Moreau, and Thomas Sikora© 2005 John Wiley & Sons, Ltd.

Spatial arrangement of sensors within an array is logical considering the geometry of the measured distances, areas, and volumes. For example, spacing between adjacent sensors may be small enough that one event may be detectible by more than one sensor in a sequence. Furthermore, the spacing is logically arranged such that the time for signal propagation through a structure or fluid media from an event location to a first sensor and then to a second sensor is typically longer than, or even much longer than, one dataset sample interval. For example, if the signal travels as stress waves through the structure at a speed of sound in the structure, then the signal traveling at the speed of sound takes longer than one sample interval to get from a first sensor to a second sensor. In that way, one event will be at least partially separated from one sample dataset simultaneously collected in two sensors.

Embodiments of the present invention employ an array comprising a plurality of sensors. An array may be two or more sensors arranged geometrically. Typically this is a two dimensional array. For example, sensors may be strategically located to collect meaningful information covering two dimensional surfaces (i.e., rectangular or polar or cylindrical) or three dimensional surfaces (i.e., spherical or conical or other axisymmetric or truss or other framework). The array may be one dimensional, such as in a line or radius. The array may be stationary or moving. Process or other associated media may be flowing or moving by the array. The array may behave as a line scanner. Digital data may be constructed by one or more of these techniques to construct a visual representation, such as an imaging array or "picture". Imaging systems can be used to describe chronological or spatial representations that translate measurement data into information for interpretation by humans or by programmed logic.

Figure 19:
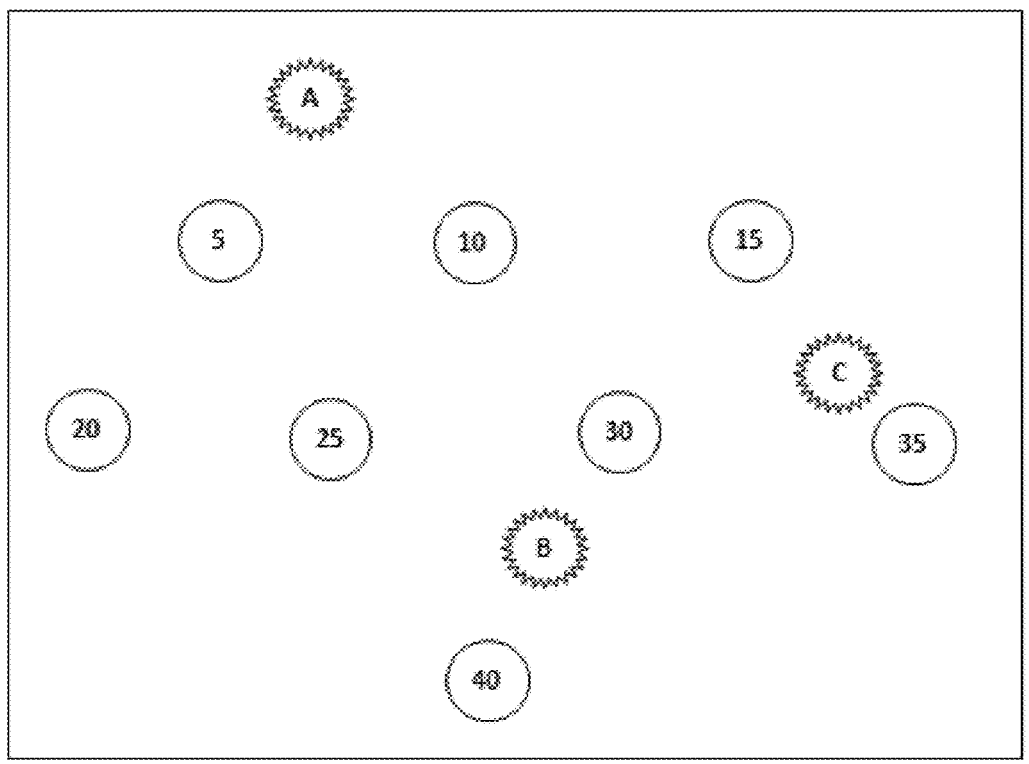
FIGS. 19 and 20 depict examples of sensor arrays positioned on a surface.

FIG. 19 depicts one example of a sensor array where sensors 5, 10, 15, 20, 25, 30, 35 and 40 are positioned on a surface, such as around the outside diameter of a conical or cylindrical mill or a process pipe. Inside the mill or pipe are contained process materials, such as solids, semi-solids, a paste or a slurry of solid and liquid or gel or liquid, wherein the process materials exhibit fluid structure interaction or solid contact. Solid-solid interaction may involve sliding contact in the form of dry contact or boundary lubrication contact or erosion or abrasion or crushing or a combination of wearing or breaking mechanisms. Solid-solid interaction may involve impacting and recoil. Fluid structure interaction or semi-solid/paste/gel interaction within containing structures may involve laminar flow or turbulence or void formation or other cavitation or pressure or body force. Some of these forcing functions produce broadband or broad spatial array of energy inputs to sensors. Other localized events, such as those portrayed in FIG. 19 as events A, B, and C, occur at one or more locations and sequences.

An overarching theme of embodiments of the present invention is a distinction between events that occur in proximity and chronology that are distinguishable from other sensor inputs. For example, if a peak event is detected in a first sensor with a first characteristic signature, and the first characteristic signature is later detected in a second sensor, then a third sensor, and so forth, programmed logic may be used to distinguish the first characteristic signature and report an arrival sequence for the signature at various sensors in the array of sensors. The sequence in itself can provide useful information for programmed logic to back-calculate an estimated location and timing for the event in space and time. Vibration or stress-waves are thus used to "triangulate" the source location of the impact. For example, event A is likely to be detected at sensor 5, then sensor 10, then sensors 25 and 20 at nearly the same time, then sensor 30, etc. High-frequency signal information is typically highly attenuated over distance, and so those signals are diminished, yet they may be distinguishable from background noise when programmed logic has identified and predicted a next location and timing for the signal characteristic at a predictable next sensor location.

Another overarching theme of embodiments of the present invention is compensation or subtraction of extraneous or background signal information. This is accomplished by subtracting signal information collected by one or more remote sensor(s) from relevant signal information collected using a sensor in substantially closer proximity to a source or sources of signal information. This technology makes use of adaptive filtering techniques. For example, one of the arrays of sensors may be identified as a compensation sensor for measuring contemporary background signals. The background signals may include noise, signal information from other plant machinery, and signal information from process operation. In some circumstances, background signals may be "loud." In these circumstances it is particularly useful to differentiate characteristic signals of interest from background signal information by using selective decimation techniques that are more responsive to statistically analyzed signal information than to statically analyzed background signal information.

Information from the array may be interpreted using programmed logic and human understanding to characterize processes taking place inside a processing vessel. A key distinguishing factor for characterizing process operational conditions involves detecting and tracking events in space and time using the plurality of sensors.

Figure 20:
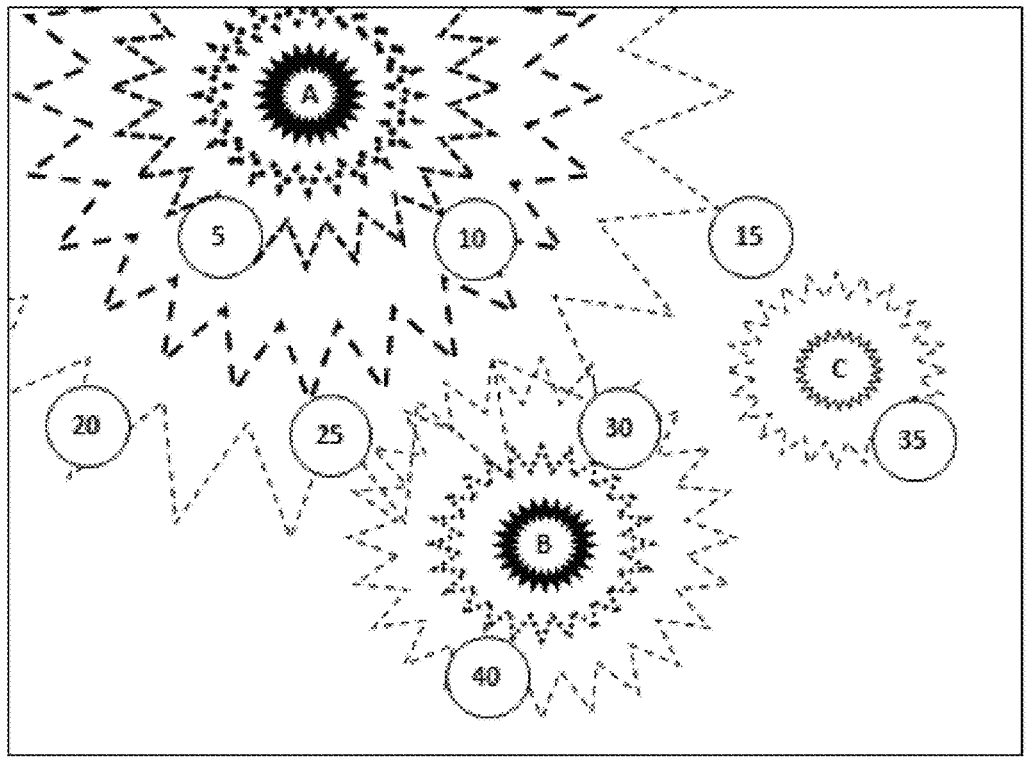

In FIG. 20, the expanding star-shaped outlines around events A, B, and C graphically represent attenuation of signal information. For example, signal information from Event A may be a strong, high-level signal or a low frequency signal. Lower frequencies typically travel longer distances with lesser attenuation than higher frequencies of signal information. In this example, the information from Event A travels longer distances before the signal-to-noise information therein is diminished below a reasonable level of detectability. Event B represents either a mid-level amplitude or a mid-range frequency signal such that the distinguishable signal is lost over relatively shorter distances. In a similar manner Event C represents either a high-frequency signal or a low-amplitude signal.

Signal information from Events A, B, and C typically radiates from a source and travels through a media. FIG. 20 diagrammatically represents a two-dimensional measurement space such an axisymmetric surface around a section of pipe or mill where sensors might be installed. It should be noted that not all sources or events are point sources or events. Instead, a source of signal information measured by embodiments of the present invention may be from other geometries, such as a line source or an area source like a body force or pressure. From an event there is typically a wave of information, such as a compression stress wave or an acoustic wave or other mechanical energy transfer. In these diagrammed examples, a wave of energy contains event information travelling from the point source. During a first time interval diagrammatically represented as the space between concentric star-shaped outlines, oversampled data is collected for analysis.

During a sampling interval, such as the time duration in white space between one diagramed star and the next one out, a large number of measurements are collected and processed. For example, 10, 100, or 1000 measurements may be collected during one sampling interval. These data are called a dataset for oversampled data analysis using techniques such as selective decimation described herein. Quantitative scalars and qualitative attributes from each sampling interval from two or more sensors in an array are collected for subsequent comparison and analysis.

Human understanding of processes and likely events is used to construct a knowledge base regarding events and their likely signatures. Certain events are localized and short duration. For example, a solid-solid impact is typically a relatively short duration event that produces stress waves having a distinct signature that are detectible using accelerometers. Sliding contact and turbulence are two other events that may have similar peak amplitude characteristics but distinctively different average, median, and standard deviation characteristics.

Using a programmable device operating on sensory data gathered by sensors in sensory contact with a vessel, preferred embodiments of the present invention identify process mechanisms that are likely to be occurring inside the vessel. The embodiments employ techniques such as selective decimation to detect events and distinguish from among multiple sources of sensory inputs. Also the present invention uses an array of measurements to find a spatial proximity for events within a process. Furthermore, the present invention uses adjacent sequential sample interval analysis data from the array to further locate and or trace/track the events based on signal attenuation over distance (primary) and on time of travel for signals of various sensors. Finally, embodiments of the present invention provide a chronological representation of periodicity and movement of substances within a process. Periodicity is accomplished using time between impacts or other events. Movement is accomplished by comparing event locations over time. The process of locating an event based on speed-of-sound in a structure or fluid media is extremely fast compared with locating a trace of material moving in a process. Speed of sound in steel is an order of magnitude faster than speed of sound in air. In both cases, it is extremely fast compared with typical process movements.

Some events may be normal if planned for in design and normal operation. However, in many cases some types of events can lead to serious adverse effects. For example, a buckling event or another snap-through event typically involves an increase in compression-driven deflection when there is not an increase in load. A beam or column may buckle with no warning before irrecoverable damage. Plastic deformation, creep deformation, or creep relaxation is another mechanism where typically an elastic response to load is not experienced, and these effects may produce catastrophic failure, material hysteresis, or another potentially degrading performance characteristic. Structural resonance is another characteristic that can have detrimental effects, particularly if it is allowed to persist.

Embodiments of the present invention may be employed to detect buckling, creep, plastic deformation, and resonance by monitoring, analyzing and comparing two or more sensory outputs from an array of sensors using knowledge about the structure being monitored and about the likely behavior of the structure when forcing functions lead to buckling, creep, plastic deformation, and resonance. A near buckling condition may be detected based on a load path misalignment, based on surface strains, or based on movement that is typically a lateral movement at a mid-span. An active buckling condition may be detected quickly enough to automatically drop a load and thereby prevent further destruction.

A creep or plastic deformation condition may be detected by hysteresis observed through tension and compression load cycles or by permanent deformation. A resonant condition may be detected by comparing phase and deflection between sensors that are mounted, if practical, at logical node and anti-node locations. These locations may be recognized by pins or joints associated with node and midpoints associated with anti-nodes. A modal analysis or bump test will greatly assist.

Imaging Transmitter.

An imaging transmitter includes an imaging detector, such as a focal plane array, suitable for detecting electromagnetic radiation photons, such as ultraviolet (UV) or visible or infrared (IR) spectral wavelengths or a combination of one or more different spectral wavelength ranges. The imaging detector typically has an array of pixels such as 8×8 or 16×16 or 80×80 or 160×120 or 320×240 or 640×480. Each pixel in an array is analogous to an individual sensor. Collectively the array signature is capable of detecting one or more characteristics such as an illumination, a color, a chemical characteristic of a substance, a temperature characteristic of a substance, an emissivity characteristic of a substance, a transmission characteristic of a media or substance, an absorption characteristic of a substance, an electrical characteristic of a substance, an energy characteristic of a substance, a distance or area or other dimensional characteristic of an object, a moisture characteristic of a substance, a heat transfer characteristic of a substance, a friction characteristic of a substance, a fluorescence or phosphorescence characteristic of a substance, and more.

Characteristics may be sensed passively based upon electromagnetic radiation in the ambient environment associated with an object, media, or substance being sensed, or actively based on a stimulated emission or transmission or reflection of electromagnetic radiation.

An example of passive imaging detection is passively observing black-body radiation from a material using an IR detector. For example, the Model ATOM 80 detector manufactured by SOFRADIR EC, INC., 373 US Hwy 46W, Fairfield, N.J. 07004 USA, has the following specifications: 80×80 microbolometer array, spectral response 8-14 µm, detector NETD<100 mK (f/1, 27° C.), power consumption<0.25 W, operating temperature range from −20° C. to +60° C., frame rate 30 Hz, electrical interface USB 2.0, and 14-bit streaming digital output.

An example of active imaging detection is sensing fluorescence or phosphorescence of a substance responding to a stimulating energy such as a pulsed laser. Fluorescence and phosphorescence characteristics of materials commonly have predictable decay constants based on a state of the material such as a temperature. By time-pulsing the stimulating energy with known pulse durations a transmitter may be programmed to differentiate this active energy source and its cause and effect consequences from most other energy sources which are not pulsed in the same manner, and the transmitter may be further programmed to discern a characteristic response by a substance to the actively pulsed energy source. In this example, a first characteristic response may be the excitation or lack of excitation by fluorescence or phosphorescence, and a second characteristic may be the subsequent decay or lack of decay. Characteristic responses may be interpreted using programmed logic and additional information such as a theory or empirical evidence to deduce a desired measurand value such as a temperature of a substance or a concentration of a substance.

An example of active and passive imaging detection is sensing a leaking gaseous substance that absorbs a characteristic spectral energy band common to ambient environment enabling passive detection, combined with a supplemental illumination, such as a an additional broadband illumination or an additional narrow band illumination or an additional high-pass band illumination or an additional low-pass band illumination, in proximate vicinity to the leak. Additional illumination may be steady-state or pulsed to achieve a desired response.

Figure 21:
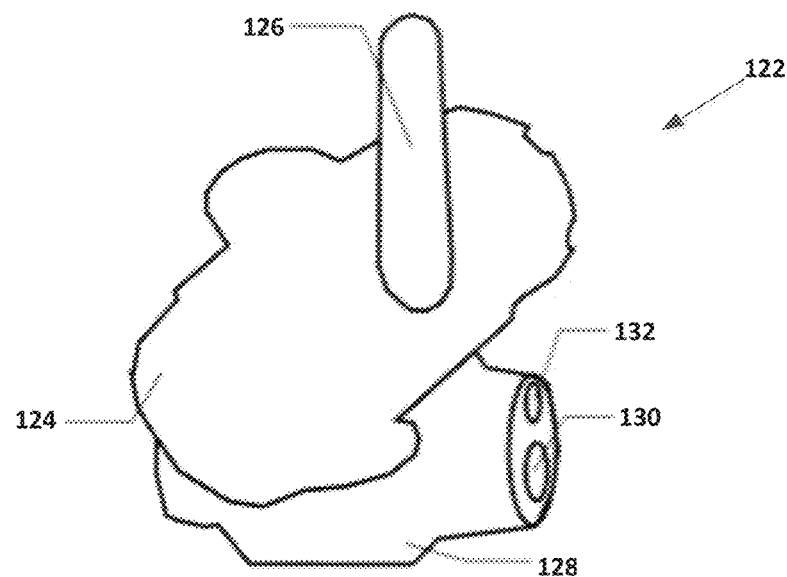
FIG. 21 depicts an imaging transmitter according to an embodiment of the invention.

FIG. 21 depicts an imaging transmitter 122 comprising a transmitter segment 124 with radio antenna 126, a sensor housing 128, one or more inputs 130 for airborne sound and airborne ultrasound, and one or more inputs 132 for electromagnetic radiation photon energy. This depiction is not intended to limit logical arrangements for the many multiple components that those skilled in the art may combine to construct a transmitter and having a sensor or suite of sensors.

The imaging transmitter 122 may be used stand-alone or it may be more effectively having an overlapping field of view (FOV) with other imaging transmitters.

Figure 22:
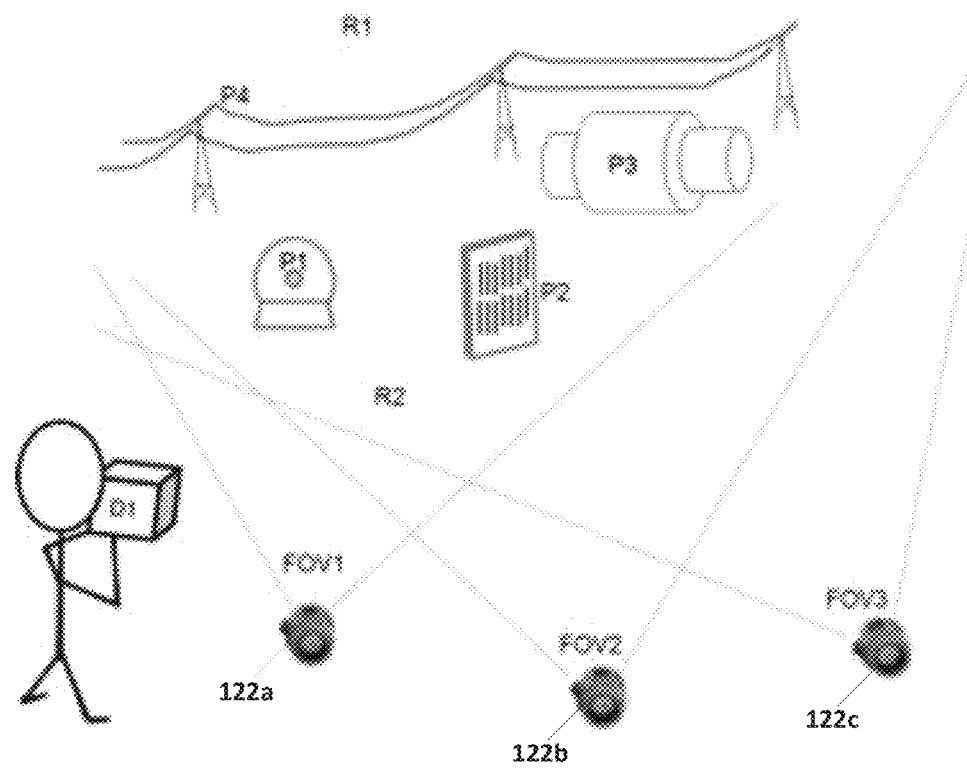
FIG. 22 depicts overlapping fields of view of multiple imaging transmitters according to an embodiment of the invention.

FIG. 22 diagrammatically represents an overlapping FOVs for a first imaging transmitter 122a having a first field of view (FOV1), a second imaging transmitter 122b having a second field of view (FOV2), a third imaging transmitter 122c having a third field of view (FOV3). The overlapping fields of view all encompass various points of interest from different perspectives, including a machine P1, an electrical component P2, a pipe with valve P3, an electric power line P4, a sky location reference R1, and ground location reference R2. Also shown in FIG. 22 is a technician holding a handheld device D1 used to assist in configuring the imaging transmitters 122a, 122b and 122c. In various embodiments, the display D1 may be a local display that is handheld or fixed, which is wireless communication with the imaging transmitters 122a, 122b and 122c using near-field communication (NFC), Bluetooth™, or other wireless communication protocols. Alternatively, the display D1 may have a wired connection to the imaging transmitters 122a, 122b and 122c.

Preferred embodiments implement a selection and identification process by which points of interest (such as P1, P2, P3 and P4) and points of reference (such as R1 and R2) are automatically or manually identified. One technique for doing this is to transmit imaging data from the imaging transmitters 122a, 122b and 122c to the handheld device D1, such as by Bluetooth™ or other wireless means, and using programmed logic in the device D1 to assist an operator in the field to configure the imaging transmitters. In one embodiment, a display on the device D1 shows a geometric representation of the focal plane array within the imaging transmitter. While viewing the display, the operator may designate one or more points of interest and one or more points of reference. Since the display image is coordinated with a pixelated focal plane array location, it is rational to represent spatial geometric relationships between the points of interest and points of reference. As long as the FOVs of the imaging transmitters are not moved, that relationship should be preserved. Even if the FOVs are changed, it is logical to preserve some or all of the geometric relationships between the physical world of points of interest and points of reference and a representation in the plane of the imaging detector.

As the term is used herein, a point of interest is typically a location in a FOV to be observed, monitored, and diagnosed. Typically, monitoring and diagnosing is accomplished using a programmed logical interpretation of imaging information based on theory and experience knowledge. As discussed above, examples of points of interest include valve, electrical connections, portions of a machine or a power line, electrical switch gears, or other items of interest.

Selective Decimation of Imaging Information from Machine and Electrical Components.

Figure 23:
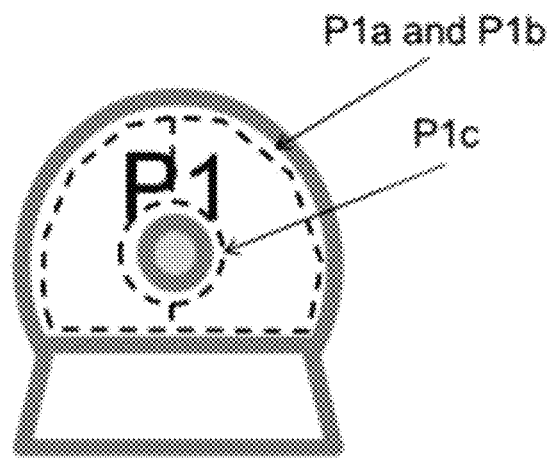
FIG. 23 depicts a machine in the field of view of an imaging transmitter according to an embodiment of the invention.

A diagrammatic representation of the machine P1 is shown in FIG. 23 to provide explanation of how a spatial selective decimation region of interest may be automatically or semi-automatically configured based on a bilateral symmetry. FIG. 23 depicts a machine outline wherein sectors P1a and P1b are bilaterally symmetric, such that statistical values determined for one half may have an expectation of similarity with similar statistical values determined for the other half. Machine P1 is likely to have a statistically significant number of pixel measured values, such as for an imaging detector data array. Each image may, for example, have 5 to 50,000 values in segment P1a and also in segment P1b. One can conceive many other segments of bilateral symmetry such as quartiles or more segmented regions. In preferred embodiments, programmed logic automatically performs a statistical peak hold, average, median, minimum, standard deviation, and other logical statistical comparisons between left and right halves of a bilaterally symmetric object, such as the machine P1, to discern if measurement information includes causal data or passes tests for a Gaussian normal data population for each segment or for both segments.

By performing such calculations on imaging data from FOV1, FOV2, and/or FOV3 regarding digital data in sectors P1a and P1b or regarding digital data in other bilaterally symmetric area segments, programmed logic can better interpret and conclude correct conclusions and avoid false positive and false negative findings. For example, one common problem with electromagnetic photon detection is the effect of reflections. A reflection from a surface may include sky location information or ground location information or another actual source of photons reflected from at least a portion of a surface. By observing an item such as machine P1 from multiple angles, the chances of false indications from reflections in multiple views is less likely than in a single view. The effect of such reflections may further be detected, interpreted, explained, and properly handled in subsequent calculations, findings, and recommendations. If nothing else, an alert can be posted to an operator or to a technician to evaluate results or to perform another check or test or measurement. These observations regarding the advantage of multiple FOV perspectives apply as well to other points of interest discussed separately.

It may not be practical to directly associate a sound or ultrasound measurement of airborne vibration to any specific point inside or outside of a field of view. Yet it may be practical to associate a signature based on empirical or theoretical knowledge with one or more likely causes or sources of such sound or ultrasound. Programmed logic or human logic may associate that deduction with possible deductions from image data source information to improve likelihood or possibilities for a logical explanation.

Figure 24:
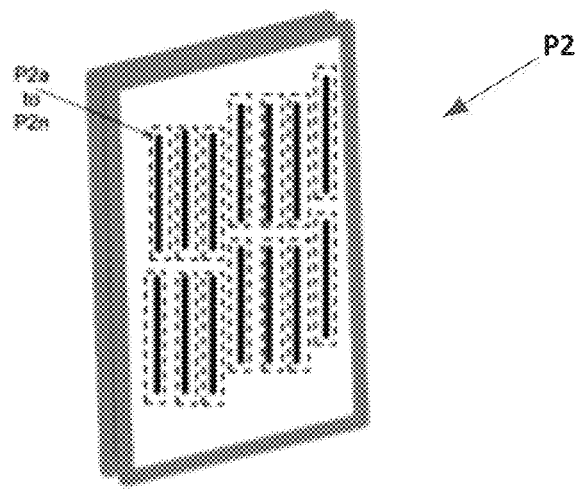
FIG. 24 depicts an electrical component in the field of view of an imaging transmitter according to an embodiment of the invention.

Preferred embodiments of the invention can be used to pick objects having similar appearance from a field of view. For example, FIG. 24 depicts the electrical component P2, which may be a switchbox containing fuses. Other examples of similar objects in a field of view include similar components in a switchyard or similar bearings on a conveyor line or similar segments of pipe. The imaging transmitters have an advantage of being able to pick out multiple items having similar characteristics such as a shape, a size (allowing distance perspective), an outline, temperature, or another distinct and similar geometric or amplitude pattern.

In this example, programmed logic can identify a series of fourteen similar items, such as fuses P2a to P2n. Spatial selective decimation of image data in this case may involve statistically reducing all of the pixels in each sector, such as in the sector containing fuse P2a, to a scalar value such as peak hold, median, mean, minimum, standard deviation, or variance. Peak hold is used in a preferred embodiment. It is likely that some of the fuses are in use and others are not. It is possible that some fuses are defective or that there is a malfunction in an electrical line connected to a fuse. An elevated temperature above ambient may be expected for each fuse that is powered. A faulty powered fuse is likely to be abnormally hot or abnormally cold. A faulty fuse that is not powered is likely to be indistinguishable from any other unpowered fuse. A delta-temperature calculation may be performed using programmed logic and empirical information to estimate a change in electrical resistance as described hereinafter.

Figure 25:
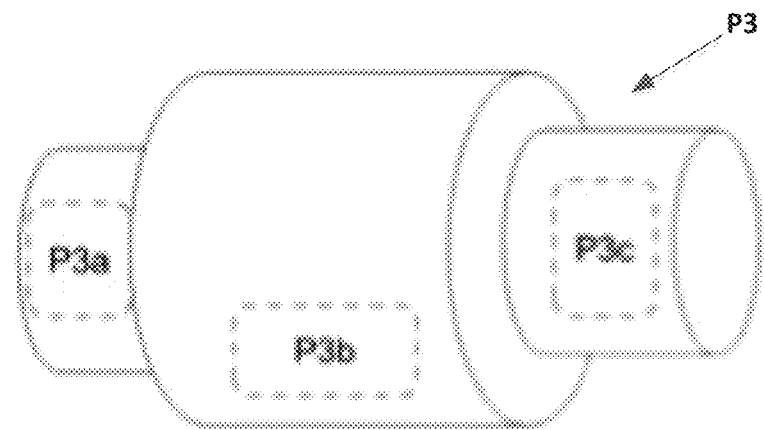
FIG. 25 depicts a pipe and valve in the field of view of an imaging transmitter according to an embodiment of the invention.

FIG. 25 depicts a pipe P3 with a valve in the FOVs of the image transmitters. The pipe P3 has segments P3a, P3b, and P3c. Programmed logic may be used to deduce where to select segments P3a, P3b, and P3c. The respective areas of these three segments comprise a plurality of pixel values over which spatial selective decimation may be applied to reduce oversampled data to meaningful values. For this example, a characteristic of a valve is that it typically has an upstream side and a downstream side, with pipe running in both directions. A valve may be normally fully opened or normally completely closed. It may be operationally changing from one state to the other or somewhere in between. It is important for a person or programmed logic within a control system to interpret and verify a normal condition of a valve and a pipe. This logic applies to other process-containing vessels, not just valves. An imaging transmitter may use an imaging detector and use a sonic or ultrasonic detector to detect and monitor a valve operation or another process vessel operation. By comparing representative information from a pipe section upstream to a pipe section downstream and a valve section, one may logically deduce information about a valve operational state. A sonic or ultrasonic signature may confirm or refute a deduction made based on information from an imaging detector.

Scale Buildup.

Sometimes buildup or removal of material from an inside surface of a pipe or tank or other vessel can be detected using an imaging transmitter. This detection is based on the effect that added or removed material has on energy transfer, such as heat conduction or convection between process material and the pipe, tank, or vessel in which the material is contained. An imaging transmitter mounted outside the pipe, tank or other vessel, may monitor the surface energy of the pipe, tank or other vessel. A baseline image, such as a thermal image, typically serves as a baseline or reference spectral image. One or more points of interest may be selected where scale or other buildup or erosion or other removal of material is expected to eventually occur.

Detecting Flow.

Flow in a pipe or process vessel may also be detected or revealed by use of an imaging transmitter. One method for revealing a flow or a not-flow condition for a pipe or other vessel in a process is to identify two or more points of interest along an anticipated flow path. If flow is occurring then a logical temperature or other thermal indication is expected to follow that flow path, taking into consideration transient intervals during starting and stopping of flow conditions. For example, if a pipe is not at ambient temperature conditions, even one temperature indication can reveal flow is occurring in that section of pipe. Convection and conduction heat transfer from or to a fluid within a pipe will typically affect the temperature of the outside surface of a pipe or valve or vessel through which the fluid passes.

Detecting Plugging.

It is often possible to detect and identify a plugging condition when solid material builds up and becomes an obstruction that restricts flow or plugs a pipe or valve or other process mechanism. For example, FIG. 25 depicts one method for comparing imaging transmitter measurements at an inlet or upstream portion with a vessel body or with an outlet or downstream portion of a valve or pipe or other flowing device. When not plugged and under steady state conditions, the measurements from an imaging transmitter will be more strongly affected by the bulk of fluid or other process media flowing through the section than when partial or complete plugging has taken place. An imaging array such as a thermal image detector may be used to detect affects from convection and conduction heat transfer which change due to flow within proximity of a vessel wall.

Insulation around a pipe or vessel or valve is likely to limit an imaging transmitter's ability to reveal a flow within the pipe or vessel or valve. It is possible in certain situations to observe a thermal indication of temperature and therefore heat transfer by identifying a point of interest as a thermally conducting fin or other thermally conductive material such as a pipe hangar or pipe flange or bracket or other thermally conductive object in direct connection with an insulated pipe or vessel or valve.

Power Transmission and Distribution.

Figure 26:
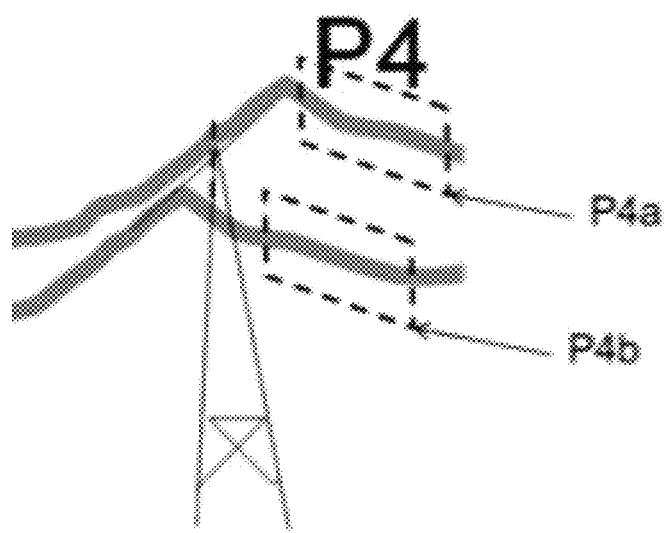
FIG. 26 depicts an electrical power transmission and distribution components in the field of view of an imaging transmitter according to an embodiment of the invention.

Automatic or semi-automatic segment selections for power transmission segments P4a and P4b of an image area are depicted in FIG. 26. Image transmitter presentation for power lines commonly has sky location background, but not always. There is typically similarity in appearance of power transmission and distribution items so that programmed logic is able to pick out components of a power transmission distribution set of items such as power lines, power towers, electrical insulators, transformers, and more. As mentioned previously, selective decimation techniques may be used to reduce oversampled image data into meaningful scalar values for further analysis and interpretation. Peak hold is commonly selected because a sky location background is often an overwhelming low value dataset. Linear characteristics and other distinguishable geometric and electromagnetic image characteristics of power transmission and distribution components make them readily distinguishable from many other things by use of programmed logic or human logic assisted by programmed logic.

Important false indications to account for when using imaging transmitters include contributing affects from wind, rain, snow or condensation, or movement of an object within a field of view, a vibration of the detector, a movement of the imaging transmitter, or a movement of a point of interest. For example, a false indication may be caused when a solar image is detected in the background or in a reflection. The characteristics of a reflection or of a solar exposure or of a sky background may all be accounted for and should be used in programmed logic in order to avoid false trips, false positive indications, or false negative indications from reflections and exposures to sky and ground effects.

Temperature Profiling.

An electromagnetic signature produced by an object in a combustion process, such as an active catalyst in a combustion process, may give indications about proper form and function of the object, such as the catalytic material. Similar to FIG. 26 where the power line exhibits an exaggerated high response compared with the background, a material such as a catalyst in a combustion process is likely to produce a predictable geometric profile which is readily monitored using an imaging transmitter having selected electromagnetic spectral detection capabilities. If each individual element of catalytic material can be distinguished as individual point of interest, like in FIG. 24, then a statistical analysis approach like that described for FIG. 24 may be applied to decimate a large number of pixels to a single or to a few scalar values. Features or attributes may further be associated with each scalar value. If multiple portions of a catalytic media are indistinguishable, then it may be better to portion off points of interest and vicinities around each point such as an inlet point, a mid-section point, and an exit point, as appropriate. Comparisons may be logically assigned for analysis and alarming based on delta measurements between points such as inlet and exit. In addition, absolute parameters for analysis and alarming may be based on other characteristics, such as process optimization, material deterioration, fuel efficiency, chemical emissions, or other catalyst related characteristics.

Auto Selection of a Point of Reference.

Programmed logic may be used to discern and identify one or more points of reference. Two commonly used points of reverence include (1) a land based location such as a ground location or a vegetation location, and (2) a sky location or a space location. A land based location such as a ground location or a space location may provide a useful reference for compensating and validating values measured and trended from within or nearby a point of interest location. Depending on the scene, a ground base location and a sky location will be distinctive based on logical characteristics one may associate therewith. A ground based location is logically at or near an ambient temperature. It is also commonly associated with a lower portion of a horizontal or "landscape" image. A sky based or space based location is logically at a relatively cold temperature and is commonly expansive in a vicinity near an upward portion of a geometrically well-oriented image. There are many ways that one skilled in the art may use technique, device, and programmed logic to interpret and distinguish these and other reference locations.

Figure 27:
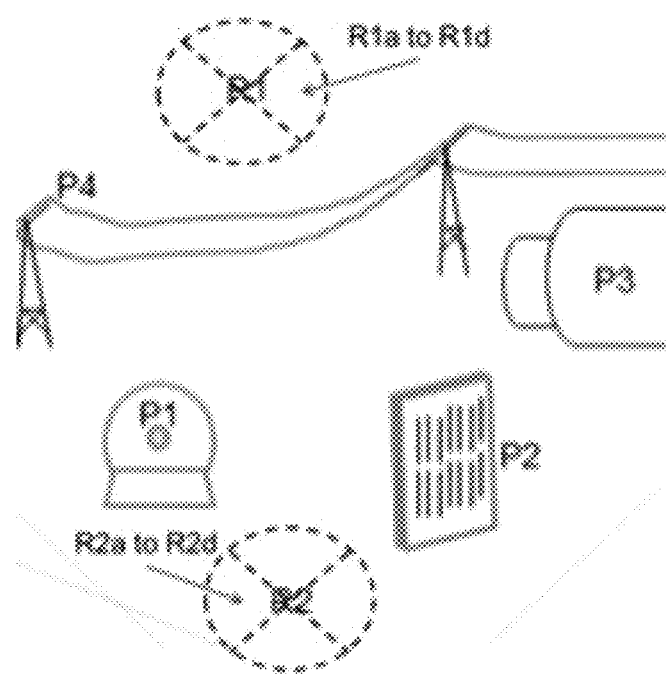
FIG. 27 depicts points of reference in the field of view of an imaging transmitter according to an embodiment of the invention.

As depicted in FIG. 27, reference points R1 and R2 in this example represent a sky location and a ground location respectively. Programmed logic and/or human logic may be used to select these points and to construct segments R1a to R1d and R2a to R2d in proximity to points R1 and R2 respectively. Spatial selective decimation may be used to analyze, verify, and determine a statistically significant reference value for a sky location measure and for a ground location measure. These reference values are used by programmed logic and human logic to interpret the meaning of actual measured values as they may be affected by an environment characteristic such as a ground or a sky exposure. As mentioned in other examples, selective decimation is performed, and by constructing an "X-pattern" with four segments, statistical analysis can effectively qualify a referenced value. To qualify a selective decimation value, the left and right segments may be compared, as may the top and bottom segments, to pass a logical test. Concentric rings of pixel information may also be effectively used instead of or in addition to pie-segments. A Gaussian normal distribution of data population information is expected from a statistically controlled set of data like one should expect from reference point selective decimation analysis.

Within a confined building or a mine or another such confined area, or even in an outdoors location, there are situations in which another structure may be identified as a reference, such as a floor, wall, ceiling, post, column, window or door, or foundation or pool or another object or reflection of an object. Reference values are generally selected for use in compensation or correction or for use in ratiometric or differential computations.

Points of interest are typically a focus vicinity of an area for analysis of data to derive meaningful information about the vicinity of the area. Typically a point of interest is located within a pixilated field of view for a first imaging transmitter. In preferred embodiments, the same point of interest is also located independently using a pixilated imaging area field device.

Data collection intervals may be nearly continuous or intermittent or triggered or scheduled.

Different types of image data may be collected for analysis within the imaging transmitter system. For example, a first type is traditional bulk image data, which is typically processed to be displayed in image or video format. For further example, second and third types are selectively decimated image data, which is processed to compress oversampled image information in spatial and temporal domains.

Throughout this specification the term image is used not only in reference to a graphic picture observed on a display or a page by a human. In regard to the imaging transmitter of the present invention, the word image refers a two dimensional array of intensity or spectral data values that may be graphically presented in a "picture" form. Instead of seeing all the images in an analog form with human eyes, imaging transmitters interpret data arrays behind electromagnetic spectral imagers and process digital information spatially and temporally.

An overarching theme of the various embodiments is the use of selective decimation to compress portions of "oversampled" image data into manageable information that is typically a logically associated measure of a meaningful analysis parameter, whereby the meaning is associated with a measurement or characterization of a real world phenomenon that has some significance.

Streaming Image and Video Data.

A first type of data is streaming image data, which is typically for human viewing and interpretation, such as described with reference to display device D1 in FIG. 22. The image representation may be an entire field of view, only a defined area of interest, only image pixels above a threshold level such as equal to or greater than 60 degrees C., or isometric-plot lines such as isotherms or contour-like curves that define where the detector level is within certain boundaries. A low resolution (40×40) image may be transferred via a Wireless HART™ network in about 5 minutes, or demand higher resolution at 80×80, or even higher. A portion of an image may be transmitted to overlay on top of a reference image that is already stored in memory of the receiving host, which provides a geometric perspective with display and analysis available for exceptional data.

Selectively Decimated Spatial Data from Imaging Transmitters.

A second type of data comprises analysis parameter information associated with points of interest and with points of reference within an image. This second type of data commonly involves selective decimation of two-dimensional image data. For example, using HART within an imager field of view having a single point of interest and two points of reference, a 4-20 mA signal may transmit a chosen scalar representing a selective decimation value for the vicinity neighboring the point of interest. In addition a digital HART™ primary value may be transmitted with scalar value related to the 4-20 mA signal, a secondary value may be transmitted with a scalar value related to a first point of reference, and a tertiary value may be transmitted with a scalar value related to a second point of reference. Finally, a fourth value may be transmitted with a calculated compensated resultant scalar value, wherein the primary value is mathematically compensated for environmental or operational variance, such as compensated using information from the first or the second points of reference.

Selectively Decimated Temporal Data from Imaging Transmitters.

A third type of data is analysis parameter data associated with points of interest and points of reference in a time series of images. This third type of data characterizes changes in data over a sequential time domain, typically to identify qualitative and quantitative characteristics or attributes or features such as a stable condition with a quantified value, a steady state condition with a quantified value, an increase or decrease with a quantified rate or other value, an accelerating or decelerating with a quantified value, a change with a quantified amount of change, a confidence or lack of confidence or an error with a quantified value, an out-of-range with a corresponding magnitude, and a statistical analysis result such as "Gaussian" or "not Gaussian" or "exceeding control limit" or another statistical measure with a corresponding metric value.

The third type of data may be essential for determining validity or a confidence level or a characteristic for a finding from a first or a second type of data analysis. Furthermore, there are many errors, findings, and confirmation that can only be detected or can be better detected using a sequential time domain analysis.

Programmed Logic Analyzes Digital Data from the Imaging Transmitter.

Preferred embodiments employ programmed logic operating on digital data in the imaging transmitter to reduce the data by way of a process typically involving selective decimation. Preferred embodiments also typically employ programmed logic in a receiving device, such as in a command center where signals from the imaging transmitter are sent. Programmed logic in a receiving device typically operates on selectively decimated data to interpret a state of a condition within an image or to interpret a changing condition.

Selective Decimation of Oversampled Spatial or Temporal Data.

Examples of selective decimation of actual values from a time or spatial waveform data population of imaging data may include, but are not limited to, a median, a mode, a maximum, a minimum, a standard deviation, or another actual value selected from the population.

Selective decimation techniques of the present invention may include but are not limited to, an actual value from the population, an actual value from a transformation of the population, and a measurand value that is descriptive of sample interval population. A selective decimation value may be quantitative or qualitative or both.

Selective decimation techniques of the present invention may be calculated on a proximate region (area or volume) of image data, allowing little or no contribution from relatively distant image data. Area representations typically represent image data proximate to a point of interest or a reference location of interest within a given image. Volume representations are typically an expansion of detector area over time. For example, a nonlinear-polar representation, wherein a nonlinear interval is applied in both space and time, but a polar geometric representation is applied only in detector space, is an example of an analytical geometric configuration for selectively decimating proximity data and deriving in a decimated value representing a (cylindrically shaped) volume array of data in a spatial radius about a point of interest, and that, collected over an "axial" time domain.

Preferred embodiments include a selective decimation imaging transmitter. One preferred embodiment uses selective decimation by peak hold values from a plurality of values within a sampling interval. An acronym used herein for peak hold values is PeakVue where "Peak" normally refers to a type of extreme, such as a maximum or a minimum value selected from the sample interval population, and "Vue" refers to the selected value. It is to be understood that any reference herein to the term PeakVue may be substituted for a reference to one or more other selective decimation techniques.

Examples of selective decimation values that may not be actual values from a time or spatial waveform population, and may instead be selective decimation values either representing a measure of the population or a measure from a transformed population, may include but are not limited to, a mean, a standard deviation, a variance, a Kurtosis, a skewness, a correlation, a frequency distribution value, a histogram population value, a probability density distribution value, and other meaningful measurand values.

Selective decimation values may also be produced from combinations of the statistical and other computed values noted above. Such combinations can provide significant insight as to the quality of the acquired data and the possible cause of any anomalies. For example, when oversampled data are analyzed and found to follow Gaussian normal distribution, then greater confidence is placed in information conveyed by average measurements. A substantial difference between median and average (or with essentially similar calculations) reveals causal deviation which distorts the distribution.

The foregoing descriptions of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for processing dynamic measurement data derived from an analog signal generated by an analog sensor in sensory contact with a machine or a process, and displaying processed dynamic measurement data on a display device, the method comprising:
   (a) generating the analog signal by the analog sensor in sensory contact with the machine or process;
   (b) converting the analog signal into an oversampled digital data stream;
   (c) designating sampling interval datasets within the oversampled digital data stream;
   (d) displaying a measurement selector on the display device to allow a user to select a measurement to be used during a decimation process, wherein the measurement is selected from one or more of a median value, a mode value, a standard deviation value (SDV), a maximum value, a range value, a minimum value, a root mean square (RMS) value, a statistical scatter value, a momentum value, a variance value, a skewness value, a kurtosis value, a peak shape factor (PSF) characteristic, a parametric-versus-causal (PvC) characteristic, and one or more difference values;
   (e) receiving a measurement selection based on operation of the measurement selector by the user;
   (f) decimating sequential sampling interval datasets based on the measurement selection to produce scalar values corresponding to each sampling interval dataset;
   (g) generating a waveform comprising the scalar values; and
   (h) displaying the waveform on the display device.

2. The method of claim 1 further comprising analyzing the waveform to provide an indication of one or more of an impacting condition, a friction condition, a faulty signal condition, a noisy signal condition, an arcing condition, a corona condition, a contact condition, an electrical discharge condition, a flow condition, an erosion condition, a cavitation condition, a slipping condition, a valve operation condition, and a valve closure condition.

3. The method of claim 1 further comprising, after step (b) and before step (c), pass filtering the oversampled digital data stream to obtain machine or process condition information.

4. The method of claim 1 further comprising:
   (i) determining a median value and a mean value from each of a plurality of the sampling interval datasets, and determining difference values between the median values and the mean values from the plurality of sampling interval datasets;
   (j) for one or more of the sampling interval datasets, comparing the difference value to a threshold limit to determine a likelihood of whether the sampling interval dataset comprises Gaussian normal data or not-Gaussian normal data, wherein the difference value beyond the threshold limit indicates a likelihood of not-Gaussian normal data;
   (k) assigning a Gaussian attribute or a not-Gaussian attribute in association with the sampling interval dataset; and
   (l) storing the Gaussian attribute or not-Gaussian attribute in association with one or more of the sampling interval dataset and the waveform.

5. The method of claim 4 further comprising, in situations in which the comparing step (j) indicates that the dynamic sampling interval dataset is classified as not-Gaussian normal data, further interpreting the dataset characteristics and assigning an attribute indicating a condition that likely resulted in the not-Gaussian normal classification, wherein the condition is selected from the group consisting of an impact, a sensor fault, a circuit fault, a machine operation, a noise, a steady condition, a random event, a systematic event, and a change in environment parameters.

6. The method of claim 4 further comprising, in situations in which the comparing step (j) indicates that the sampling interval dataset comprises not-Gaussian normal data, using the median values determined in step (i) for spectral analysis of the measurement data.

7. The method of claim 4 wherein step (g) comprises generating the waveform using at least one value selected from the sampling interval dataset for which the Gaussian normal or not-Gaussian normal classification is made.

8. The method of claim 1 wherein step (b) comprises oversampling the dynamic measurement data at a sampling rate that is substantially greater than a Nyquist frequency.

9. The method of claim 1 further comprising deriving a characteristic of the machine or a characteristic of the method used to collect the machine vibration data based at least in part on the displayed waveform.

10. The method of claim 1 further comprising:
   (i) determining a plurality of standard deviation values, each standard deviation value derived from a corresponding one of the plurality of sampling interval datasets;
   (j) determining a plurality of maximum values, each maximum value derived from a corresponding one of the plurality of sampling interval datasets;
   (k) determining a plurality of minimum values, each minimum value derived from a corresponding one of the plurality of sampling interval datasets;
   (l) determining a plurality of first difference values, each first difference value determined by determining a difference between the maximum value and the minimum value for the corresponding sampling interval dataset;
   (m) determining a plurality of second difference values, each second difference value determined by determining a difference between the standard deviation value and the first difference value for the corresponding sampling interval dataset;
   (n) comparing one or more of the second difference values to a threshold value to determine a likelihood of whether the dynamic measurement data comprises causal data or Gaussian normal data, wherein second difference values greater than the threshold value indicate a likelihood of causal data; and (o) in situations in which the comparing step (n) indicates that the dynamic measurement data comprises causal data, assigning a condition that likely resulted in the causal data, wherein the condition is selected from the group consisting of an impact, a sensor fault, a circuit fault, a machine operation, a noise, a steady condition, a random event, a systematic event, and a change in environment parameters.

11. The method of claim 1 further comprising:
step (g) including:
   (g1) generating a mid-range waveform comprising a plurality of mid-range values, wherein each of the plurality of mid-range values in the mid-range waveform is selected from a corresponding one of the plurality of sampling interval datasets, wherein the plurality of mid-range values comprise a plurality of median values, a plurality of mean values, a plurality of RMS values or a plurality of mode values;
   (g2) generating a maximum-range waveform comprising a plurality of maximum-range values, wherein each of the plurality of maximum-range values in the maximum-range waveform is selected from a corresponding one of the plurality of sampling interval datasets, wherein the plurality of maximum-range values comprise a plurality of absolute maximum values, a plurality of rectified maximum values, a plurality of minimum values, or a plurality of peak-to-peak maximum-to-minimum values;
   (g3) generating a statistical scatter waveform comprising a plurality of statistical scatter values, wherein each of the plurality of statistical scatter values in the statistical scatter waveform is selected from a corresponding one of the plurality of sampling interval datasets, wherein the plurality of statistical scatter values comprise a plurality of variance values, a plurality of skewness values, or a plurality of kurtosis values;
   (g4) generating a rectified maximum waveform comprising a plurality of rectified maximum values, wherein each of the plurality rectified maximum values in the rectified maximum waveform is selected from a corresponding one of the plurality of sampling interval datasets; and
   (g5) generating a combined waveform by
      adding values comprising one of the waveforms derived in steps (g1) through (g4) to corresponding values comprising another of the waveforms derived in steps (g1) through (g4), or
      subtracting values comprising one of the waveforms derived in steps (g1) through (g4) from corresponding values comprising another of the waveforms derived in steps (g1) through (g4),
      wherein the combined waveform represents peaking within the sampling interval datasets.

12. The method of claim 1 further comprising:
(i) determining a plurality of mode values, each mode value based on a most frequently repeating value or value range occurring within a corresponding one of the plurality of sampling interval datasets;
(j) determining a plurality of minimum values, each minimum value derived from a corresponding one of the plurality of sampling interval datasets;
(k) determining a plurality of maximum values, each maximum value derived from a corresponding one of the plurality of sampling interval datasets;
(l) determining a plurality of MODE–MIN difference values, each MODE–MIN difference value determined by determining a difference between the mode value and the minimum value for the corresponding sampling interval dataset;
(m) determining a plurality of MAX–MODE difference values, each MAX–MODE difference value determined by determining a difference between the maximum value and the mode value for the corresponding sampling interval dataset;
(n) determining that the sensor is faulty if the MODE–MIN difference value is less than a predetermined threshold value over successive sampling interval datasets; and
(o) determining that the sensor is in a saturated condition if the MAX–MODE difference value is less than a predetermined threshold value over successive sampling interval datasets.

13. The method of claim 12 further comprising generating a scalar value comprising a first set of bits and a second set of bits, wherein the first set of bits comprise the MODE–MIN difference value, and the second set of bits comprise a relationship attribute value indicating a sensor faulty state or a sensor not faulty state.

14. The method of claim 12 further comprising generating a scalar value comprising a first set of bits and a second set of bits, wherein the first set of bits comprise the MAX–MODE difference value, and the second set of bits comprise a relationship attribute value indicating a sensor saturated state or a sensor not saturated state.

15. The method of claim 1 further comprising:
step (c) including organizing the sampling interval datasets by sorting data values from minimum to maximum to form a sorted cumulative data distribution; and
(i) for one or more of the sampling interval datasets, determining a median value to be an average of two or more data values immediately above and below an absolute median of the sorted cumulative data distribution.

16. The method of claim 1 further comprising:
(i) determining a plurality of maximum values, each maximum value derived from a corresponding one of the plurality of sampling interval datasets;
(j) determining one or more kurtosis momentum values based on the plurality of maximum values;
(k) determining a shape factor by subtracting an integer value three from at least one of the kurtosis momentum values;
(l) determining that the oversampled dynamic measurement data has a normal distribution when the shape factor equals zero;
(m) determining that the oversampled dynamic measurement data has a peaked distribution when the shape factor is greater than zero; and
(n) determining that the oversampled dynamic measurement data has a flat distribution when the shape factor is less than zero.

17. The method of claim 1 further comprising:
(i) determining a plurality of mode values, each mode value based on a most frequently repeating value or value range occurring within a corresponding one of the sampling interval datasets;

(j) determining a plurality of median values, each median value derived from a corresponding one of the sampling interval datasets;
(k) determining a plurality of MODE–MED difference values, each MODE–MED difference value determined by determining a difference between the mode value and the median value for the corresponding sampling interval dataset; and
(l) determining that a stable measurement condition exists if an absolute value of one or more of the MODE–MED difference values is less than a predetermined threshold value over successive sampling interval datasets.

18. The method of claim 1 further comprising:
(i) determining a plurality of median values, each median value derived from a corresponding one of the sampling interval datasets;
(j) determining a plurality of maximum values, each maximum value derived from a corresponding one of the sampling interval datasets; and
(k) determining a plurality of crest factors, each crest factor determined based on a difference between the median value and the maximum value for the corresponding sampling interval dataset.

19. The method of claim 1 further comprising:
(i) determining a plurality of maximum values, each maximum value derived from a corresponding one of the sampling interval datasets;
(j) determining a plurality of minimum values, each minimum value derived from a corresponding one of the sampling interval datasets;
(k) determining a plurality of MAX–MIN difference values, each MAX–MIN difference value determined by determining a difference between the maximum value and the minimum value for the corresponding sampling interval dataset;
(l) determining a plurality of standard deviation values, each standard deviation value derived from a corresponding one of the sampling interval datasets;
(m) determining a plurality of SDV difference values, each SDV difference value determined by determining a difference between the standard deviation value and the MAX–MIN difference value for the corresponding sampling interval dataset; and
(n) comparing one or more of the SDV difference values to a threshold value to determine a likelihood of whether the dynamic measurement data comprises causal data or Gaussian normal data, wherein difference values greater than the threshold value indicate a likelihood of causal data.

20. The method of claim 1 further comprising:
(i) determining a plurality of maximum values, each maximum value derived from a corresponding one of the sampling interval datasets;
(j) determining three or more values immediately before the maximum value for one or more of the sampling interval datasets;
(k) determining three or more values immediately after the maximum value for one or more of the sampling interval datasets;
(l) for one or more of the sampling interval datasets, determining a peak shape factor characteristic based on the maximum value and the three or more values immediately before and the three or more values immediately after the maximum value; and
(m) based on the peak shape factor characteristic, determining a likely causal event associated with the maximum value.

21. The method of claim 1 further comprising:
(i) determining a plurality of maximum values, each maximum value derived from a corresponding one of the sampling interval datasets;
(j) determining a plurality of standard deviation values, each standard deviation value derived from a corresponding one of the sampling interval datasets;
(k) determining a plurality of parametric-versus-causal characteristics, each parametric-versus-causal characteristic derived from a corresponding one of the sampling interval datasets;
(l) determining a plurality of peak shape factor characteristics, each peak shape factor characteristic derived from a corresponding one of the sampling interval datasets; and
(m) based on the maximum values, standard deviation values, parametric-versus-causal characteristics, and peak shape factor characteristics, determining whether one or more of the following conditions exist:
a spall condition exists resulting from roller bearing component fatigue; and
a broken tooth condition exists resulting from fatigue failure of a gear component.

22. The method of claim 1 further comprising:
(i) determining a plurality of minimum values, each minimum value derived from a corresponding one of the sampling interval datasets;
(j) determining a plurality of median values, each median value derived from a corresponding one of the sampling interval datasets;
(k) determining a plurality of mode values, each mode value derived from a corresponding one of the sampling interval datasets;
(l) determining a plurality of mean values, each mean value derived from a corresponding one of the sampling interval datasets;
(m) determining a plurality of standard deviation values, each standard deviation value derived from a corresponding one of the sampling interval datasets;
(n) determining a plurality of peak shape factor characteristics, each peak shape factor characteristic derived from a corresponding one of the sampling interval datasets; and
(o) based on the minimum values, median values, mode values, mean values, standard deviation values, and peak shape factor characteristics, determining whether a sliding friction condition exists resulting from inadequate lubrication.

23. The method of claim 1 further comprising:
(i) determining a plurality of median values, each median value derived from a corresponding one of the sampling interval datasets;
(j) determining a plurality of mode values, each mode value derived from a corresponding one of the sampling interval datasets;
(k) determining a plurality of mean values, each mean value derived from a corresponding one of the sampling interval datasets;
(l) determining a plurality of standard deviation values, each standard deviation value derived from a corresponding one of the sampling interval datasets;
(m) determining a plurality of peak shape factor characteristics, each peak shape factor characteristic derived from a corresponding one of the sampling interval datasets; and
(n) based on the median values, mode values, mean values, standard deviation values, and peak shape factor characteristics, determining whether a smooth running condition exists resulting from proper lubrication.

24. The method of claim 1 further comprising:
(i) determining a plurality of median values, each median value derived from a corresponding one of the sampling interval datasets;
(j) determining a plurality of mean values, each mean value derived from a corresponding one of the sampling interval datasets;
(k) determining a plurality of standard deviation values, each standard deviation value derived from a corresponding one of the sampling interval datasets;
(l) determining a plurality of peak shape factor characteristics, each peak shape factor characteristic derived from a corresponding one of the sampling interval datasets; and
(m) based on the median values, mean values, standard deviation values, and peak shape factor characteristics, determining whether a misalignment condition exists.

25. The method of claim 1 further comprising:
(i) determining a plurality of maximum values, each maximum value derived from a corresponding one of the sampling interval datasets;
(j) determining a plurality of standard deviation values, each standard deviation value derived from a corresponding one of the sampling interval datasets;
(k) determining a plurality of parametric-versus-causal characteristics, each parametric-versus-causal characteristic derived from a corresponding one of the sampling interval datasets;
(l) determining a plurality of peak shape factor characteristics, each peak shape factor characteristic derived from a corresponding one of the sampling interval datasets; and
(m) based on the maximum values, standard deviation values, parametric-versus-causal characteristics, and peak shape factor characteristics, determining whether subsurface fatigue cracks exist resulting from resonant vibration of a thermowell in process piping.

26. The method of claim 1 further comprising:
(i) determining a plurality of maximum values, each maximum value derived from a corresponding one of the sampling interval datasets;
(j) determining a plurality of mean values, each mean value derived from a corresponding one of the sampling interval datasets;
(k) determining a plurality of standard deviation values, each standard deviation value derived from a corresponding one of the sampling interval datasets;
(l) determining a plurality of peak shape factor characteristics, each peak shape factor characteristic derived from a corresponding one of the sampling interval datasets; and
(m) based on the maximum values, mean values, standard deviation values, and peak shape factor characteristics, determining whether slip-stick movements are occurring resulting from a coefficient of static friction being exceeded at a loaded interface.

27. The method of claim 1 further comprising:
(i) determining at least one of:
a plurality of minimum values, each minimum value derived from a corresponding one of the sampling interval datasets;
a plurality of median values, each median value derived from a corresponding one of the sampling interval datasets;
a plurality of mode values, each mode value derived from a corresponding one of the sampling interval datasets;
a plurality of standard deviation values, each standard deviation value derived from a corresponding one of the sampling interval datasets; and
a plurality of peak shape factor characteristics, each peak shape factor characteristic derived from a corresponding one of the sampling interval datasets; and
(j) based at least in part on the values determined in step (i), determining whether one or more of the following conditions exist:
occurrence of a partial discharge in vicinity of a high-voltage electrical apparatus; and
occurrence of a leaking condition that produces fluid turbulence in vicinity of a leaky orifice under pressure.

28. The method of claim 1 further comprising:
(i) determining at least one of:
a plurality of median values, each median value derived from a corresponding one of the sampling interval datasets;
a plurality of mode values, each mode value derived from a corresponding one of the sampling interval datasets;
a plurality of standard deviation values, each standard deviation value derived from a corresponding one of the sampling interval datasets; and
a plurality of peak shape factor characteristics, each peak shape factor characteristic derived from a corresponding one of the sampling interval datasets; and
(j) based on the values determined in step (i), determining whether an intermittent fault condition exists in a three-phase electrical power line.

29. The method of claim 1 further comprising:
step (f) including, for one or more of the sampling interval datasets, generating multiple scalar values representative of the dynamic measurement data within the dataset;
(i) based on the multiple scalar values, determining one or more characteristic values indicative of a feature, quality or characteristic of the dynamic measurement data within the dataset; and
(j) saving the multiple scalar values and the one or more characteristic values in association with an identifier for the dataset.

30. The method of claim 1 further comprising:
(i) determining a plurality of first statistical scalar values, each first statistical scalar value derived from a corresponding one of the plurality of sampling interval datasets;
(j) determining a plurality of second statistical scalar values, each second statistical scalar value derived from a corresponding one of the plurality of sampling interval datasets;
(k) determining based on one or more of the first statistical scalar values that the machine or process is in a first state and not in a second state; and
(l) determining based on one or more of the second statistical scalar values that the machine or process is in the second state and not in the first state.

31. A method for collecting and processing oversampled vibration data collected by at least first and second vibration sensors attached to a mechanical structure used in the processing of a material, wherein the mechanical structure is operable to transmit vibrational energy from the material to the first and second vibration sensors, wherein the oversampled vibration data comprises a plurality of sampling interval datasets, wherein each sampling interval dataset corresponds to a particular sampling interval, the method comprising:
- (a) positioning the first vibration sensor in a first location on the mechanical structure and positioning the second vibration sensor in a second location on the mechanical structure;
- (b) receiving vibrational energy at the first vibration sensor, wherein the vibrational energy was generated by an event that occurs within the material being processed and traveled through the mechanical structure to the first vibration sensor;
- (c) the first vibration sensor generating a first vibration signal based on the vibrational energy;
- (d) oversampling the first vibration signal to generate first oversampled vibration data comprising a plurality of first sampling interval datasets;
- (e) for each of the plurality of first sampling interval datasets, determining one or more first scalar values selected from the group consisting of a maximum value, a minimum value, a mean value, a median value, a mode value, a standard deviation value, a maximum-to-minimum range value, a kurtosis value, a skewness value, and a wavelength value;
- (f) based on the one or more first scalar values, determining one or more first characteristic values that provide an indication of an event type;
- (g) generating a first timestamp value representative of a time at which the vibrational energy generated by the event was received at the first vibration sensor;
- (h) receiving the vibrational energy at the second vibration sensor, wherein the vibrational energy traveled through the mechanical structure to the second vibration sensor;
- (i) the second vibration sensor generating a second vibration signal based on the vibrational energy;
- (j) oversampling the second vibration signal to generate second oversampled vibration data comprising a plurality of second sampling interval datasets;
- (k) for each of the plurality of second sampling interval datasets, determining one or more second scalar values selected from the group consisting of a maximum value, a minimum value, a mean value, a median value, a standard deviation value, a maximum-to-minimum range value, a kurtosis value, a skewness value, and a wavelength value;
- (l) based on the one or more second scalar values, determining one or more second characteristic values that provide an indication of the event type;
- (m) generating a second timestamp value representative of a time at which the vibrational energy generated by the event was received at the second vibration sensor;
- (n) comparing the one or more first characteristic values to the one or more second characteristic values to determine that the event type indicated by the one or more first characteristic values is the same event type as indicated by the one or more second characteristic values;
- (o) determining a time difference between the first timestamp and the second timestamp; and
- (p) based at least in part on the time difference, determining a location of the event relative to the first vibration sensor and the second vibration sensor.

32. The method of claim 31 wherein the mechanical structure comprises one or more of a pipe, a vessel, a mill, a crusher, a grinder, and a metal cutting tool.

33. The method of claim 31 wherein the event is selected from the group consisting of an impact event, a recoil event, a cavitation event, a void formation event, a material movement event, a dry contact friction event, a boundary lubrication friction event, a fluid leak event, a fluid turbulence event, a surface erosion event, a chatter event, a resonance event, and a buckling event.

34. An apparatus for collecting and processing machine or process vibration data comprising:
- at least one vibration sensor attached to a machine, the at least one vibration sensor generating at least one analog vibration signal having a maximum frequency of interest, $F_{MAX}$, which is greater than an event frequency of events occurring in the machine or the process;
- at least one analog-to-digital converter for oversampling the at least one analog vibration signal at a sampling rate of at least seven times $F_{MAX}$ to generate a plurality of sampling interval datasets, each corresponding to a particular sampling interval;
- a decimation module having a plurality of parallel field programmable gate arrays comprising:
  - a first field programmable gate array for receiving the plurality of sampling interval datasets and determining a first scalar value from each sampling interval dataset, the first scalar selected from the group consisting of a maximum value, a minimum value, a median value, a mode value, a mean value, a standard deviation value, a parametric-versus-causal value, an operational condition value, and a peak shape factor value; and
  - a second field programmable gate array for receiving the plurality of sampling interval datasets and determining a second scalar value from each sampling interval dataset that is different from the first scalar value, the second scalar selected from the group consisting of a maximum value, a minimum value, a median value, a mode value, a mean value, a standard deviation value, a parametric-versus-causal value, an operational condition value, and a peak shape factor value.

* * * * *